United States Patent
Perras et al.

(10) Patent No.: US 10,349,327 B2
(45) Date of Patent: Jul. 9, 2019

(54) SOFTWARE DEFINED NETWORKING DISTRIBUTED AND DYNAMIC MOBILITY MANAGEMENT

(71) Applicant: InterDigital Patent Holdings, Inc., Wilmington, DE (US)

(72) Inventors: Michelle Perras, Montreal (CA); Juan Carlos Zuniga, Montreal (CA); Alexander Reznik, Pennington, NJ (US); Carlos Jesus Bernardos, Madrid (ES); Hao Jin, King of Prussia, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/003,596

(22) Filed: Jun. 8, 2018

(65) Prior Publication Data
US 2018/0295549 A1    Oct. 11, 2018

Related U.S. Application Data

(63) Continuation of application No. 14/904,571, filed as application No. PCT/US2014/047043 on Jul. 17, 2014, now Pat. No. 9,998,967.
(Continued)

(51) Int. Cl.
*H04W 36/12*   (2009.01)
*H04W 48/00*   (2009.01)
(Continued)

(52) U.S. Cl.
CPC .......... *H04W 36/12* (2013.01); *H04W 48/17* (2013.01); *H04W 48/18* (2013.01); *H04W 88/12* (2013.01)

(58) Field of Classification Search
CPC ..... H04W 36/08; H04W 36/12; H04W 36/14; H04W 36/18; H04W 36/0083;
(Continued)

(56) References Cited

U.S. PATENT DOCUMENTS

| 8,578,035 B2 | 11/2013 | Miklos et al. |
| 9,042,297 B2 | 5/2015 | Muhanna et al. |

(Continued)

FOREIGN PATENT DOCUMENTS

| WO | 2011/025421 | 3/2011 |
| WO | 2012/113841 | 8/2012 |
| WO | 2013/082245 | 6/2013 |

OTHER PUBLICATIONS

Bernardos et al., "A PMIPv6-based solution for Distributed Mobility Management," draft-bernardos-dmm-pmip-01, DMM Working Group, Internet-Draft (Mar. 13, 2012).
(Continued)

*Primary Examiner* — Sharad Rampuria
(74) *Attorney, Agent, or Firm* — Volpe and Koenig, P.C.

(57) ABSTRACT

A method and apparatus are described for supporting advanced distributed and dynamic mobility management (DMM) features with multiple flows anchored at different gateways. A software defined networking (SDN) controller may support the attachment of a wireless transmit/receive unit (WTRU) to a network. The SDN controller may receive initial attachment signaling from a point of attachment (PoA) indicating that the WTRU initially attached to the network. The anchor node may be a distributed gateway (D-GW). The SDN controller may select an anchor node to serve the WTRU Internet protocol (IP) flow traffic. Initial attachment signaling, intra-anchor node handover, inter-
(Continued)

anchor node handover, new anchor node allocation and inter-domain mobility across virtualized operators are also described.

20 Claims, 47 Drawing Sheets

Related U.S. Application Data

(60) Provisional application No. 61/847,350, filed on Jul. 17, 2013.

(51) Int. Cl.
*H04W 48/18* (2009.01)
*H04W 88/12* (2009.01)

(58) Field of Classification Search
CPC . H04W 36/32; H04W 36/0055; H04W 64/00; H04W 16/32; H04W 64/006; H04W 52/40; H04W 36/30; H04W 36/04; G01S 11/10; H04B 7/2606; H04M 11/04
See application file for complete search history.

(56) References Cited

U.S. PATENT DOCUMENTS

| | | | |
|---|---|---|---|
| 9,066,328 B2 | 6/2015 | Zuniga et al. | |
| 2004/0028009 A1 | 2/2004 | Dorenbosch et al. | |
| 2007/0104170 A1 | 5/2007 | Leung et al. | |
| 2008/0305799 A1 | 12/2008 | Zuniga et al. | |
| 2009/0010237 A1 | 1/2009 | Asou et al. | |
| 2010/0128696 A1 | 5/2010 | Fantini et al. | |
| 2010/0208698 A1* | 8/2010 | Lu | H04W 36/0027 370/331 |
| 2010/0215019 A1 | 8/2010 | Velev et al. | |
| 2011/0007671 A1 | 1/2011 | Yu | |
| 2011/0075675 A1 | 3/2011 | Koodli et al. | |
| 2012/0008600 A1 | 1/2012 | Marinier et al. | |
| 2012/0063300 A1 | 3/2012 | Sahin et al. | |
| 2012/0213142 A1* | 8/2012 | Van Lieshout | H04W 72/121 370/312 |
| 2012/0230289 A1 | 9/2012 | Olsson et al. | |
| 2013/0083773 A1 | 4/2013 | Watfa et al. | |
| 2013/0188515 A1 | 7/2013 | Pinheiro et al. | |
| 2014/0321328 A1 | 10/2014 | Zuniga et al. | |
| 2015/0020157 A1* | 1/2015 | Kim | H04W 76/30 726/3 |
| 2015/0045032 A1* | 2/2015 | Tomici | H04W 36/04 455/436 |
| 2015/0245392 A1 | 8/2015 | Chan et al. | |
| 2015/0304892 A1 | 10/2015 | Perras et al. | |
| 2015/0312806 A1 | 10/2015 | Perras et al. | |
| 2016/0007191 A1 | 1/2016 | Perras et al. | |

OTHER PUBLICATIONS

Bernardos et al., "PMIPv6-based distributed anchoring," draft-bernardos-dmm-distributed-anchoring-02 , DMM Working Group, Internet-Draft (Apr. 8, 2013).

Bernardos et al., "Towards Flat and Distributed Mobility Management: A 3GPP Evolved Network Design," Workshop on Telecommunications: From Research to Standards, IEEE Conference on International Communications, pp. 6855-6861 (Jun. 2012).

Chan, "Problem statement for distributed and dynamic mobility management," draft-chan-distributed-mobility-ps-05, Network Working Group, Internet-Draft (Oct. 31, 2011).

Gundavelli et al., "Proxy Mobile IPv6," Network Working Group, RFC 5213 (Aug. 2008).

Kanizo et al., "Palette: Distributing Tables in Software Defined Networks," 2013 Proceedings IEEE INFOCOM, pp. 545-549 (Apr. 2013).

Mckeown et al., "OpenFlow: Enabling Innovation in Camput Networks," ACM SIGCOMM Computer Communication Review vol. 38, No. 2, pp. 69-74 (Apr. 2008).

Open Networking Foundation, "OpenFlow Switch Specification, V1.3.0," ONF TS-006 (Jun. 25, 2012).

Perkins et al., "Mobility Support in IPv6," Internet Engineering Task Force (IETF), RFC 6275 (Jul. 2011).

Soliman et al., "Hierarchical Mobile IPv6 (HMIPv6) Mobility Management," Network Working Group, RFC 5380 (Oct. 2008).

Soliman, "Mobile IPv6 Support for Dual Stack Hosts and Routers," Network Working Group, RFC 5555 (Jun. 2009).

Yap et al., "OpenRoads: Empowering research in mobile networks," ACM SIGCOMM Computer Communication Review, vol. 40, No. 1, pp. 125-126 (2010).

Giust et al., "A Hybrid MIPv6 and PMIPv6 Distributed Mobility Management: The Medieval Approach," 2011 IEEE Symposium on Computers and Communications (ISCC), pp. 25-30 (Jun. 28-Jul. 1, 2011).

Giust et al., "A Network-based Localized Mobility Solution for Distributed Mobility Management," 14th International Symposium on Wireless Personal Multimedia Communications (WPMC), pp. 1-5 (Oct. 3-7, 2011).

Ali-Ahmad et al., "Mobility Anchor Selection in DMM: Use-case Scenarios," draft-aliahmad-dmm-anchor-selection-01.txt, DMM Working Group, Internet-Draft (Jul. 11, 2013).

Bernardos et al., "PMIPv6-based distributed anchoring," draft-bernardos-dmm-distributed-anchoring-00, DMM Working Group, Internet-Draft (Mar. 5, 2012).

Liu et al., "Distributed Mobility Management: Current Practices and Gap Analysis," draft-ietf-dmm-best-practices-gap-analysis-01, DMM, Internet-draft (Jun. 17, 2013).

Seite et al., "Dynamic Mobility Anchoring," draft-seite-mext-dma-00.txt, Network Working Group, Internet-Draft (Nov. 13, 2011).

\* cited by examiner

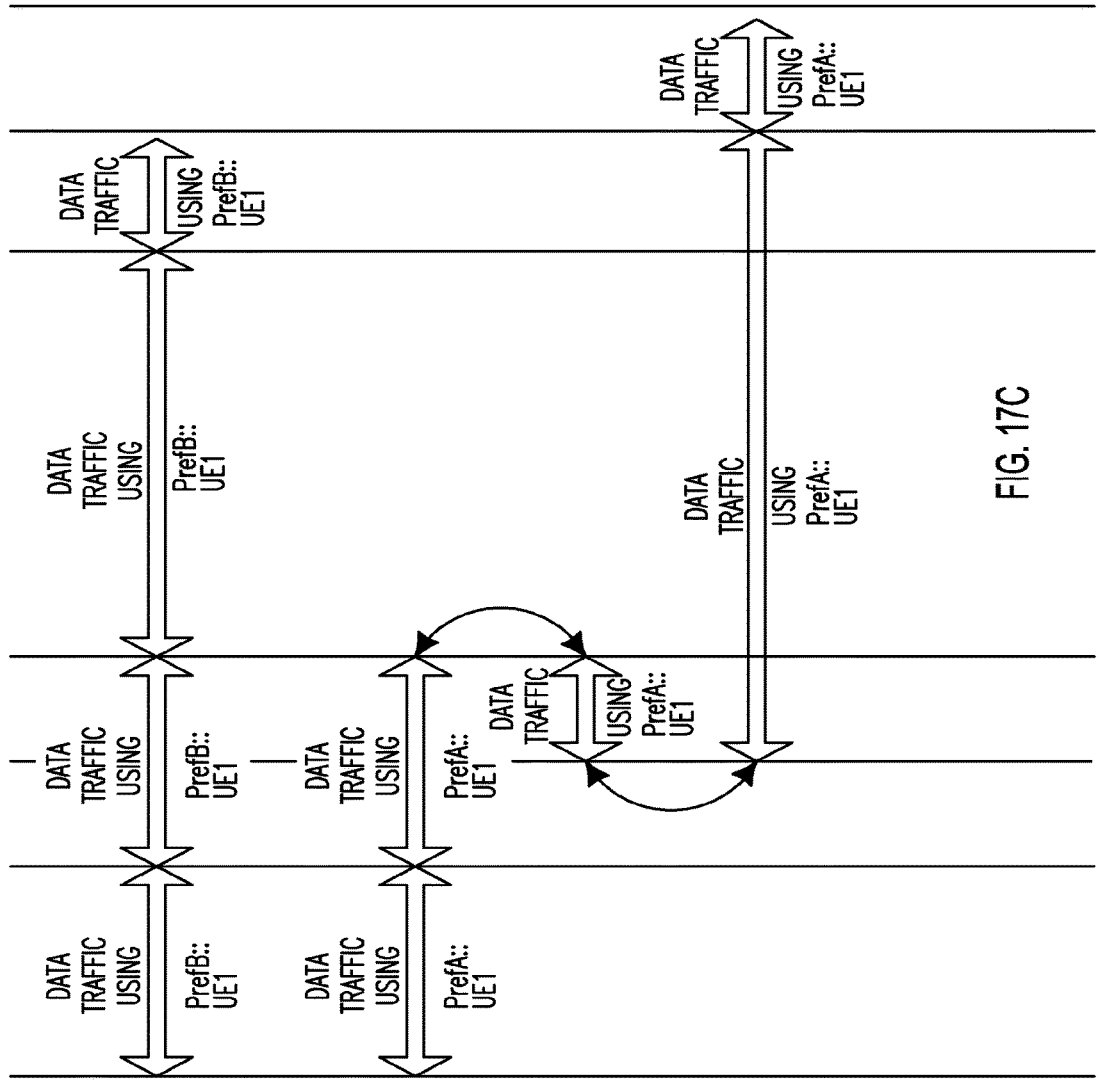

SOFTWARE DEFINED NETWORKING DISTRIBUTED AND DYNAMIC MOBILITY MANAGEMENT

CROSS REFERENCE TO RELATED APPLICATIONS

This application is a continuation of U.S. patent application Ser. No. 14/904,571, filed Jan. 12, 2016, which is the U.S. National Stage, under 35 U.S.C. § 371, of International Application No. PCT/US2014/047043, filed on Jul. 17, 2014, which claims the benefit of U.S. Provisional Patent Application No. 61/847,350, filed Jul. 17, 2013, the contents of which are hereby incorporated by reference herein.

BACKGROUND

In contrast to current Mobile Internet protocol (IP) and Proxy Mobile IP approaches, which rely on centralized entities for both control and data plane operation, a distributed and dynamic mobility management (DMM) approach may utilize mobility anchors towards the edge of the network.

To enable a DMM approach, software defined networking (SDN) may be used, where the control and the data forwarding planes are separated, thereby allowing for a quicker provision and configuration of network connections. With SDN, network administrators may program the control of the traffic in a centralized way, without being required to configure independently each of the network's hardware devices, which may also require physical access to them. This approach may decouple the system that makes decisions about where traffic is sent, (e.g., the control plane), from the underlying system that forwards traffic to the selected destination, (e.g., the data plane), potentially simplifying networking and the deploying of new protocols and mechanisms.

OpenFlow is a standardized protocol between the control and forwarding layers of the SDN architecture. OpenFlow may allow accessing and modifying the forwarding plane of network devices such as switches and routers. It should be noted that OpenFlow is an example of a protocol for the interface between control and forwarding layers.

IP mobility management may aid in providing the "always-on" and ubiquitous service envisioned by future technologies. However, current IP mobility management protocols do not necessarily meet the expectations regarding deployment success. Accordingly, proprietary customized solutions are implemented instead.

SUMMARY

A method and apparatus are described for supporting advanced distributed and dynamic mobility management (DMM) features with multiple flows anchored at different gateways. The method includes receiving an initial attachment signaling from a first point of attachment (PoA) node indicating that a user equipment (UE) is attached to the network. A first anchor node is selected to provide connectivity to the UE. A forwarding data plan is configured to allow signaling to reach the first anchor node, and a forwarding data plan is configured between the first anchor node and the UE to allow data packets to be forwarded between the UE and the first anchor node.

BRIEF DESCRIPTION OF THE DRAWINGS

A more detailed understanding may be had from the following description, given by way of example in conjunction with the accompanying drawings wherein.

DETAILED DESCRIPTION

Figure 1A:
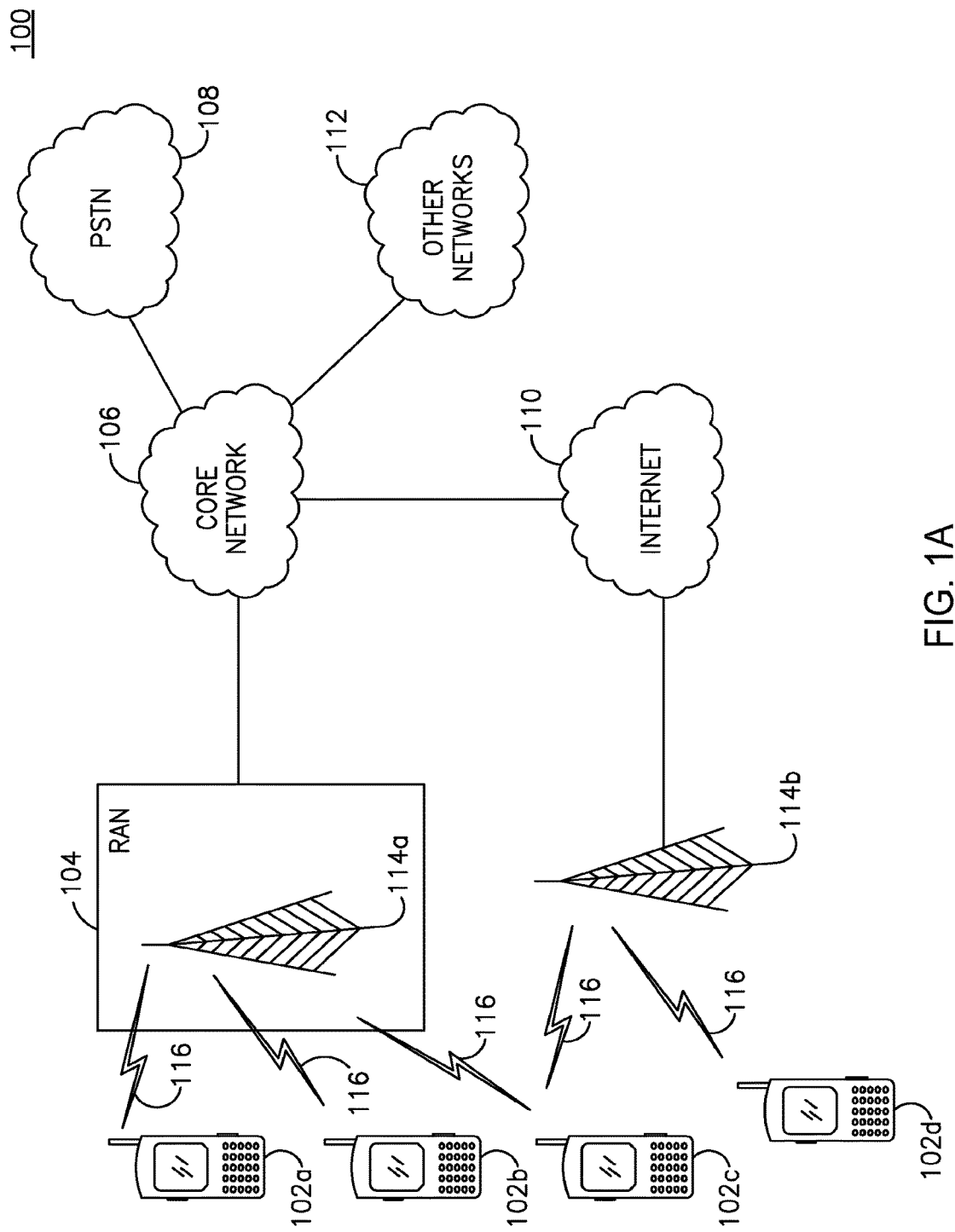
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
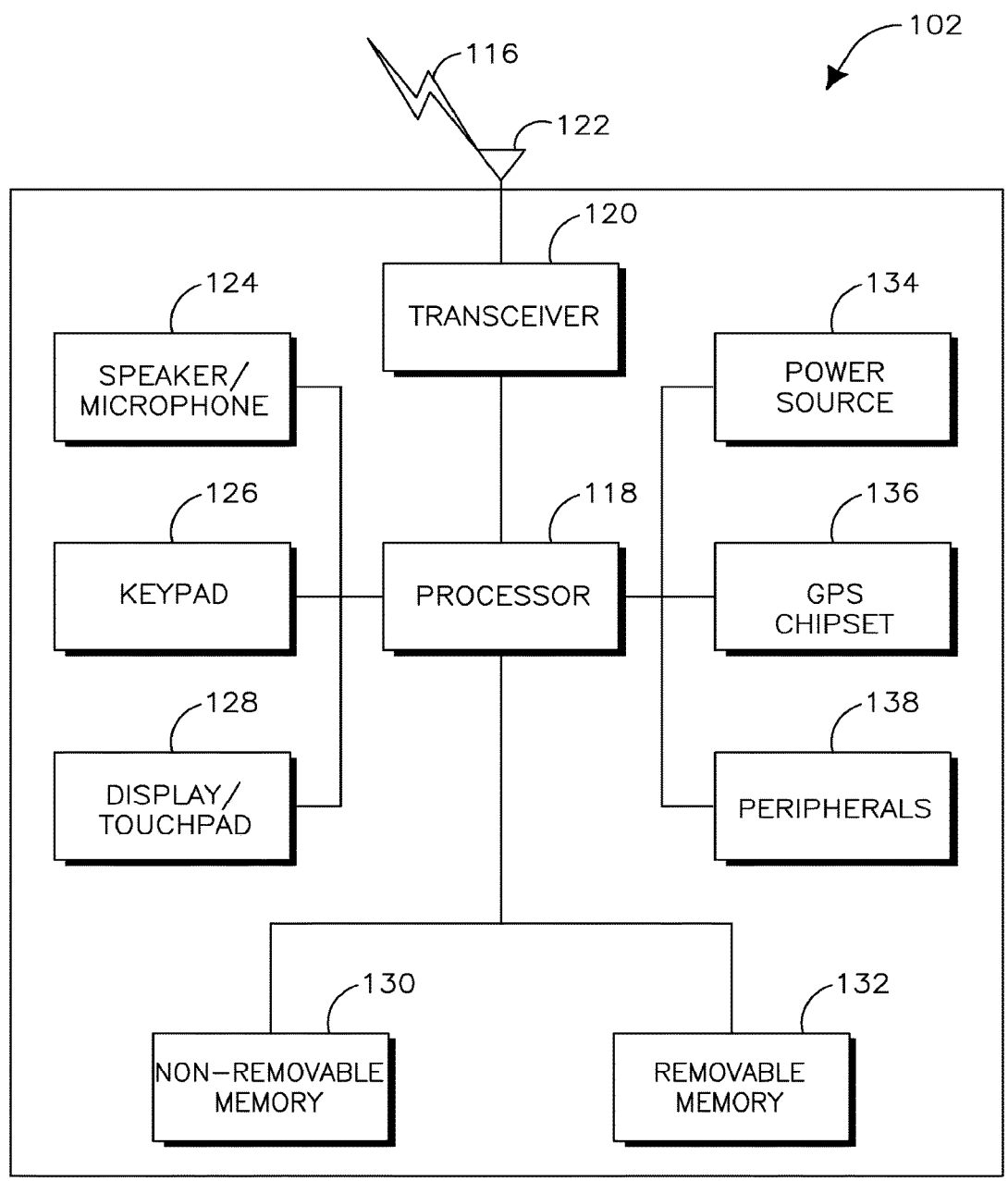
FIG. 1B shows an example wireless transmit/receive unit (WTRU) that may be used within the communications system shown in FIG. 1A.
Figure 1C:
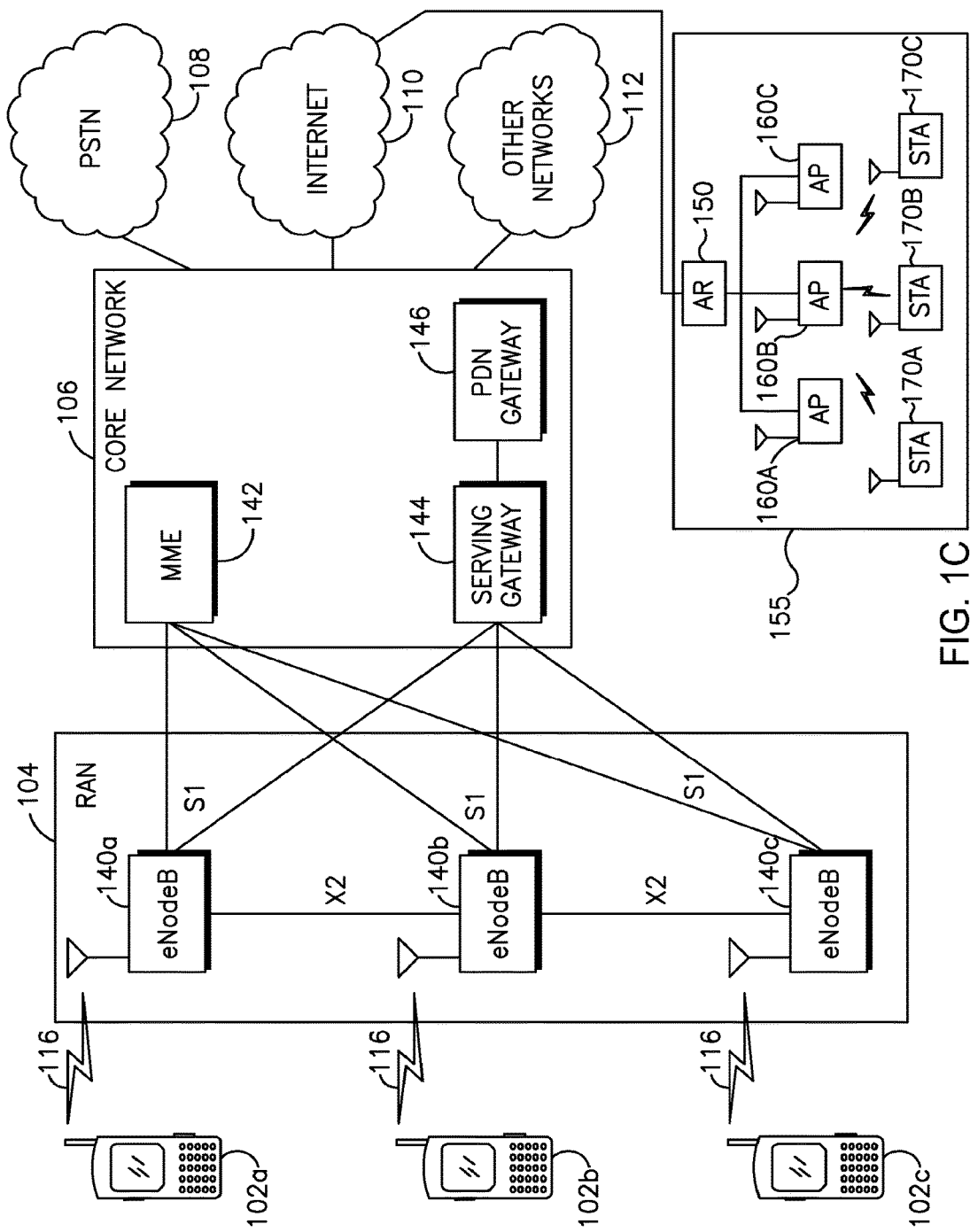
FIG. 1C shows an example radio access network and an example core network that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 10 shows an example RAN 104 and an example core network 106 that may be used within the communications system 100 shown in FIG. 1A. As noted above, the RAN 104 may employ E-UTRA radio technology to communicate with the WTRUs 102a, 102b, 102c over the air interface 116.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 10, the eNode-Bs 140a, 140b, 140c may communicate with one another over an X2 interface.

The core network 106 shown in FIG. 10 may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A packet-based network architecture definition supporting advanced distributed and dynamic mobility management (DMM) features with multiple flows anchored at different gateways is described herein. This architecture may be enabled by using software defined networking (SDN) mechanisms, therefore providing additional flexibility to operators deploying SDN-capable devices, (e.g., supporting OpenFlow) in their networks.

Figure 2:
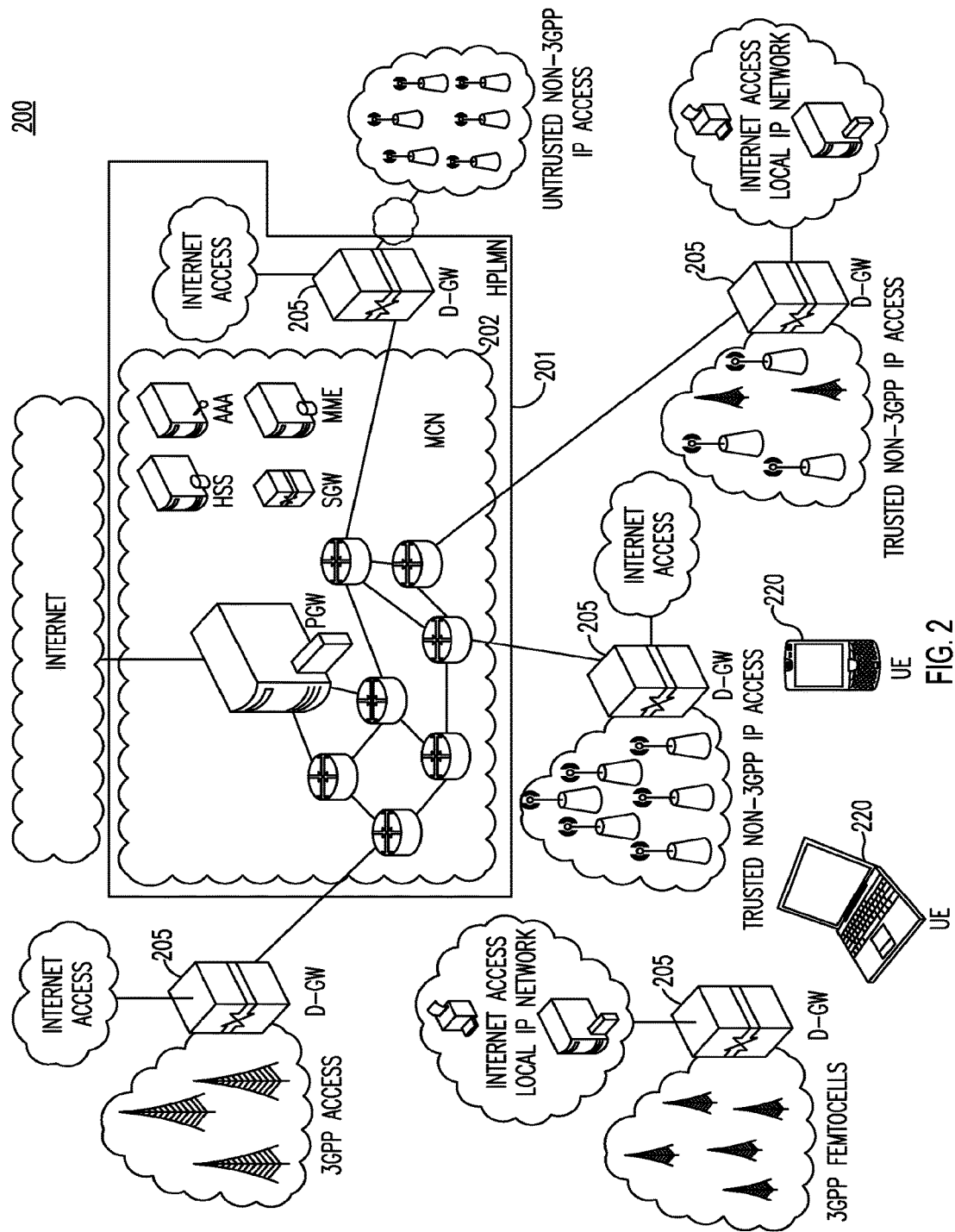
FIG. 2 shows an example of distributed and dynamic mobility management (DMM) architecture.

FIG. 2 shows an example of distributed and dynamic mobility management (DMM) architecture 200. The architecture 200 may include a home public land mobile network (HPLMN) 201 and mobile core network (MCN) 202. In the architecture 200, a distributed gateway (D-GW) 205 logical entity may be placed at the edge of the network, close to a user equipment 220, (e.g., wireless transmit/receive unit (WTRU), or multiple UEs 220). Multiple D-GWs 205 may exist in a DMM domain, anchoring mobility sessions of UEs 220 attached to the domain. In the example DMM architecture 200, it can be seen that various types of networks may be included and in communication with the HPLMN 201. For example, Third Generation Partnership Project (3GPP) access cells and femto cells, and trusted and/or untrusted non-3GPP IP access cells, any of which may have Internet access and/or local IP network access are various types of example networks that may be included. In addition, the MCN 202 may be connected to the Internet.

Figure 3:
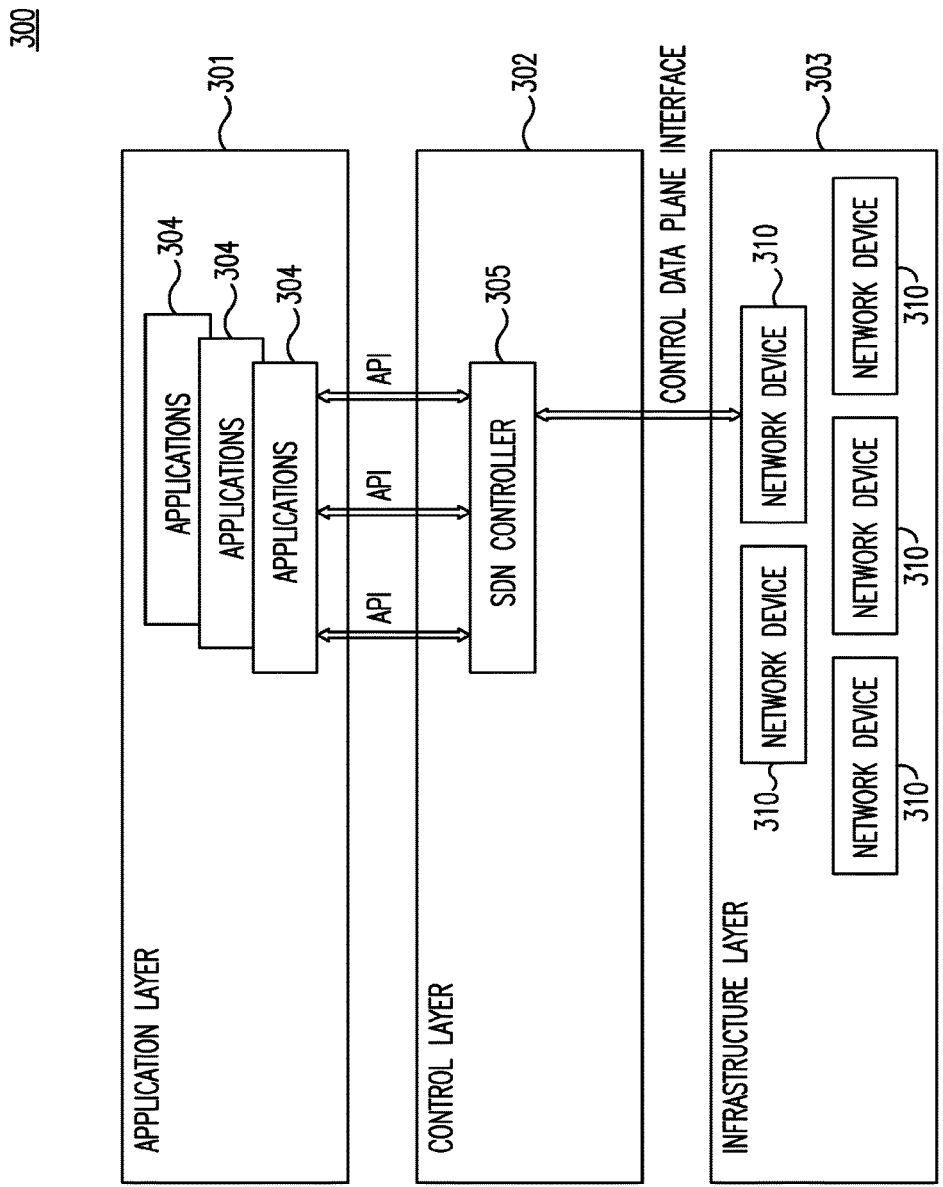
FIG. 3 shows an example of an SDN architecture.

FIG. 3 shows an example of software defined networking (SDN) architecture 300. The SDN architecture 300 includes an application layer 301, control layer 302 and an infrastructure layer 303. The application layer 301 may include applications 304. The intelligence of the SDN architecture 300 may be centralized in a software-based SDN controller 305 included in the control layer 302, which has a global view of the network and is capable of controlling, in a vendor-independent way, a plurality of network devices 310, included in the infrastructure layer 303. The network devices 310 may or may not be required to implement and understand many different network protocols standards, but may provide the needed functionality by accepting instructions from SDN controller 305. A significant amount of time and resource savings may be effected, as the network behavior may be much easily controlled and modified by programming it in the centralized controller 305 rather than writing complex and long configuration files in many different devices scattered across the network. The applications 304 may communicate with the SDN controller 305 over an application programming interface (API), while the SDN controller 305 may communicate with the network devices 310 via a control data plane interface, such as OpenFlow.

OpenFlow is an example of a protocol for the interface between control and forwarding layers. The apparatus and procedures described herein are not limited to OpenFlow. Additionally, some of the mechanisms described herein may require functionalities being currently specified in OpenFlow, (such as IPv6 support or L3 tunneling).

The mobility management schemes standardized by the Internet Engineering Task Force (IETF) for IPv6 networks are extensions or modifications of the Mobile IPv6 protocol (MIPv6), such as proxy mobile IPv6 (PMIPv6), dual stack mobile IPv6 (DSMIPv6) and hierarchical mobile IPv6 (HMIPv6). However, they come at the cost of handling operations at a cardinal point, the mobility anchor, and burdening it with data forwarding and control mechanisms for a great amount of users. This node may be far away from the edge and deep into the core network, and although with the latter standard it was proposed to split the management hierarchically, this may shift the problem close to the edge without really addressing the flat IP architecture demand.

DMM may support the concept of a flatter system, in which the mobility anchors are placed closer to the user, distributing the control and data infrastructures among the entities located at the edge of the access network.

Centralized mobility solutions, such as mobile IPv6 or the different macro-level mobility management solutions of 3GPP evolved packet system (EPS), may base operations on the existence of a central entity (e.g., home agent (HA), local mobility agent (LMA), packet data network (PDN) gateway (PGW) or gateway general packet radio service (GPRS) support node (GGSN)) that may anchor the IP address used by the mobile node and is in charge of coordinating the mobility management (MM). The central entity may also be aided by a third entity such as a mobility management entity (MME) or the home subscriber server (HSS). This central anchor point may be in charge of tracking the location of the UE and redirecting its traffic towards its current topological location.

While this way of addressing mobility management has been fully developed by the mobile IP protocol family and its many extensions, there are also several limitations that have been identified.

For sub-optimal routing, since the (home) address used by a mobile node may be anchored at the home link, traffic may traverse the home agent, which may lead to paths that are, in general, longer than the direct one between the mobile node and its communication peer. This may be exacerbated with the current trend in which content providers push their data to the edge of the network, as close as possible to the users. With centralized mobility management approaches, user traffic may need to go first to the home network and then to the actual content location, adding unnecessary delay and wasting operator's resources. In a distributed mobility architecture, data paths may be shorter as the anchors are located at the very edge of the network, (i.e., close to the user terminal).

For scalability problems, with current mobility architectures, networks may be dimensioned to support all the traffic traversing the central anchors. This may pose several scalability and network design problems, as the central mobility anchors may need to have enough processing and routing capabilities to be able to deal with all the mobile users' traffic simultaneously. Besides, the operator's network may need to be dimensioned to be able to cope with all the users' traffic. A distributed approach may be inherently more scalable, as the mobility management tasks are distributed and shared among several network entities, which therefore may not need to be as powerful as the centralized alternative.

For reliability, centralized solutions may share the problem of being more prone to reliability problems, because the central entity is a potential single point of failure.

Fine granularity may be lacking on the mobility management service. With current centralized mobility management solutions, mobility support may be offered at a user granularity. Thus, the network may determine if mobility is provided or not to the user, but may not offer a finer granularity, for example, to allow part of the traffic of a user not to be handled by the mobility solution. There are many scenarios in which part or all the traffic of a user may not need to be mobility enabled, as for example when the user is not mobile, (at least during the lifetime of the communication), or the application itself is able to effectively deal with the change of IP address caused by the user movement. In all these situations, it may be more efficient not to enable mobility.

Signaling overhead may be related to the previous limitation. Any mobility management solution may involve a certain amount of signaling load. By allowing mobility management to be dynamically enabled and disabled on a per application basis, some signaling may be saved, as well as the associated handover latency. This may depend on the particular scenario, as the use of distributed mobility architectures may also lead to a higher signaling load in case of very dynamic scenarios in which all of the traffic may be mobility enabled There are several solutions that may be capable of solving some of the aforementioned problems, such as mobile IP route optimization (RO), IP flow mobility (IFOM), 3GPP local IP access (LIPA) and selected IP traffic offload (SIPTO) or the LIPA mobility and SIPTO at the local network (LIMONET) extensions. However, the highly hierarchical and centralized nature of existing mobile networks may make it more difficult for the solutions to fully solve the issues of the mobile networks and may define extension patches that locally mitigate the identified problems.

DMM solutions may follow the classical approach of defining and/or adapting IP mobility protocols which have a coupled control and data plane. An SDN-based DMM solution is described herein based on the defined evolutionary 3GPP architecture, but follows the SDN paradigm.

The SDN paradigm may be implemented in different deployments, due to the increased flexibility it enables. While SDN has been first designed for fixed environments, the use of SDN in mobile networks is also being considered. Within this scope, an SDN-enabled DMM approach provides the following advantages as compared to a "classical DMM" solution. There may be no need of IP tunneling, thereby saving resources, there will be less signaling, there may be no need for specific protocol support in the network, but just on the SDN controller (which has to be DMM enabled), as the rest of the network entities just need to be SDN capable, easier and faster support for protocol updates and modifications, and easier inter-operator support.

Figure 4:
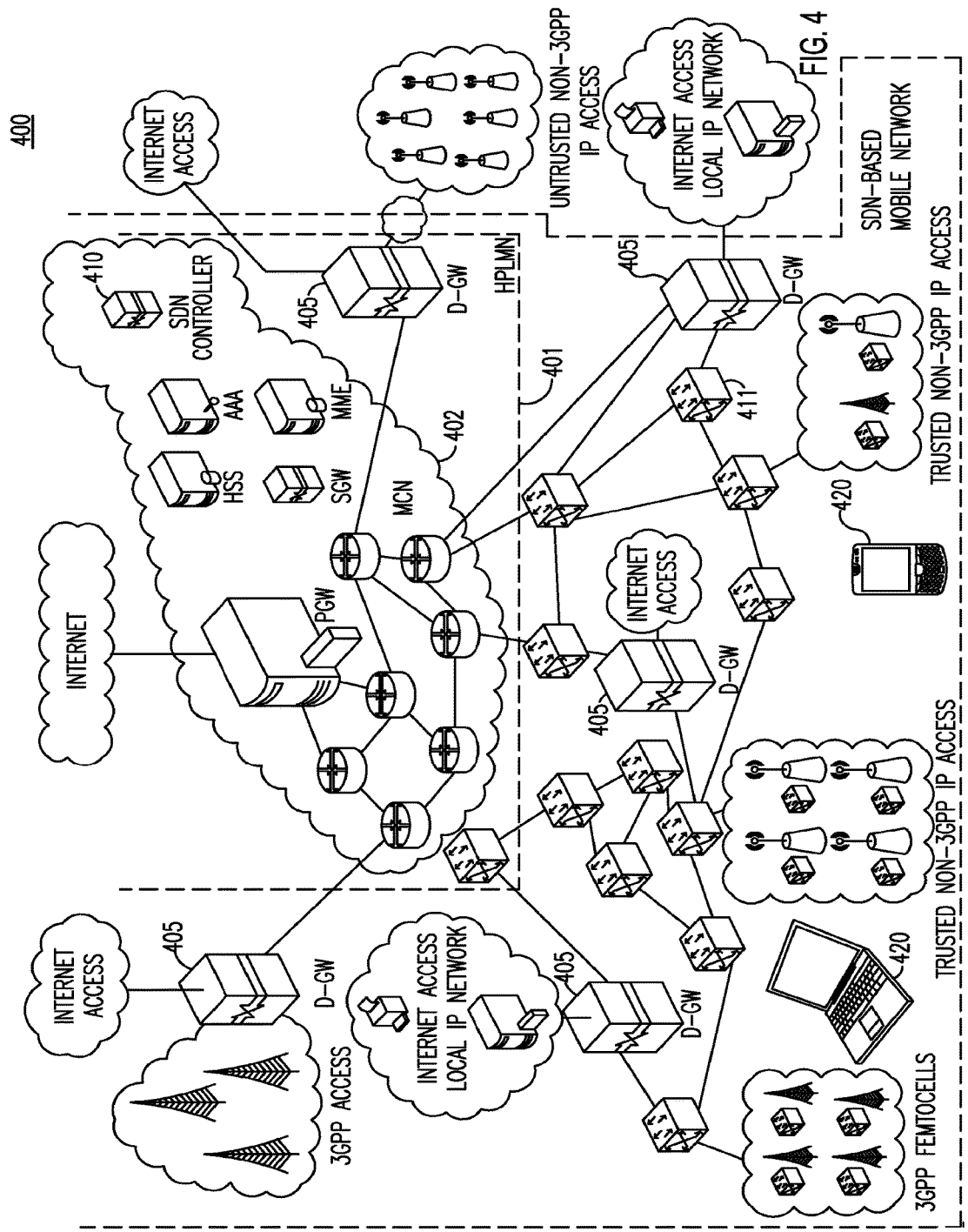
FIG. 4 shows an example of an SDN-DMM architecture.

FIG. 4 shows an example of an SDN-DMM architecture 400, which serves as the general framework of enabling DMM by using an SDN approach. The SDN-DMM architecture 400 includes an HPLMN 401, MCN 402, a plurality of D-GWs 405, and SDN controller 410, and plurality of switches 411. The D-GWs 405 may play the role of IP anchor and may offload some traffic from the core network. The D-GWs 405 may be collocated with existing 3GPP nodes or deployed as standalone entities. All of the 3GPP network entities involved in the data forwarding plane, (e.g., evolved Node-Bs (eNBs), IEEE 802.11 access points (APs), femtocells, D-GWs, internal routers and switches, PGWs/GGSNs and serving GPRS support nodes (SGSNs)/serving gateways (SGWs) may be SDN capable. The SDN controller 410 may be collocated with an existing 3GPP entity (such as the HSS or the MME).

Figure 5:
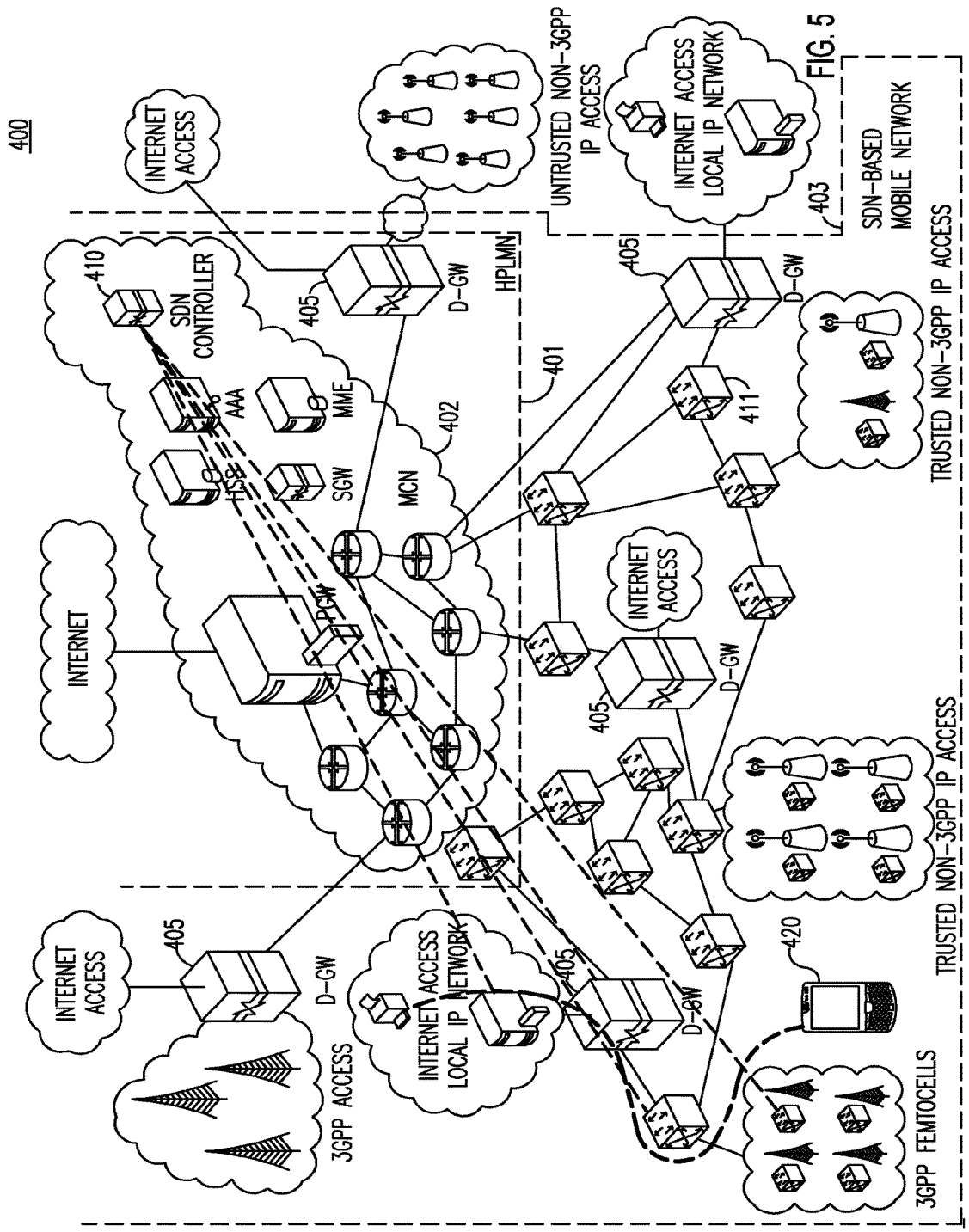
FIG. 5 shows an example of an SDN-DMM procedure for an initial attachment.
Figure 6:
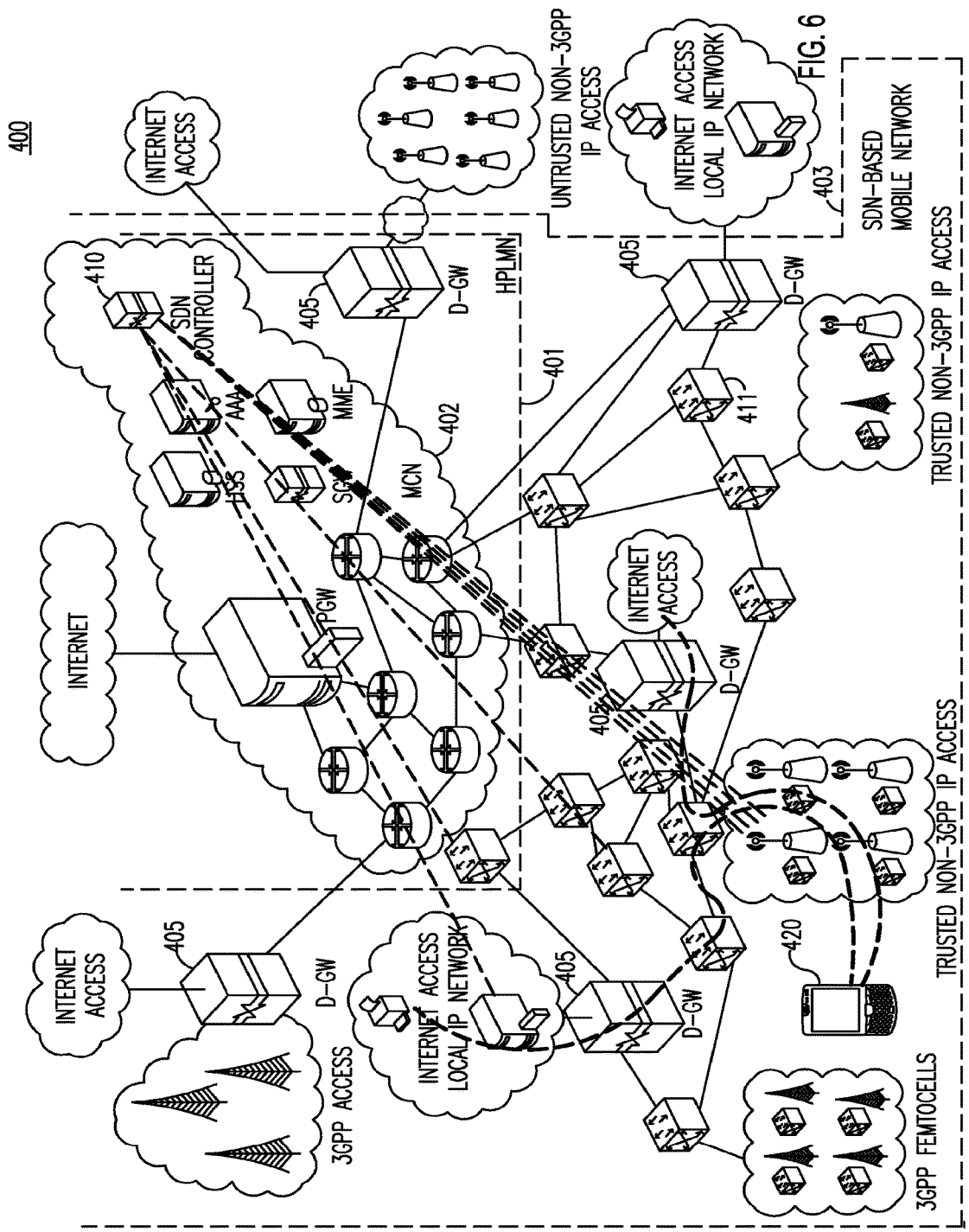
FIG. 6 shows an example of an SDN-DMM procedure for an inter-anchor handover.

FIG. 5 shows an example of an SDN-DMM procedure for an initial attachment. FIG. 6 shows an example of an SDN-DMM procedure for an inter-anchor handover. Both FIGS. 5 and 6 are substantially similar to the example architecture 400 as shown in FIG. 4.

When a UE 420 attaches to the network and requests a PDN connection, this signaling may be captured by the layer 2 (L2) SDN attachment point, (e.g., the first SDN-enabled data forwarding entity, which may be programmed centrally by the SDN controller 410), and is forwarded to the SDN controller 410. The SDN controller 410 may have a secure communication channel with every SDN-capable device in the network, allowing the monitoring and configuration of the different devices. For purposes of example, the first SDN-enabled data forwarding entity as shown in FIG. 5 is the base station switch in the 3GPP femtocell, however any SDN-enabled data forwarding entity could be the first SDN-enabled data forwarding entity. In addition, the UE 420 could attach first to a non SDN-enabled device.

The SDN controller 410, which may have the global view of the network, may determine which is the best suitable anchor for the requested PDN connection and UE 420. This determination may take into consideration many different aspects, such as the position of the UE 420, its expected mobility pattern, the characteristics of the requested PDN connection, and the application requesting it, (mobility requirements, expected lifetime, and the like), among other aspects. The selected anchor may be a D-GW 405 or a centralized P-GW. The determination may be undertaken by the SDN controller 410 itself, (i.e., network-based), by another centralized entity in the network (also network-based), or even by the terminal (client-based).

The SDN controller 410, based on the selected anchor, may configure the data forwarding in all required network entities, (shown by the light dashed lines between the SDN controller 410 and the example entities in FIG. 5), so that there is a data path between the UE 420 and the anchor, and between the anchor and the operator's network devices providing connectivity to the services requested by the UE 420 (e.g., to the Internet, or to a local IP network). The data path between the UE 420 and the anchor may not be symmetric. In the example shown in FIG. 5, the data path is shown by the dark dashed line, which proceeds from the UE 420 to the D-GW 405 shown through the switch 411 shown in FIG. 5.

The UE 420 may finalize the L3 connection/association, and may configure an IP address anchored at the selected anchor. The selected anchor may be a D-GW 405 closer to the UE 420, and the configured IP address may be locally anchored at the D-GW. In this way, traffic may not traverse the operator's core.

If the UE 420 performs a handover as depicted in FIG. 6, the handover signaling may again be forwarded to the SDN controller 410, which may decide if a new anchor has to be selected. If no new anchor is selected, the SDN controller 410 may configure the data forwarding plane in the network, (e.g., using OpenFlow), so that traffic may be exchanged between the anchor and the UE.

If a new anchor is selected, the SDN controller may configure the network (using OpenFlow) so that both the traffic using the IP address anchored at the former anchor may reach the UE 420 at its new location, as well as a new path may be established between the UE 420 and the new anchor. This new path, again depicted by a second dark dashed line in FIG. 6, may be used by the new anchor to provide a new IP address to the UE, which may use it for new communications. Again, this path may be asymmetric.

The SDN controller is in charge of configuring the data forwarding path, (depicted by the light dashed lines in FIG. 6), to ensure that the UE 420 may also use the new IP address. No tunnels are required between the anchor and the current point of attachment, nor between anchors, as the data forwarding may be dynamically updated using SDN, (e.g., OpenFlow protocol between the controller and the network programmable switches/routers).

If more handovers are performed, the same procedure may be repeated, selecting, if needed, a new anchor, and configuring the network so there is an L3 link between the UE 420 and each of the active anchors. From the point of view of the UE 420, each handover that involves a new anchor selection may be treated as if a new router was turned on in the network and a new IPv6 address is configured.

Different procedures are described following the paradigm of an SDN-DMM solution. Different approaches may be adopted depending on the deployment model that is used and the specific support available on the network nodes.

Figure 7:
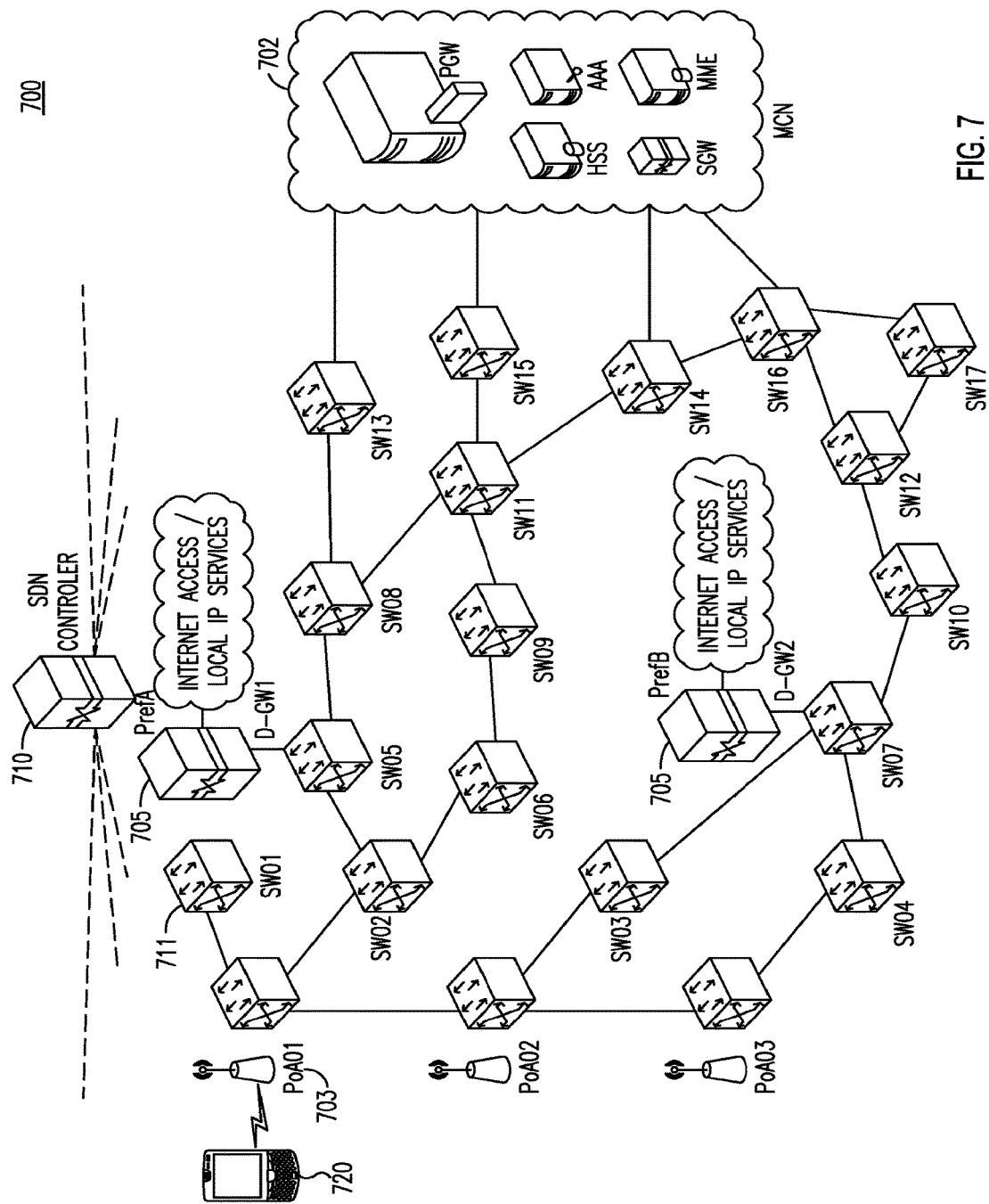
FIG. 7 shows an example of a dynamic anchoring and preconfigured IP addressing SDN-DMM overview.

FIG. 7 shows an example of a dynamic anchoring and preconfigured IP addressing SDN-DMM overview 700. As shown in FIG. 7, an MCN 702, a plurality of Points of Access (PoA01, PoA02, and PoA03) 703, D-GWs (D-GW1 and D-GW2) 705, a SDN controller 710, switches 711 (SW01-SW17), and a UE 720 are included. The MCN 702 is connected to several switches, (e.g., SW13-16), and the UE 720 is shown in communication with PoA01. Dynamic anchoring using regular IP routers as anchors may provide a procedure that minimizes extra required support in addition to SDN-capable L2/L3 switches and regular IP routers (used as anchors). Several D-GWs may be deployed in the access network, composed of network switches (SWs) which may be SDN-capable. The D-GWs may have direct connectivity to the Internet and/or to local IP services, allowing local breakout to be provided to the UEs. Each D-GW may manage at least one locally anchored IPv6 prefix, which may be preconfigured in advance, and may be available for UEs to auto-configure IP addresses from, (either using stateless or stateful IP address auto-configuration mechanisms). The D-GW may not perform any specialized function, and may basically acts as a L3 router. By using SDN, the network may provide seamless IP mobility to attaching UEs. Each D-GW 705 may advertise a prefix that is used by the UE 720 to auto configure an IP address. For example, when the UE 720 connects to D-GW1, it may use an IP address from PrefA::/64, and when connecting to D-GW2, Pref B::/64 may be advertised and used by the UE 720. Additionally, if more than one UE is connected to the same D-GW, each UE may be provided a different prefix for use.

Figure 8A:
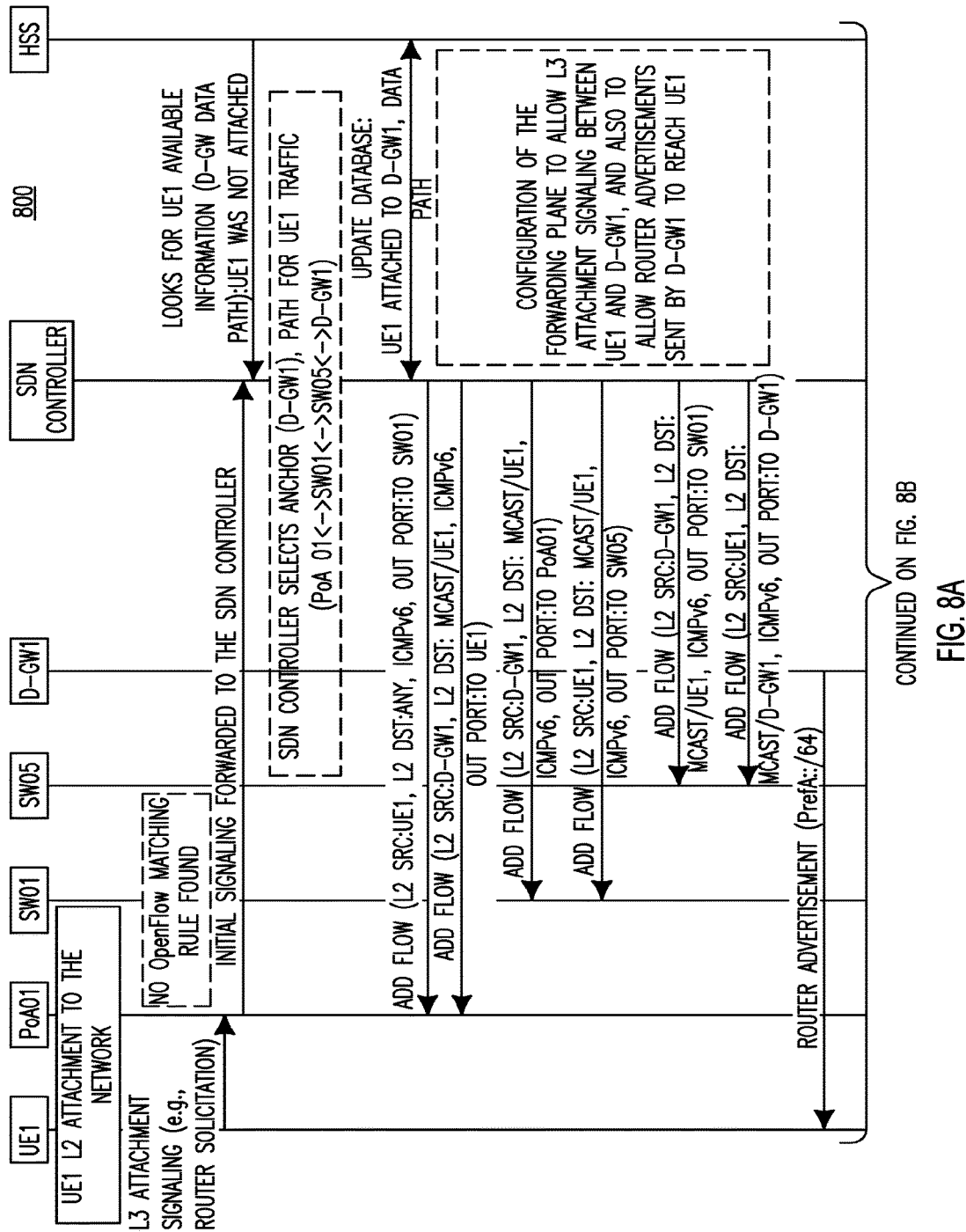
FIGS. 8A-8B show an example of an initial attachment signaling procedure.
Figure 8B:
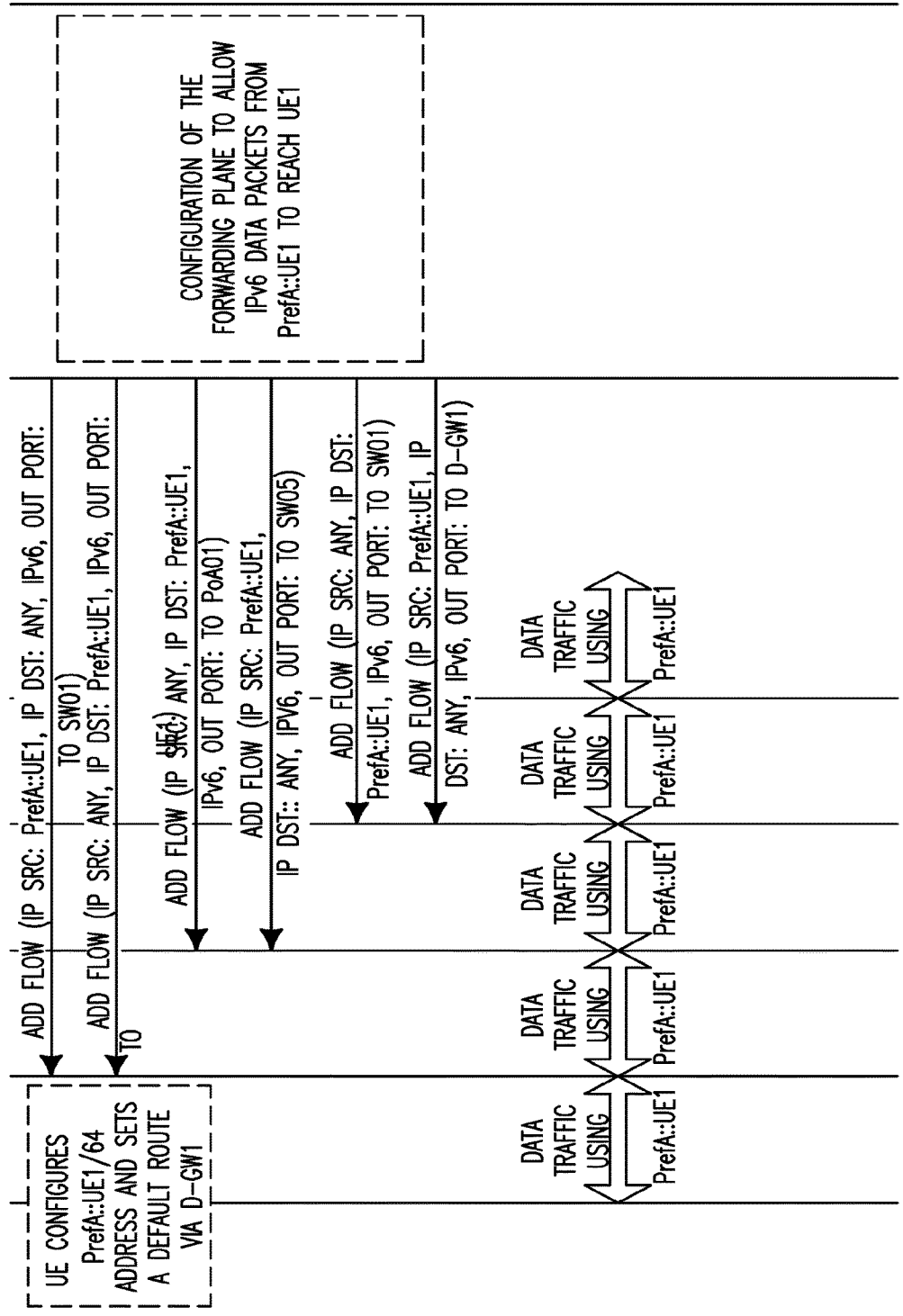

FIGS. 8A-8B shows an example of initial attachment signaling procedure 800 used when a UE initially attaches to the network. As shown in FIGS. 8A-8B, UE1, (which may include any UE or WTRU described above), may attach to the network. Irrespective of the technology utilized to attach, the point of attachment is SDN enabled. This L2 point of attachment (PoA) may be configured, either by default or by a SDN controller upon network bootstrapping, to forward initial attachment signaling (including PDN connection requests) to the SDN controller using a secure SDN channel (e.g., using OpenFlow).

The SDN controller may check if UE1 is already attached to the network. This may be done by consulting an external mobility database (e.g., the HSS) or internal database. The first model may facilitate deployment models in which either not all the network is SDN capable, or the support of hierarchical controllers for large domains. If the UE1 has just attached to the network (there is no previous active communications), the SDN controller may decide the best D-GW, (or just an anchor, in a more general case), to serve UE1, based on its knowledge of the network status, network capabilities, and the like. In this case, D-GW1 may be selected, and the SDN controller may update the internal/external mobility database with the selected D-GW, and also may include information about the data plane to be configured in the network (so it may be later updated/removed). In this example, the controller may update the HSS, thereby serving the purpose of allowing compatibility with non-SDN parts of the network. The use of the HSS is an example entity, utilizing the 3GPP architecture as a reference technology, but it may be a different node, where a logical mobility database of the information about attached UEs, associated IP prefixes and responsible D-GWs may be stored.

Then, the SDN controller may configure the forwarding plane to allow the L3 signaling (e.g., router solicitation) to reach D-GW1. D-GW1 may be preconfigured to allocate PrefA::/64 for IP address autoconfiguration. Stateless address autoconfiguration may be used in this example, but stateful mechanisms such as DHCPv6 may also be used.

UE1 may configure an IP address (PrefA::UE1/64) out of the prefix advertised by D-GW1, and configure D-GW1 as its default router. The SDN controller may configure the forwarding plane to allow the IPv6 data packets to be forwarded between UE1 and D-GW1, following the path UE1⇔PoA 01⇔SW01⇔SW05⇔D-GW1. While in this example symmetric paths are used, the controller may have selected different paths from UE1 to D-GW1, and from the D-GW1 to UE1, depending for example on the network conditions. From this point, traffic from the UE1 may be forwarded from the L2 PoA towards D-GW1, and from there to the next hops towards the final destination.

The selected D-GW may not be collocated with the L2 PoA, but that deployment configuration is also possible. The SDN controller may be a logical entity that may also be collocated with different network entities, such as the HSS.

FIGS. 8A-8B show detailed examples of control data plane interface signaling messages (using OpenFlow as an example). These messages may show the most relevant parameters, but there may be other fields, such as the lifetime of the flow entries that omitted, as they may be selected based on the particular network deployment. Similarly, the flow configurations shown may be based on L2 and L3 source and destination addresses. A different set of flow match fields may be used, such as the switch ingress port, or may be based upon L2 and/or L3 addresses, for example.

The OpenFlow message names are not shown in FIGS. 8A-8B. However, more generic names may be applied to other control protocols. For example, when "Add flow" is used, the OpenFlow message may be a controller-to-switch modify-state message with an OFPFC_MODIFY command. It should again be noted that the signaling shown in FIGS. 8A-8B is exemplary, and that alternative signaling may be utilized.

Figure 9A:
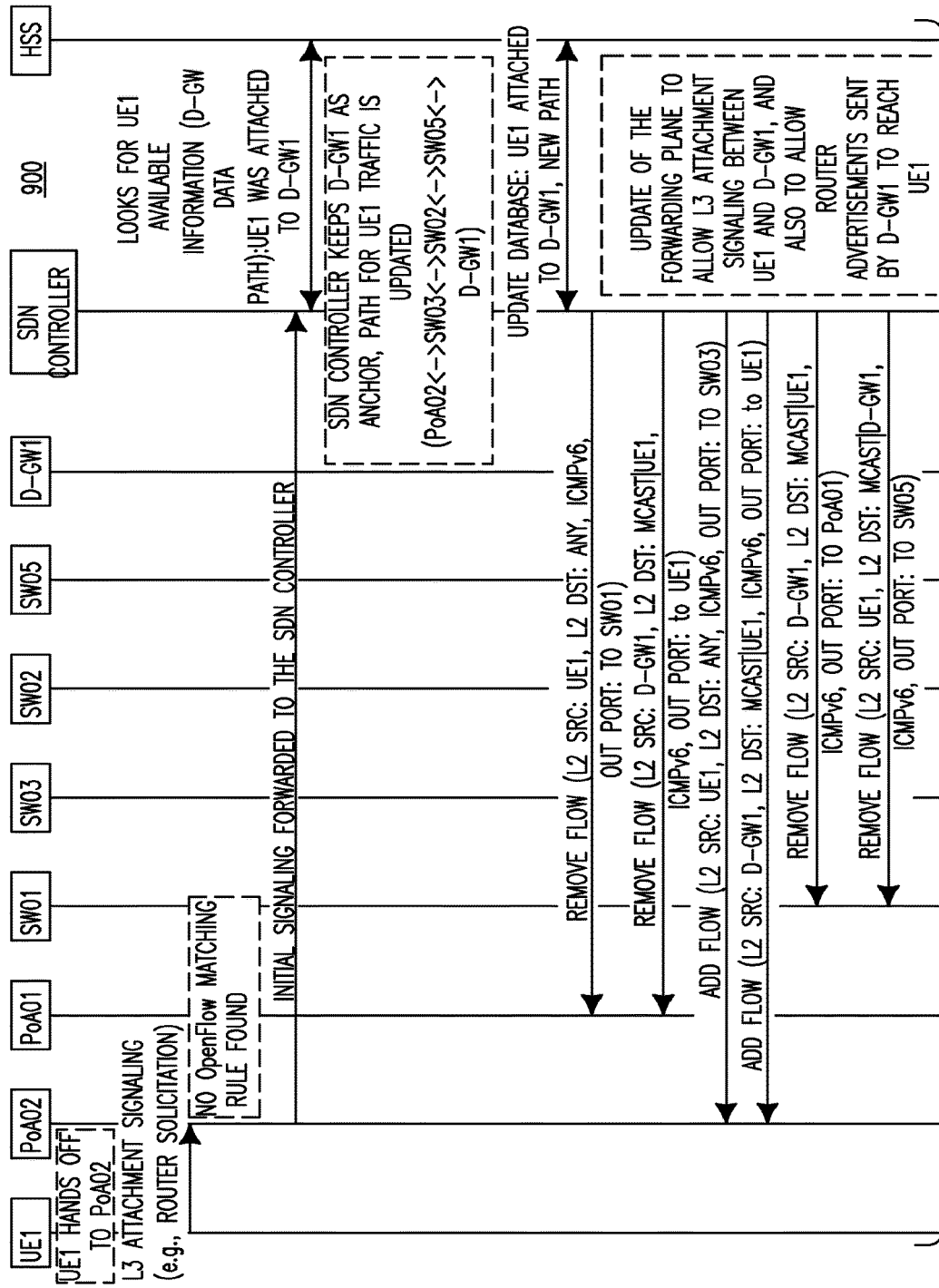
FIGS. 9A-9C show an example of an intra distributed gateway (D-GW) handover signaling procedure.
Figure 9B:
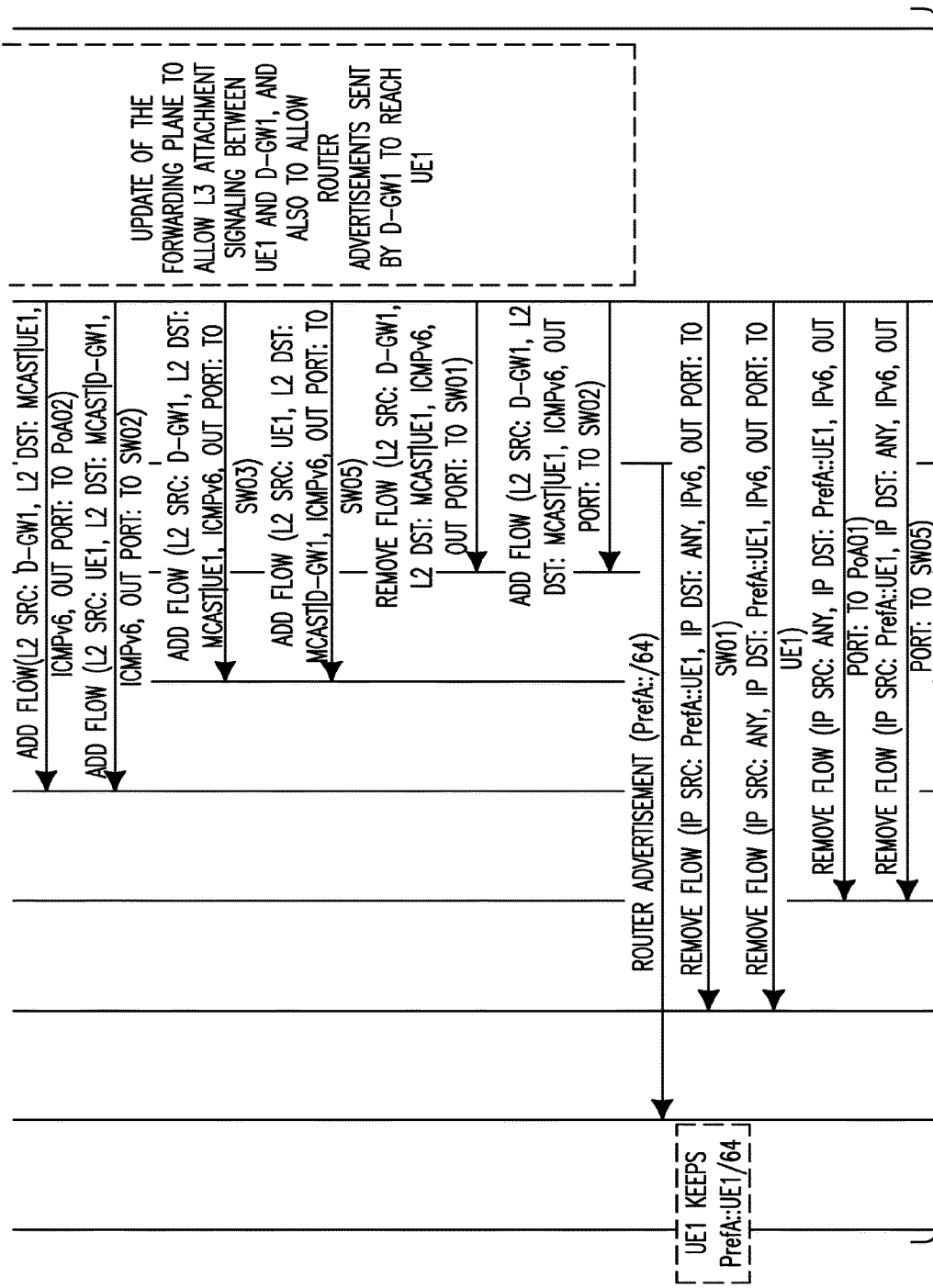
Figure 9C:
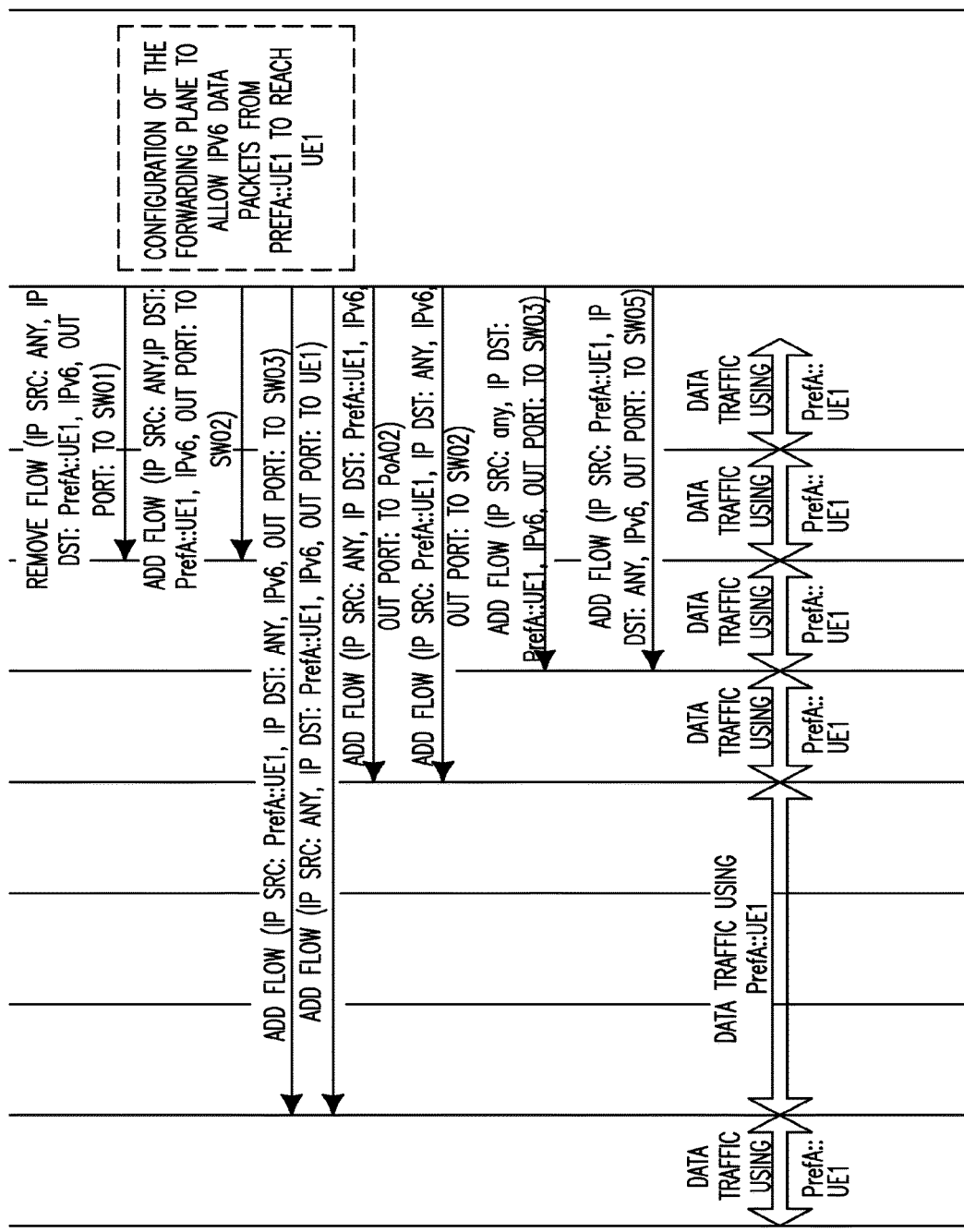
Figure 10A:
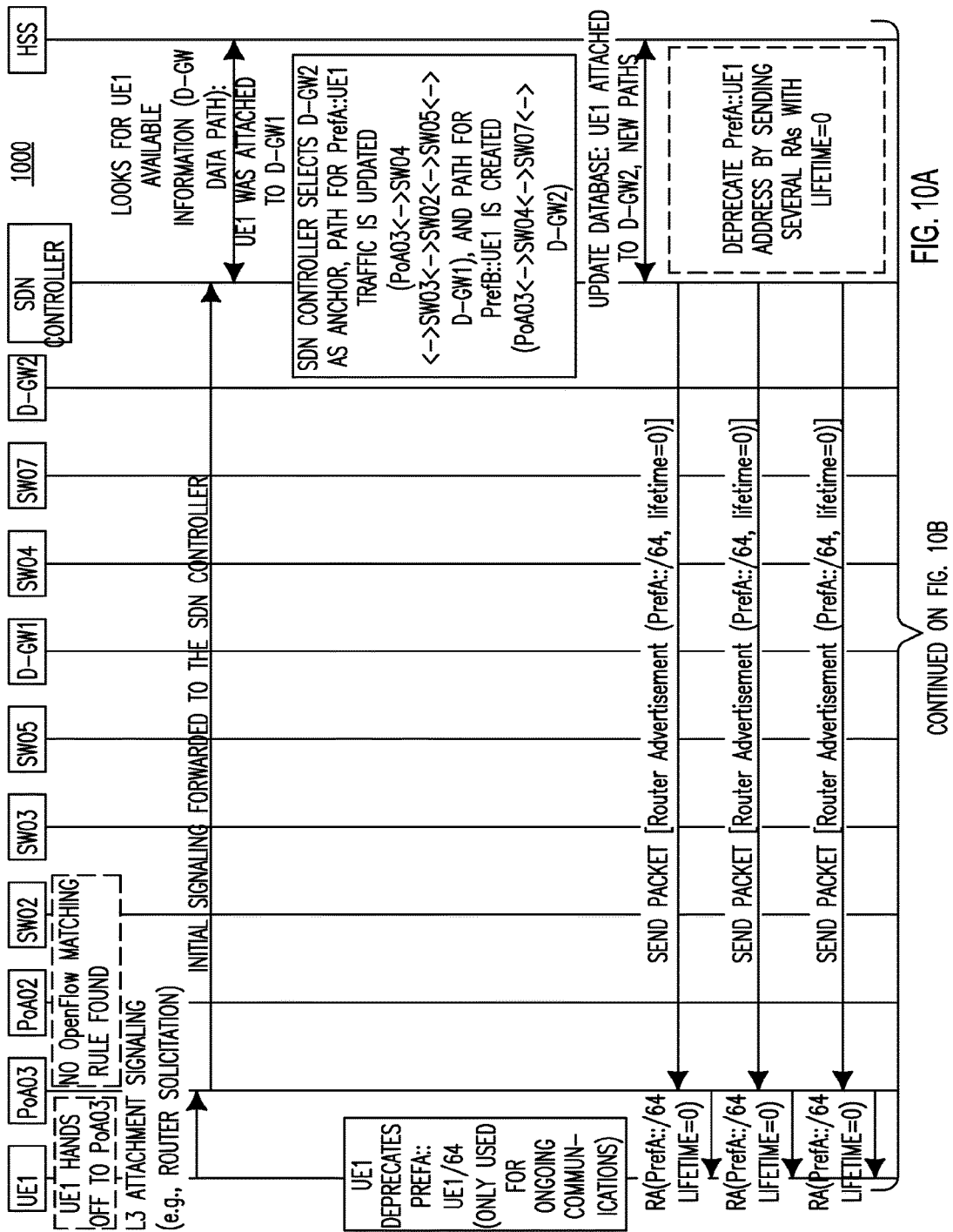
FIGS. 10A-10D show an example of an inter D-GW handover signaling procedure.
Figure 10B:
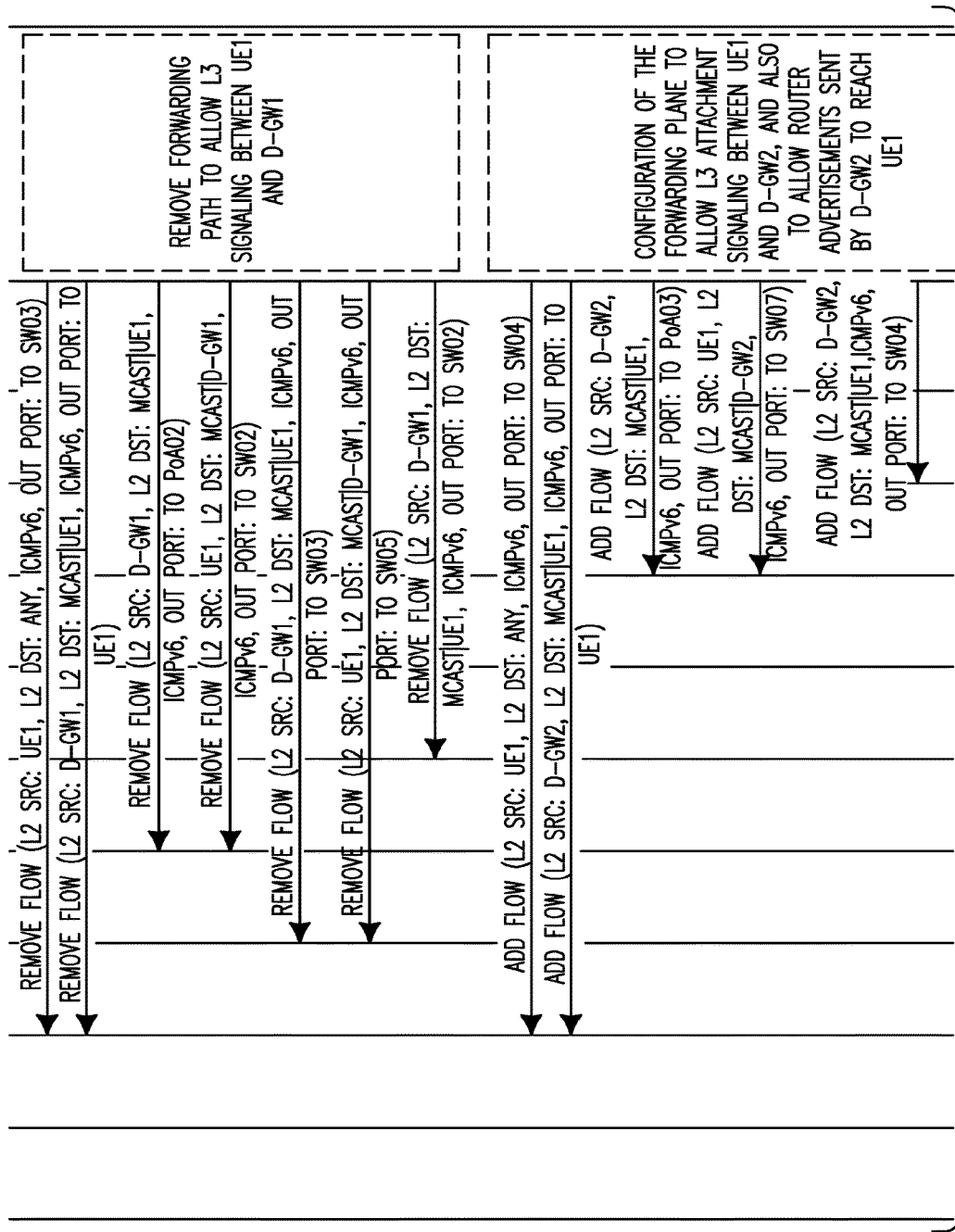
Figure 10C:
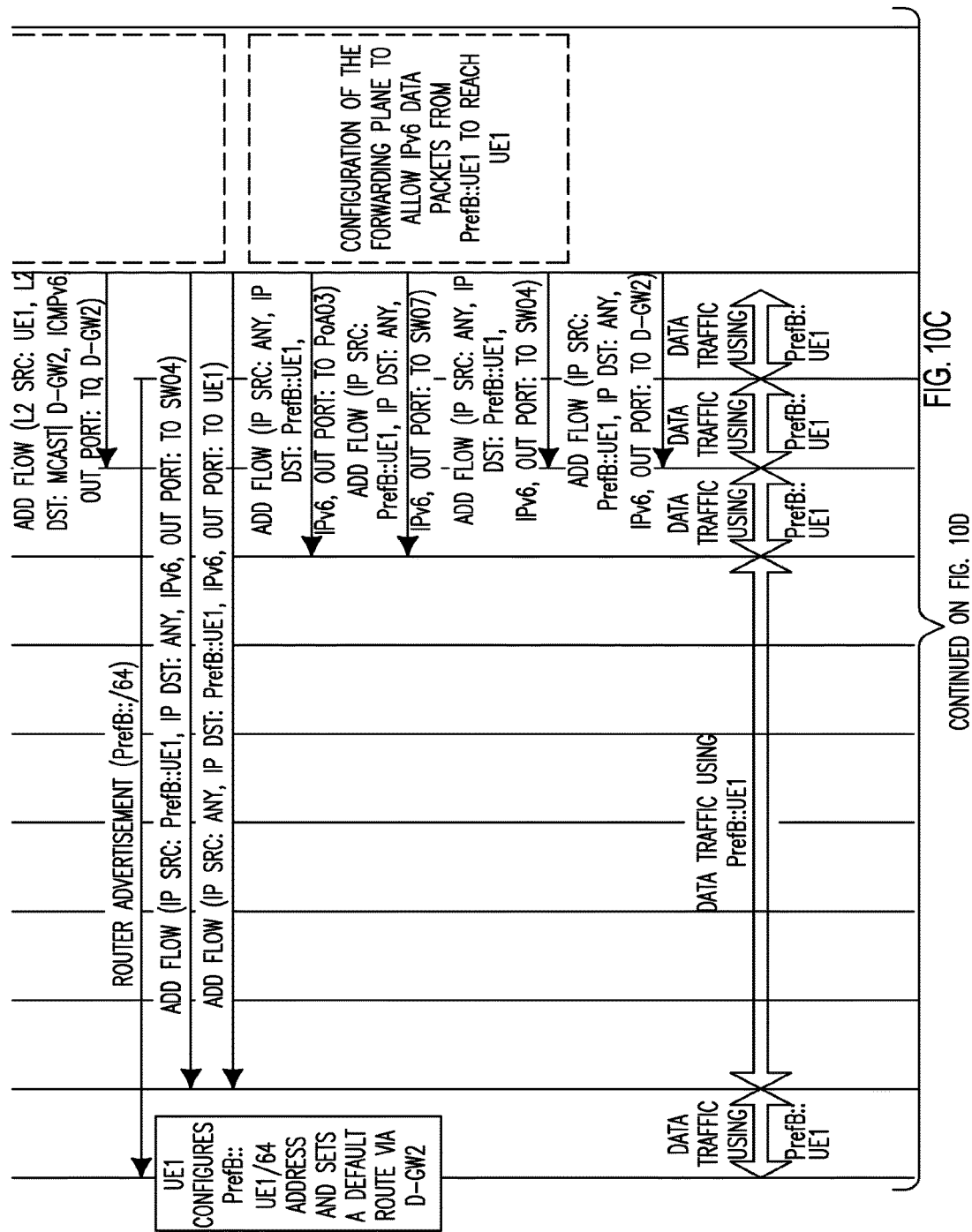
Figure 10D:
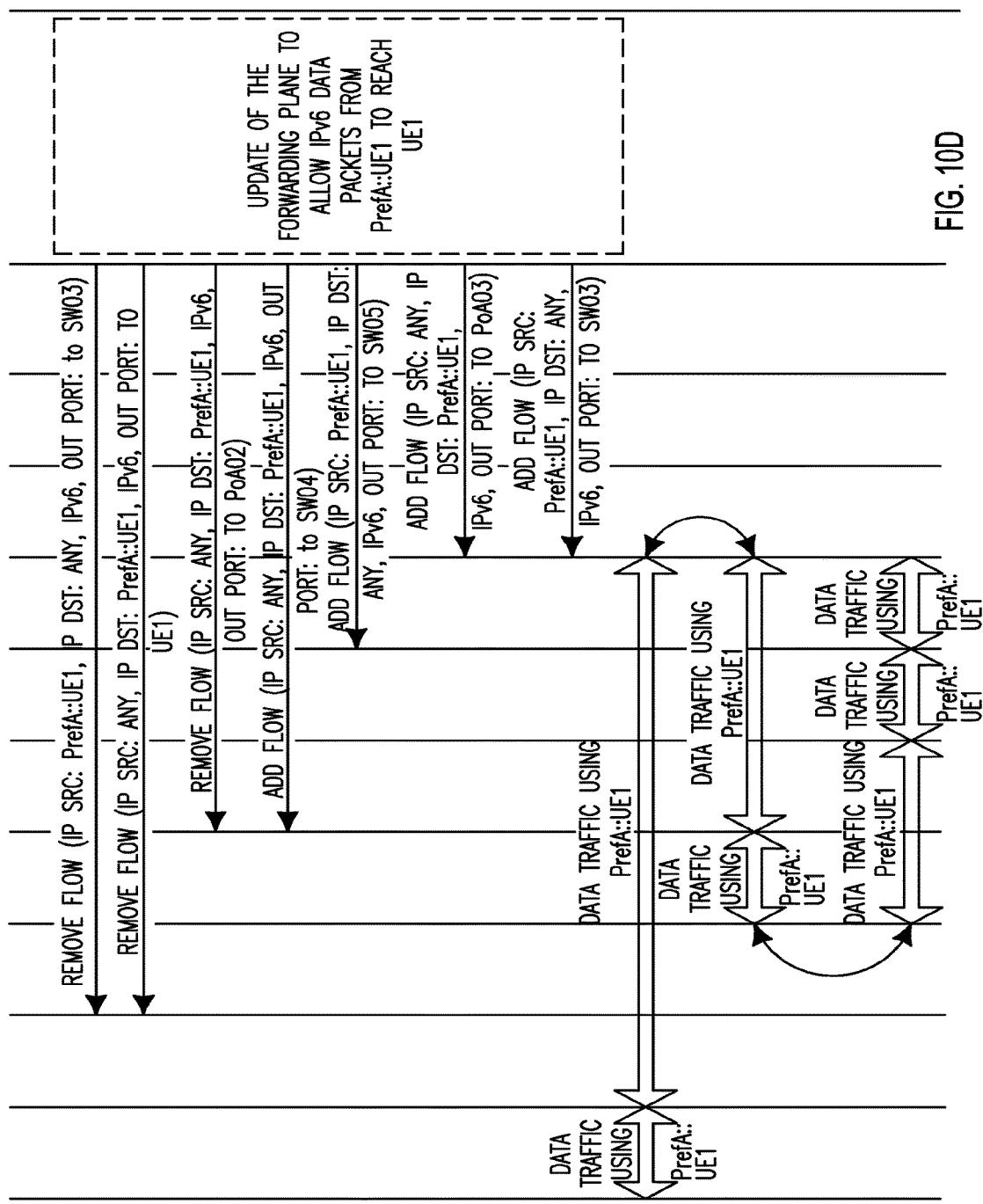

FIGS. 9A-9C show an example of an intra D-GW handover signaling procedure 900, where the UE may change its L2 point of attachment, but may still be managed by the same D-GW. The procedure is similar to the initial attachment procedure 800. When UE1 attaches to the new PoA (PoA02), the latter may be configured to forward this initial attachment signaling to the SDN controller. The SDN controller may check if UE1 was initially attached to the network (this may involve communication with an external mobility database, such as the HSS). In this example, UE1 was previously attached to the network (i.e., it is a handover case, not an initial attachment to the network) and it may have one active prefix, managed by D-GW1. The SDN controller may determine that the anchor remains to be D-GW1 based on different kinds of information that may include, but are not restricted to, network status, load, known mobility patterns of UE1, and the like.

Since the topological location of the UE1 has changed and the assigned serving D-GW remains the same, the SDN controller may update the forwarding data plane to allow L3 signaling to be delivered between D-GW1 and UE1, in this case following a different path: UE1⇔PoA02⇔SW03⇔SW02⇔SW05⇔D-GW1, in accordance with the signaling depicted in FIGS. 9A-9C. The same prefix (PrefA::/64) may continually be advertised to UE1, which enables UE1 to maintain the same IP address (PrefA::UE1) and default gateway.

The SDN controller may also update the forwarding plane to allow the IPv6 data packets to be forwarded between UE1 and D-GW1, following the new path UE1⇔PoA02⇔SW03⇔SW02⇔SW05⇔D-GW1. In both cases, the update may involve removing the flow entries that were added during the attachment to PoA01 and adding the new ones. From this point, traffic from UE1 may be forwarded from the PoA02 towards D-GW1, and from there to the next hops towards the final destination. UE1 may not be aware of any L3 mobility as it may be provided with network-based mobility support in a transparent way. It should again be noted that the signaling shown in FIGS. 9A-9C is exemplary, and that alternative signaling could be utilized.

FIGS. 10A-10D show an example of an inter D-GW handover signaling procedure 1000 for the case of a UE handover which involves the selection of a new D-GW. As in the previous cases, when UE1 attaches to a new PoA, the attachment signaling may be forwarded to the SDN controller, which may check if UE1 has any active prefix and performs D-GW selection. In this case, a new D-GW may be selected (D-GW2). Since the anchor has changed, a new IP prefix may be assigned to UE1, and the old one may be deprecated (one or more prefixes may be anchored). In order to deprecate the old IP address (PrefA::UE1), the SDN controller may generate a set of router advertisement (RA) messages with zero lifetime. If OpenFlow is the protocol used by the SDN controller, this may be performed with a packet-out controller-to-switch message. In order to enhance the likelihood that UE1 receives the message, more than one RA may be sent, such as 3 in the example depicted in FIGS. 10A-10D. From this point, UE1 may not use the old IP address for new communications, but continue using them for ongoing communications.

The SDN controller may update the forwarding data plane to allow L3 signaling to be delivered between D-GW2 and UE1, in this case using the following path: UE1⇔PoA03⇔SW04⇔SW07 ⇔D-GW2. Since the anchor may have changed, a new prefix (locally anchored at D-GW2) may be advertised to UE1 (PrefB::/64), which may configure a new IP address (PrefB::UE1) and default gateway (D-GW2).

The SDN controller may also update the forwarding plane to allow the IPv6 data packets to be forwarded between UE1 and D-GW1, ensuring that ongoing sessions using the IP address PrefA::UE1 follows the new path UE1⇔PoA03⇔SW04⇔SW03⇔SW02⇔SW05⇔D-GW1. Traffic using PrefA::UE1 may be forwarded from PoA03 towards D-GW1, and from there to the next hops towards the final destination. In this way, UE1 may keep using the old address for ongoing communications, while using the new IP address (PrefB::UE1) for new communications.

No additional support is required on the UE. The selection of a new D-GW for new communications and the interruption of using the old D-Gw(s), once active communications using prefixes anchored by other D-GW(s) are finished, may be achieved using standardized IPv6 mechanisms. From the point of view of the UE, it may be equivalent to having new IP routers appearing and disappearing from the link (and deprecating their addresses as in a renumbering process). Although the network may need to implement new functionality, and the SDN controller may need to have this intelligence, the rest of the network may just need to be SDN-capable, (no DMM specific functionality is required).

In all of the aforementioned procedures, tunneling may not be required between D-GWs to ensure address reachability due to the use of dynamic L2 forwarding reconfiguration, which may allow SDN-capable network entities to be easily and quickly updated to perform forwarding on a per flow level.

Figure 11A:
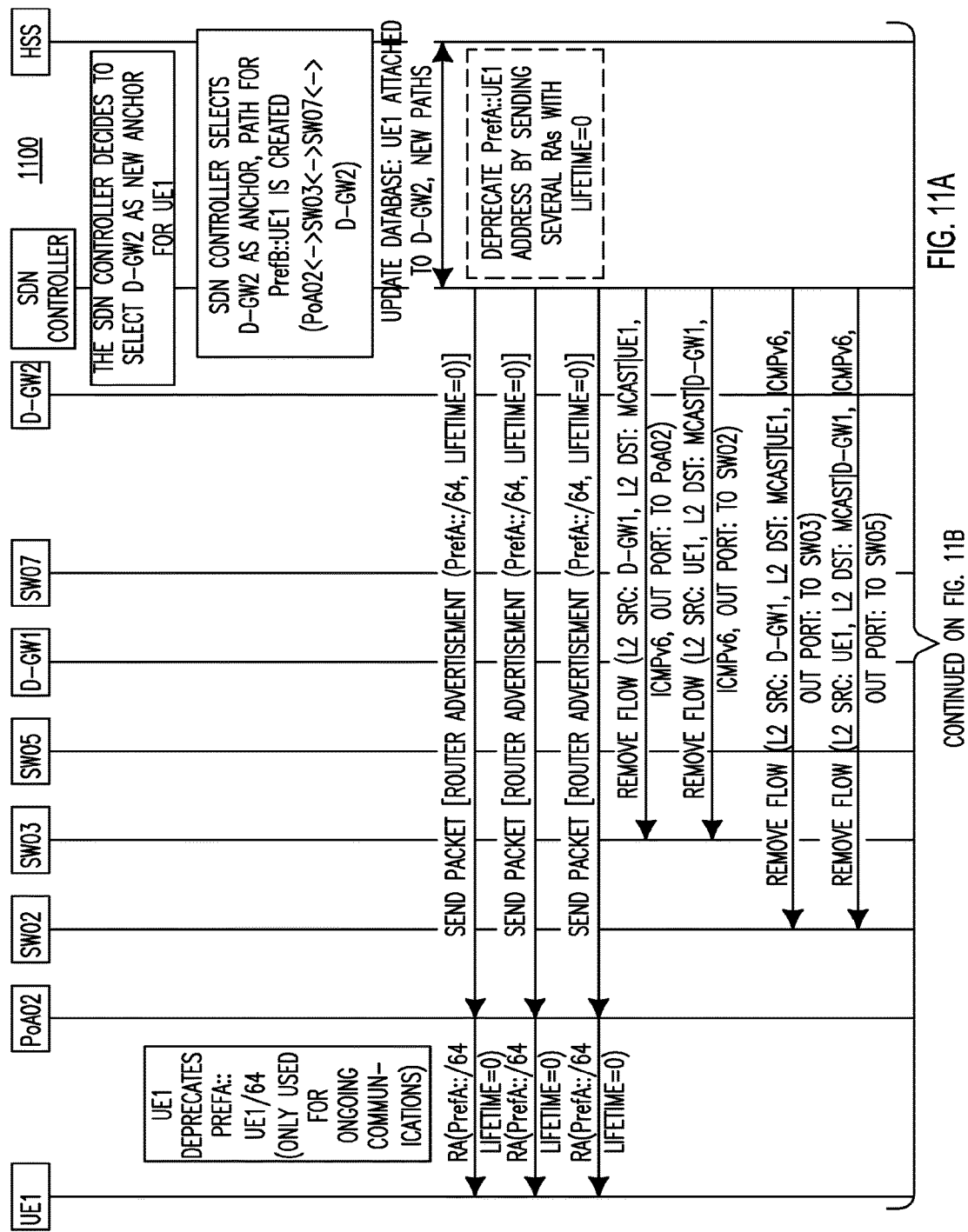
FIGS. 11A-11C show an example of a new D-GW allocation signaling procedure.
Figure 11B:
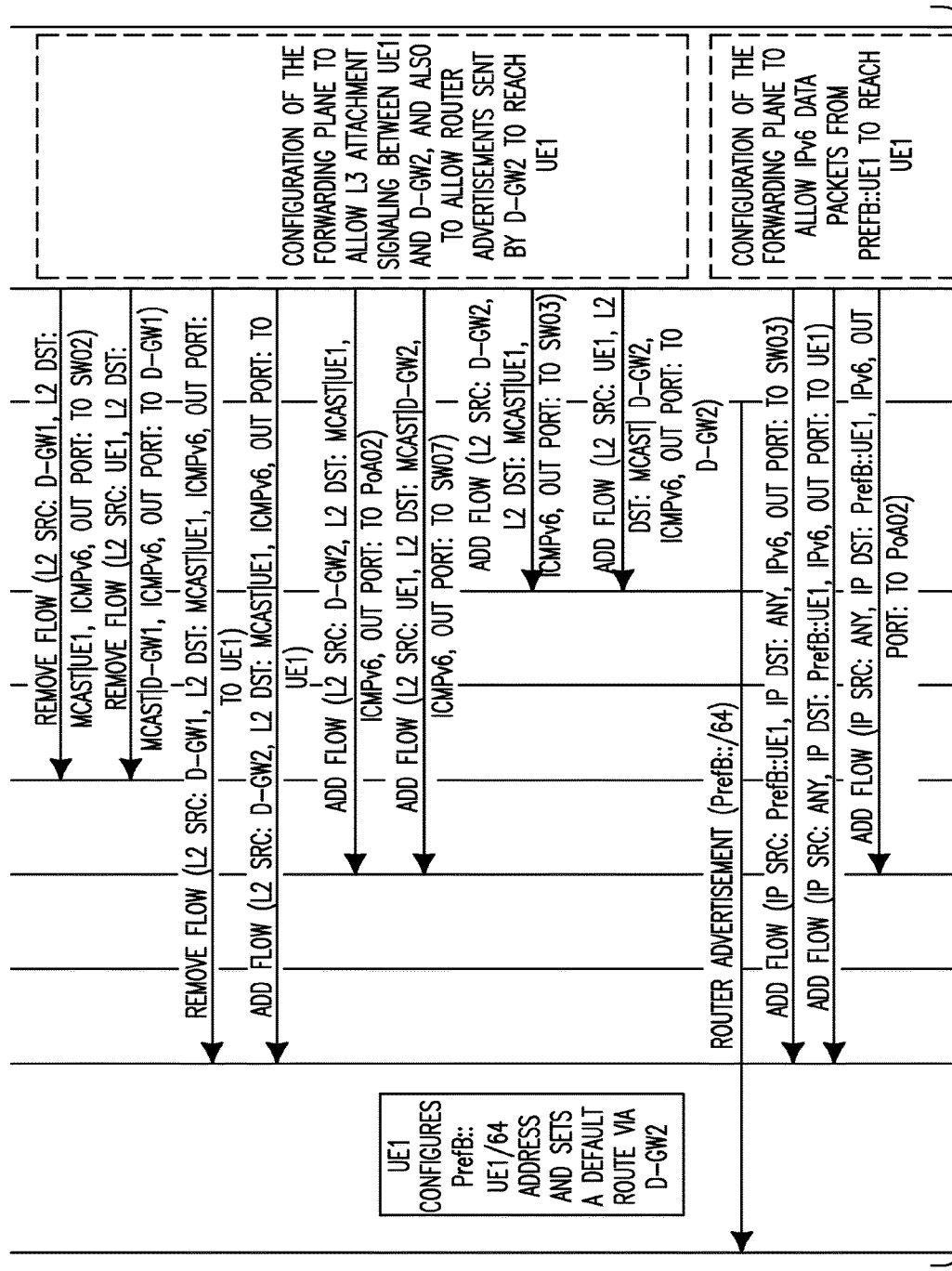
Figure 11C:
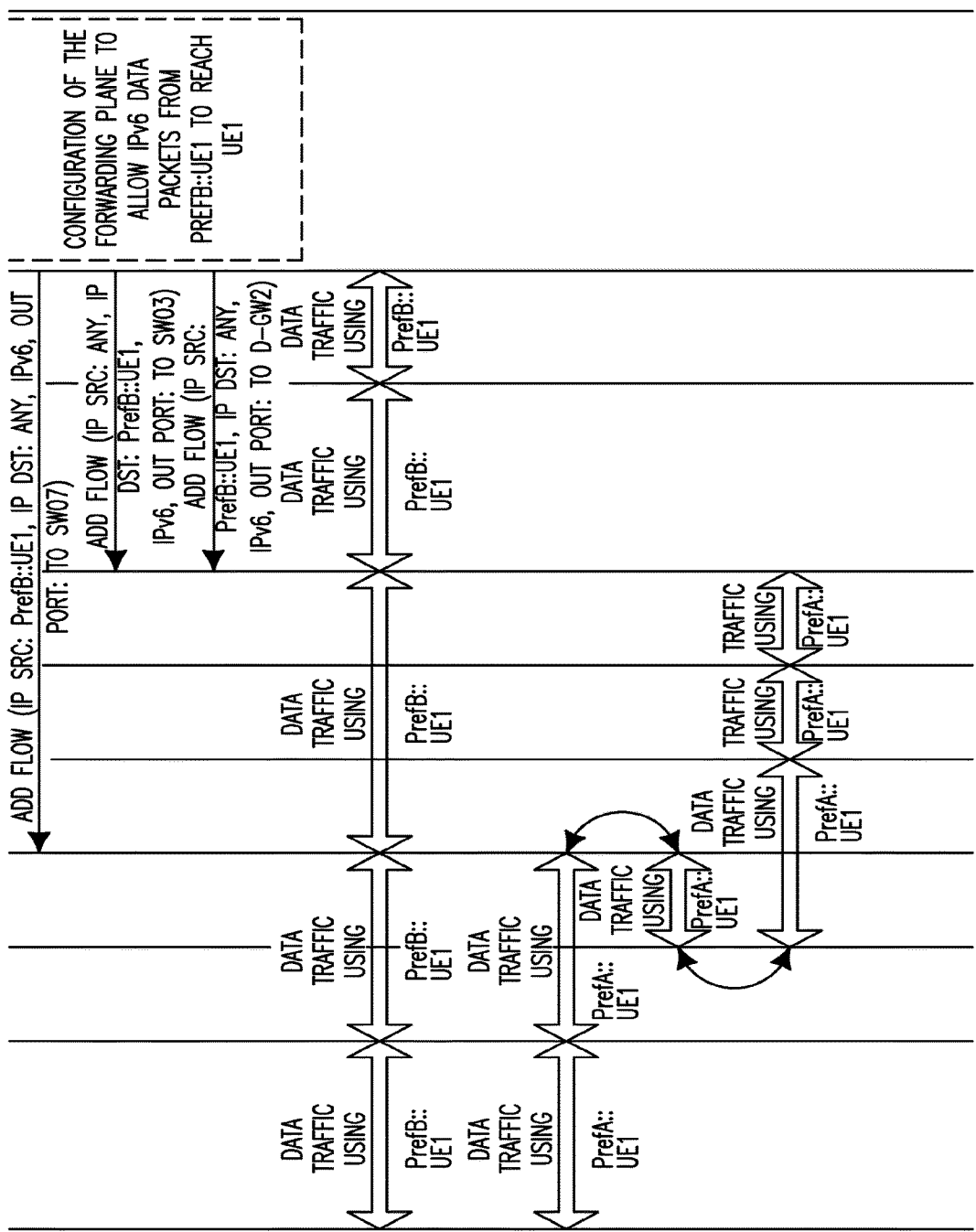

FIGS. 11A-11C show an example of a new D-GW allocation signaling procedure 1100 for situations in which the network may determine that it is better to allocate a new D-GW to a UE, even if the UE has not moved, (e.g., because of planned maintenance or network load).

As shown in FIGS. 11A-11C, UE1 may currently be using only IP addresses anchored by D-GW1 when the network (the SDN controller) decides to allocate a new anchor to UE1 (D-GW2), and a new locally anchored IP prefix (PrefB::/64). The SDN controller may update the database with this information and proceed to deprecate the IP address allocated by the previously assigned anchor (PrefA:: UE1), in this case by sending several RAs including a prefix information option (PIO) with PrefA::/64 and zero lifetime. This is an example for the case of stateless IPv6 address configuration. Then, the SDN controller may update the data path forwarding in the network, removing the status required for the L3 signaling to be delivered between D-GW1 and UE1, and installing the one required for that L3 signaling to flow between D-GW2 and the UE1. In this example, the following path may be selected: UE1⇔PoA02⇔SW03⇔SW07⇔D-GW2 (an asymmetric path may also be used). Since the anchor has changed, a new prefix (locally anchored at D-GW2) may be advertised to UE1 (PrefB::/64), which may configure a new IP address (PrefB::UE1) and default gateway (D-GW2).

The SDN controller may install the required state on the network nodes to allow the IPv6 data packets to be forwarded between UE1 and D-GW2, ensuring that ongoing sessions using the IP address PrefB::UE1 may follow the computed path UE1⇔PoA02⇔SW03⇔SW07⇔D-GW2. Traffic using PrefA::UE1 may still be forwarded towards D-GW1, and from there to the next hops towards the final destination. In this way, UE1 may keep using the old address for ongoing communications, while using the new IP address (PrefB::UE1) for new communications.

Figure 12A:
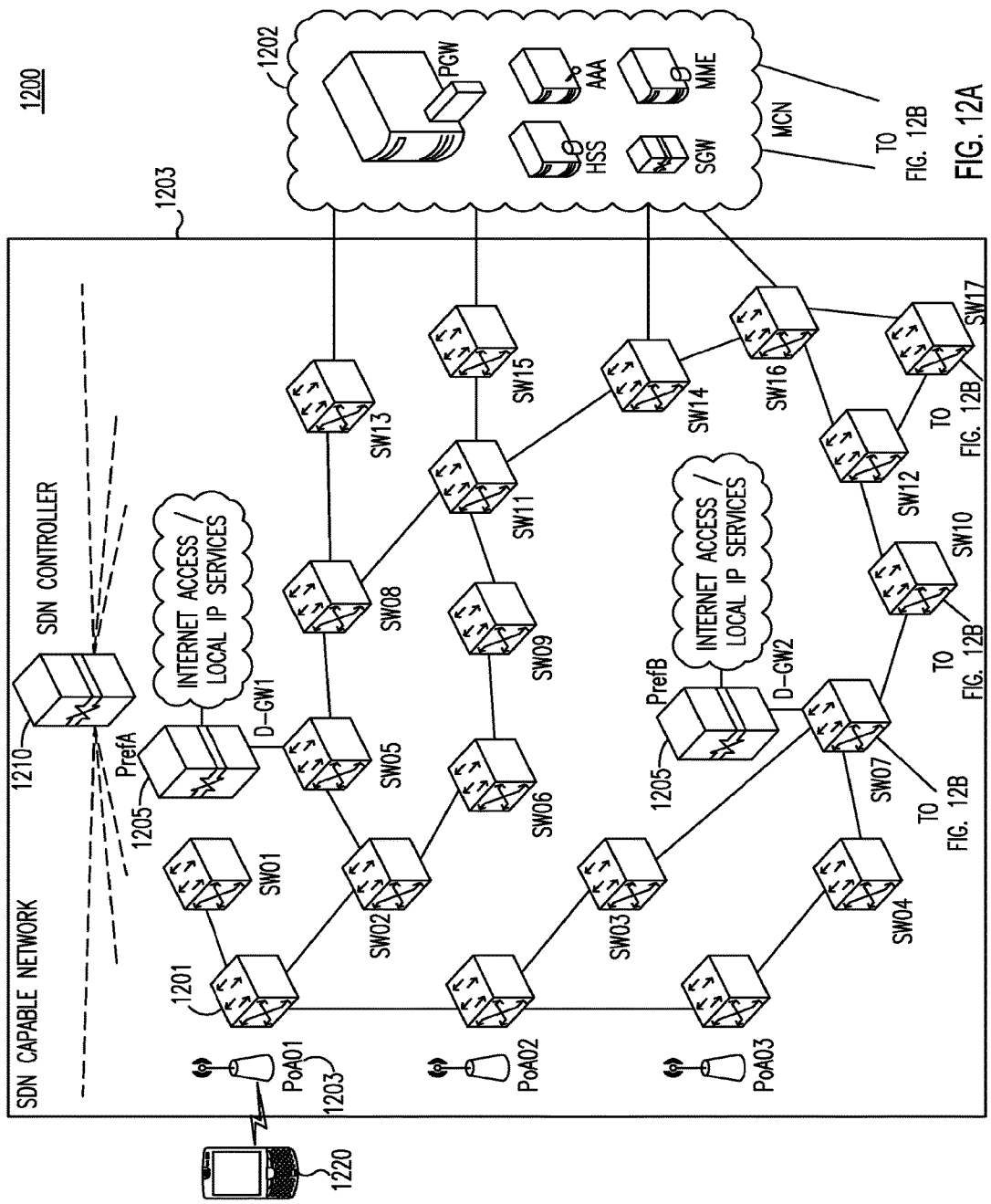
FIGS. 12A-12B show an example of internetworking of SDN and non-SDN DMM-enabled networks.
Figure 12B:
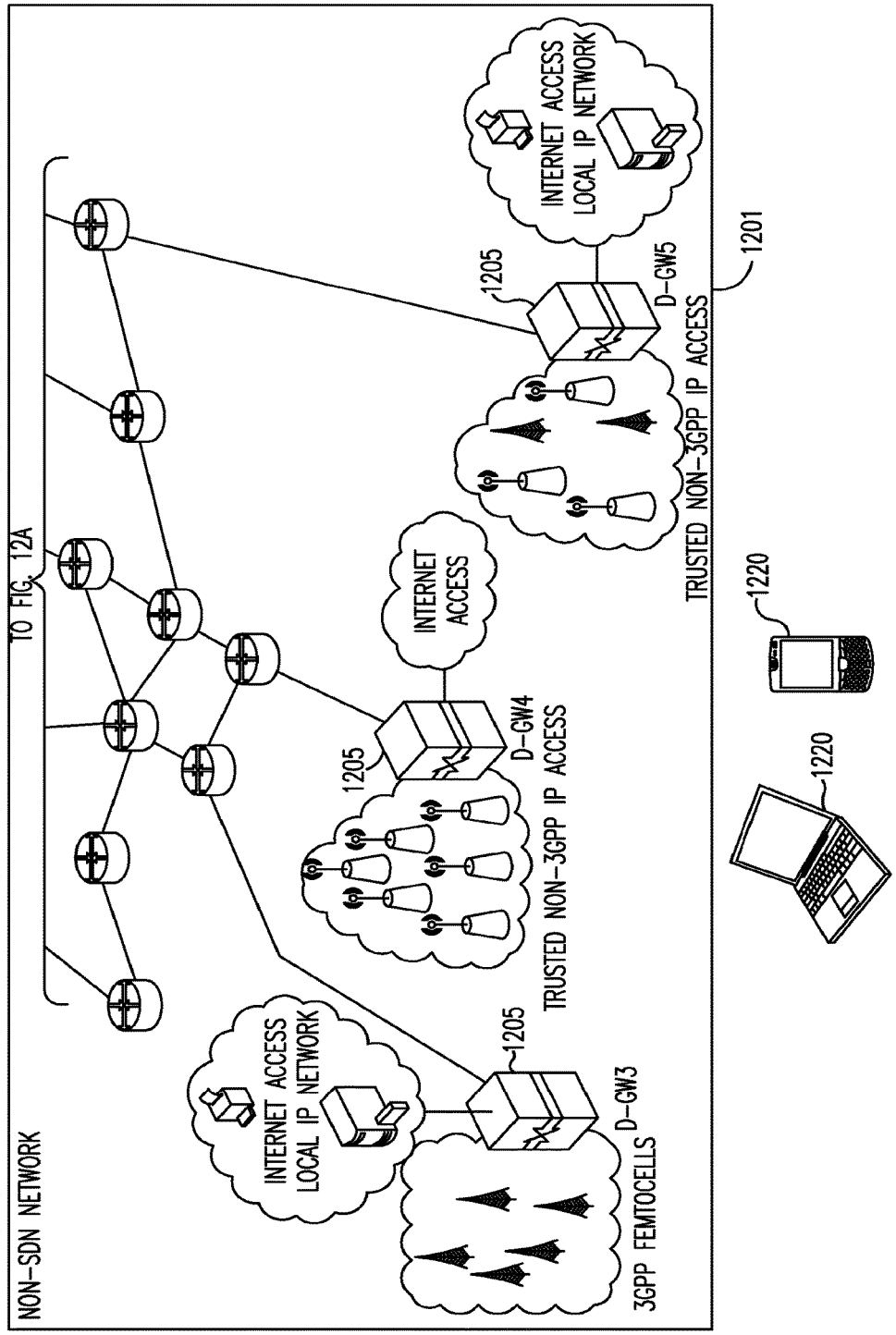

The architectures described and depicted above describe homogeneous networks, in which all of the switches are SDN-capable. However, there may be deployments in which SDN-enabled portions of a network may be interconnected with non-SDN portions. FIGS. 12A-12B show an example of internetworking of SDN and non-SDN DMM-enabled networks 1200. This scenario may be supported by enabling full DMM support on the anchors deployed on the SDN-capable part of the network and using the HSS as a global mobility database. The architecture depicted in FIGS. 12A-12B includes a non-SDN network 1201, an MCN 1202, and an SDN-capable network 1203. A plurality of D-GWs 1205, (e.g., D-GW1 . . . D-GW5), are included and depicted in both the non-SDN network 1201, (e.g., D-GW3 . . . D-GW5), and SDN-capable network 1203, (e.g., D-GW1 and D-GW2). The architecture also includes PoAs01, 02, and 03, switches 1211, and UEs 1220, as shown.

Since the HSS keeps the registry of where each UE 1220 is anchored (D-GW) and the prefix used by the UE 1220, when a UE 1220 roams to a non-SDN part of the network 1201, the serving D-GW1 may send the signaling required to establish a tunnel between the serving D-GW and the active anchoring D-GWs. As long as the SDN-capable and the non-SDN parts of the network are connected, and the HSS contains the mobility database, D-GWs may set-up the required tunnels to support mobility.

In the embodiments described above, in addition to a DMM capable network, the deployment of D-GWs as potential anchors for UE traffic may be utilized. These D-GWs may be pre-allocated with some IPv6 prefixes and configured to act as IPv6 routers.

Figure 13:
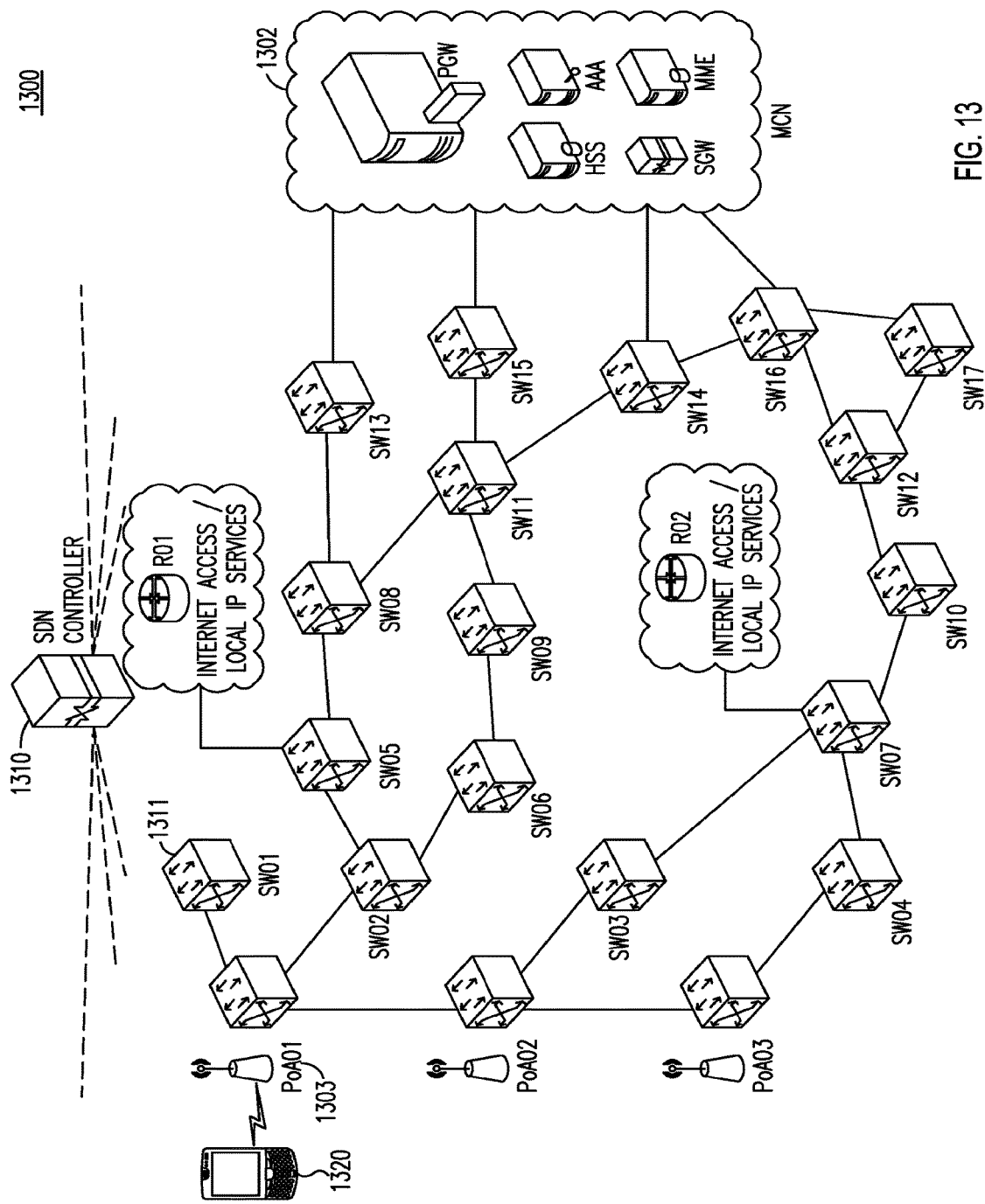
FIG. 13 shows an example of a "full-SDN" DMM network.

FIG. 13 shows an example of a "full-SDN" DMM network 1300 in which all of the SDN functionality may be implemented via the programming of the SDN network switches from the SDN controller. Thus, only SDN-capable L2/L3 switches may be required. The network 1300 includes an MCN 1302, PoAs 1303, an SDN controller 1310, Switches 1311, and a UE 1320.

As shown in FIG. 13, the network 1300 may be composed of several SDN-capable switches (SWs01-17). Some of the SDN-capable switches may be connected to wireless points of attachment, and some others may have local Internet connectivity, meaning that they may serve as local break-out points. R01 and R02 may be routers providing network connectivity and/or access to local network/services. For purposes of example, the example signaling procedures depicted in FIGS. 14-18 below refer to the network structure depicted in FIG. 13 as a reference network structure.

Figure 14A:
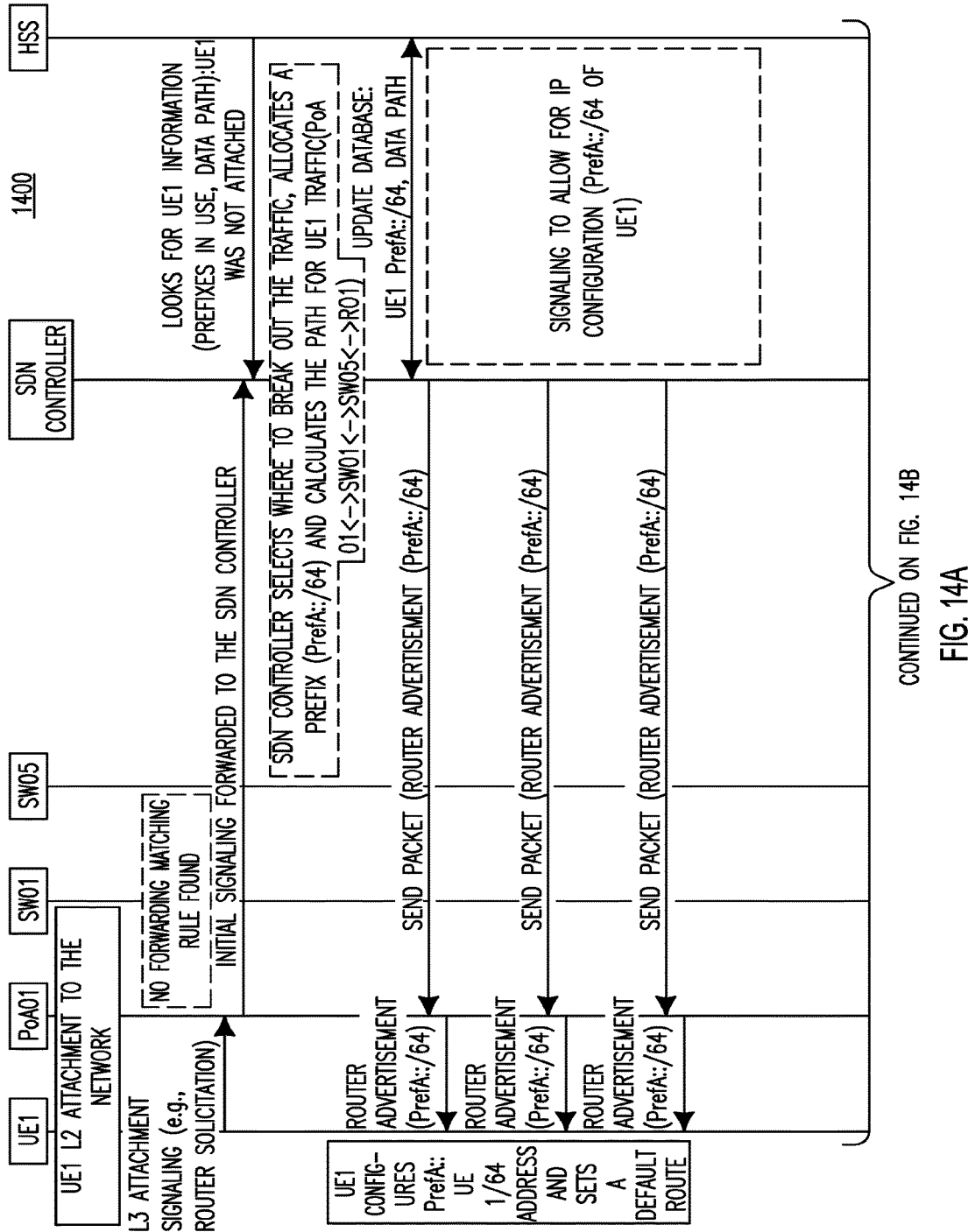
FIGS. 14A-14B show an example of a "full-DMM" approach for an initial attachment signaling procedure.
Figure 14B:
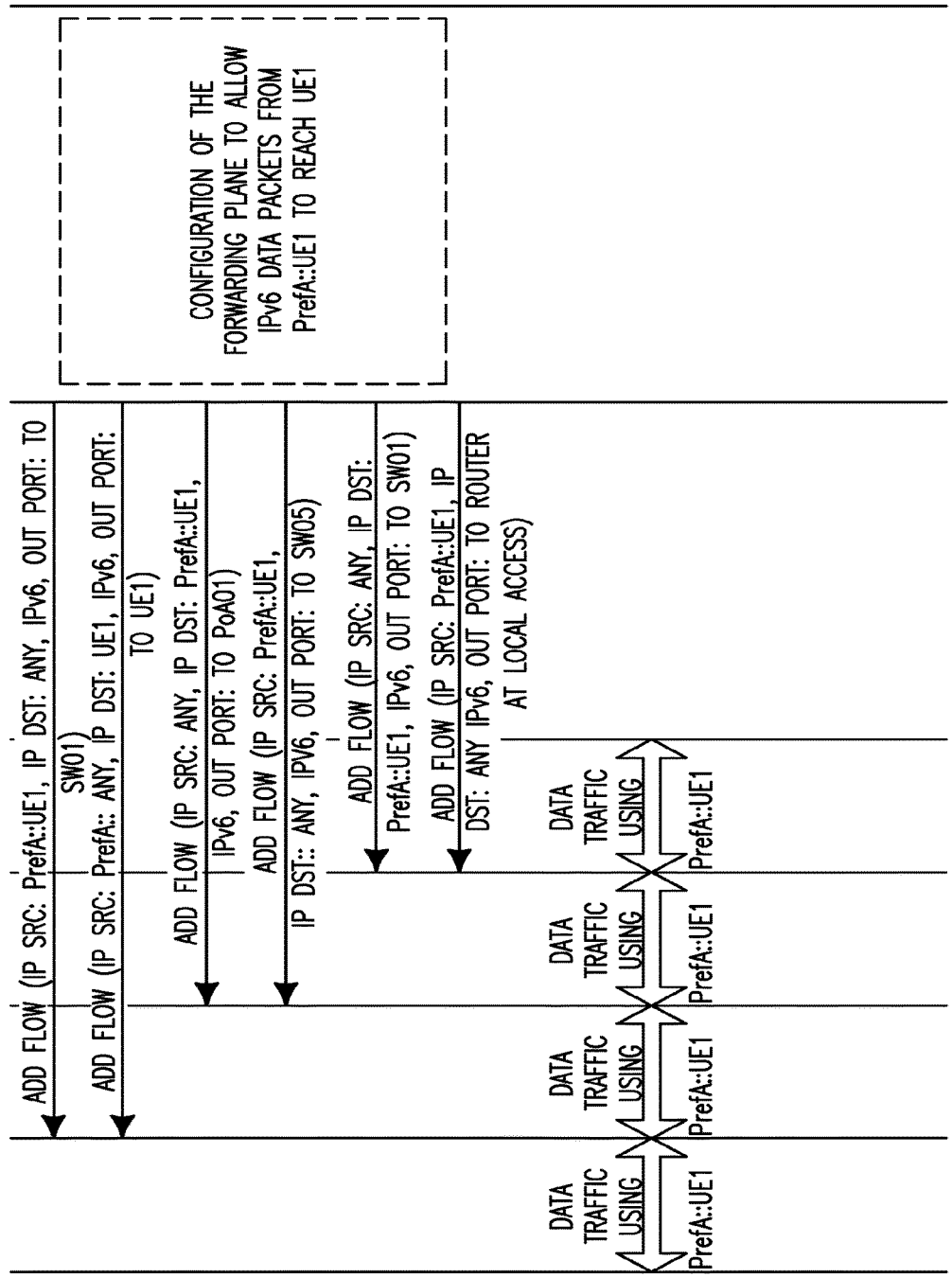

FIGS. 14A-14B show an example of a "full-DMM" approach for an initial attachment signaling procedure 1400 when a UE initially attaches to the network. In FIGS. 14A-14B, UE1 performs a L2 attachment to PoA01. The initial L3 attachment signaling of the UE may serve as a trigger for the signaling, as PoA01 has no rule for that kind of traffic. OpenFlow may be used as a southbound configuration protocol for the SDN network, but other protocols may also be used.

Alternatively, the L2 attachment signaling may also be used as the initial trigger. Since PoA01 has no forwarding rule for this initial attachment signaling packet, PoA01 may forward it to the SDN controller, which then may check in a database, (that may be centralized, for example in the HSS), if UE1 was previously attached to the network. In this case (initial attachment), no information about UE1 may be found on the database, so the SDN controller may select which node of the network may be anchoring the traffic of the UE1, (or the particular flow that the L3 signaling is trying to set-up, if that information is available at this stage, e.g., for the case of a PDN connectivity request).

This determination may take into account different aspects, such as the expected mobility pattern of the UE, previous known patterns, its speed (if known), the status of the network, and the like. The SDN controller may not only select an anchoring node, i.e., which node may be used to locally break-out the traffic (SW05 in this example, which has local IP connectivity via R01), but also a locally anchored IPv6 address/prefix to be delegated to UE1 (PrefA::/64) in this example. Once the anchor and IP address/prefix are selected, the SDN controller may calculate the path that UE1 traffic (or specific UE1 flow) may follow (PoA01⇔SW01⇔SW05⇔R01 in this case), and may update the database with all of this information. Then, the SDN controller may generate the signaling in response to the L3 attachment message sent by the UE, so it may configure the right IP address and additional IP parameters (e.g., default router). In the example shown in FIGS. 14A-14B, stateless IPv6 address autoconfiguration may be implemented, so that the SDN controller may generates an RA containing the prefix allocated to UE1 (PrefA::/64). In order to avoid a potential loss of the message on the wireless channel, the message may be sent several times. This message is sent 3 times in the example shown in FIGS. 14A-14B. Out of this prefix, UE1 may configure an IPv6 address (PrefA::UE1/64) and set up a default route via the selected anchor (SW05). In order to make the mobility transparent to the UE, the L2 and L3 addresses of the default router used by UE1 may be kept the same, regardless of its point of attachment to the network, (for each anchor the UE is using). Depending on the configuration of the network, these addresses may be selected by the anchor (SW05 in this example) or by the SDN controller. In this case, that information may also be maintained in the database, to avoid address collisions.

The SDN controller may configure the forwarding plane of the involved entities in the network, so IPv6 packets from/to UE1 can flow via the selected anchor, and using the best path within the network. This path may not necessarily be the shortest path, as other considerations (such as network status and load) may be taken into consideration by the SDN controller when computing it.

FIGS. 14A-14B also show detailed examples of control data plane interface signaling messages (using OpenFlow just as an example). These messages show relevant parameters, but there may be other fields, such as the lifetime of the flow entries that are omitted, as they may be selected based on the particular network deployment. Similarly, the flow configurations shown may be based on L3 source and destination addresses. However, a different set of flow match fields may be used, such as the switch ingress port, or include both L2 and L3 addresses, for example. Although message names related to OpenFlow message names may or may not be used in FIGS. 14A-14B, other message names may be applied to other control protocols. For example, when "Add flow" is used, the OpenFlow message may be a controller-to-switch modify-state message with a OFPFC_MODIFY command.

Figure 15A:
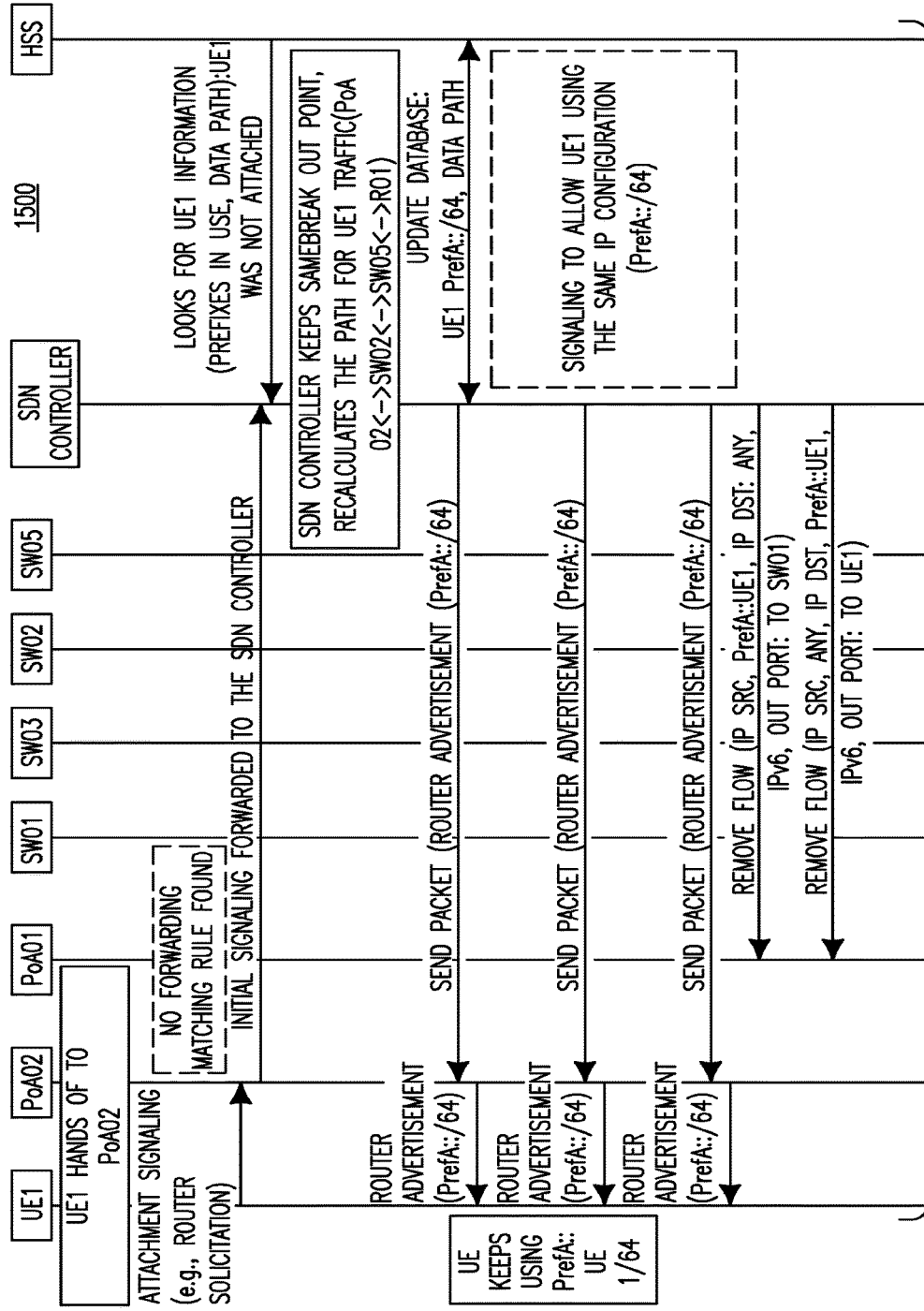
FIGS. 15A-15B show an example of a "full-DMM" approach for an intra-anchor handover signaling procedure.
Figure 15B:
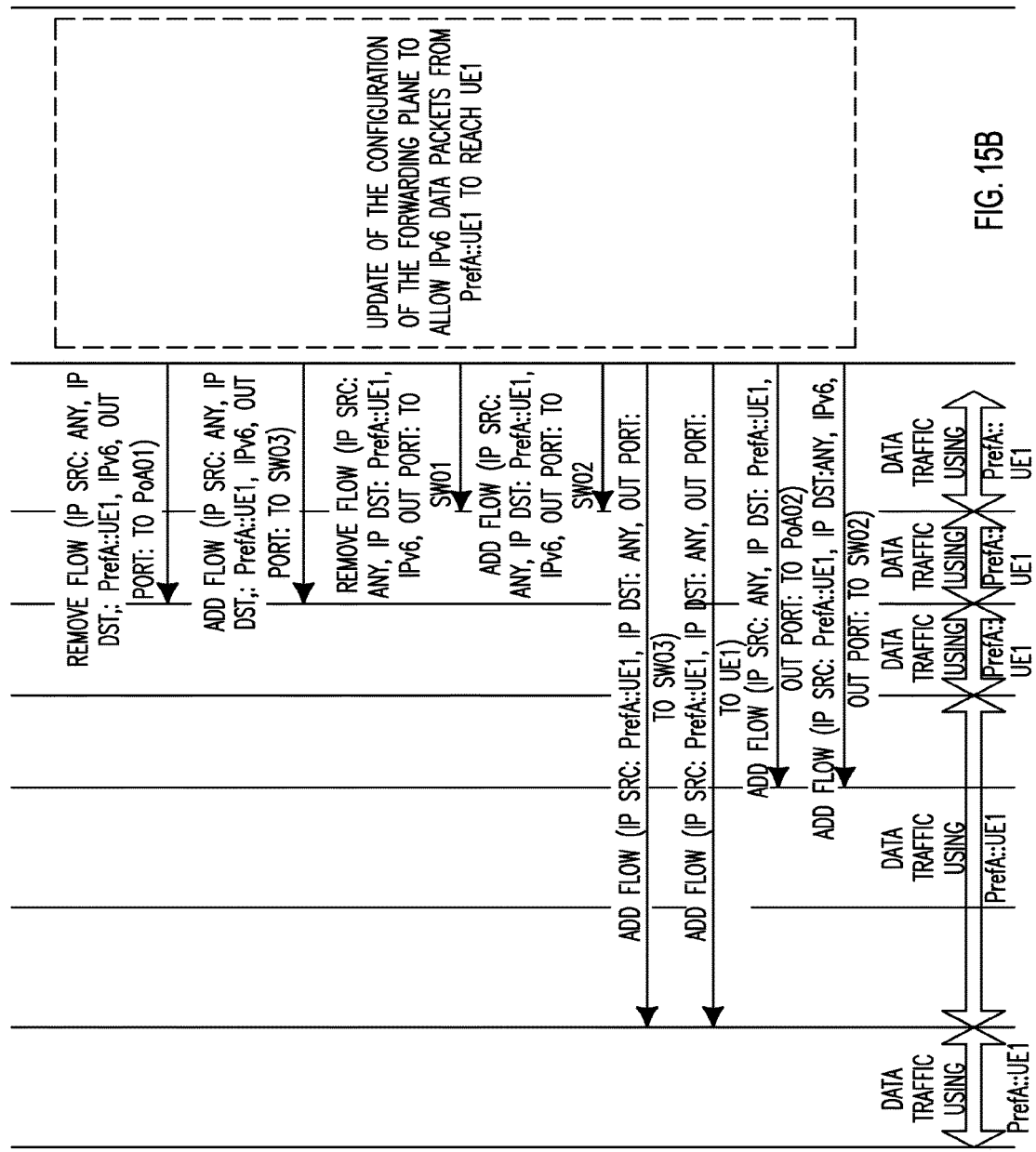

FIGS. 15A-15B show an example of a "full-DMM" approach for an intra-anchor handover signaling procedure 1500 when a UE performs a handover that does not involve a change of anchor. UE1 may perform an L2 handover to PoA02. When PoA02 receives the attachment signaling sent by UE1, it may find that it does not have any matching forwarding rule for the received packet, and therefore it may forward the packet to the SDN controller. The SDN controller may look for UE1 in the database, (in the example this database is hosted at the HSS), and may find out that UE1 was already attached to the network and may obtain the active prefixes in use by the UE, as well as the set-up forwarding data paths. Taking that information as input, together with other parameters, (such as, but not limited to, network status, UE speed, UE known past mobility records, application mobility requirements, and the like), the SDN controller may determine if a change of anchor is necessary or not. In this case, the anchor may not need to be changed (i.e, intra anchor handover). Therefore, the SDN controller may compute the best path from and to the anchoring entity (SW05) and the current attachment point of UE2 (PoA02), which in this example may be PoA02⇆SW03⇆SW02⇆SW05⇆R01. The selected path may also be asymmetric (i.e., different downlink and uplink paths). The SDN controller may update the database with the new information about the selected forwarding path and current attachment of UE2.

The SDN controller may generate the signaling in response to the L3 attachment message sent by the UE, so it may keep using the same IP address (and default router), so UE1 effectively may not notice any mobility at the IP layer. In the example shown in the FIGS. 15A-15B, stateless IPv6 address autoconfiguration may be implemented, so the SDN controller may generate an RA containing the prefix allocated to UE1 (PrefA::/64). In order to avoid a potential loss of the message on the wireless channel, the message may be sent several times (3 in the example shown in FIGS. 15A-15B). Since this is the same prefix that UE1 was using, and it is advertised by the same router (meaning, same L2 and L3 addresses), UE1 may not detect any mobility and may keep using the same IPv6 address (PrefA::UE1/64).

The SDN controller may then update the data forwarding configuration in the network, by sending configuration signaling to all involved network entities, so that the new computed data paths between the anchor (SW05) and the UE (attached to PoA02) may be used.

Figure 16A:
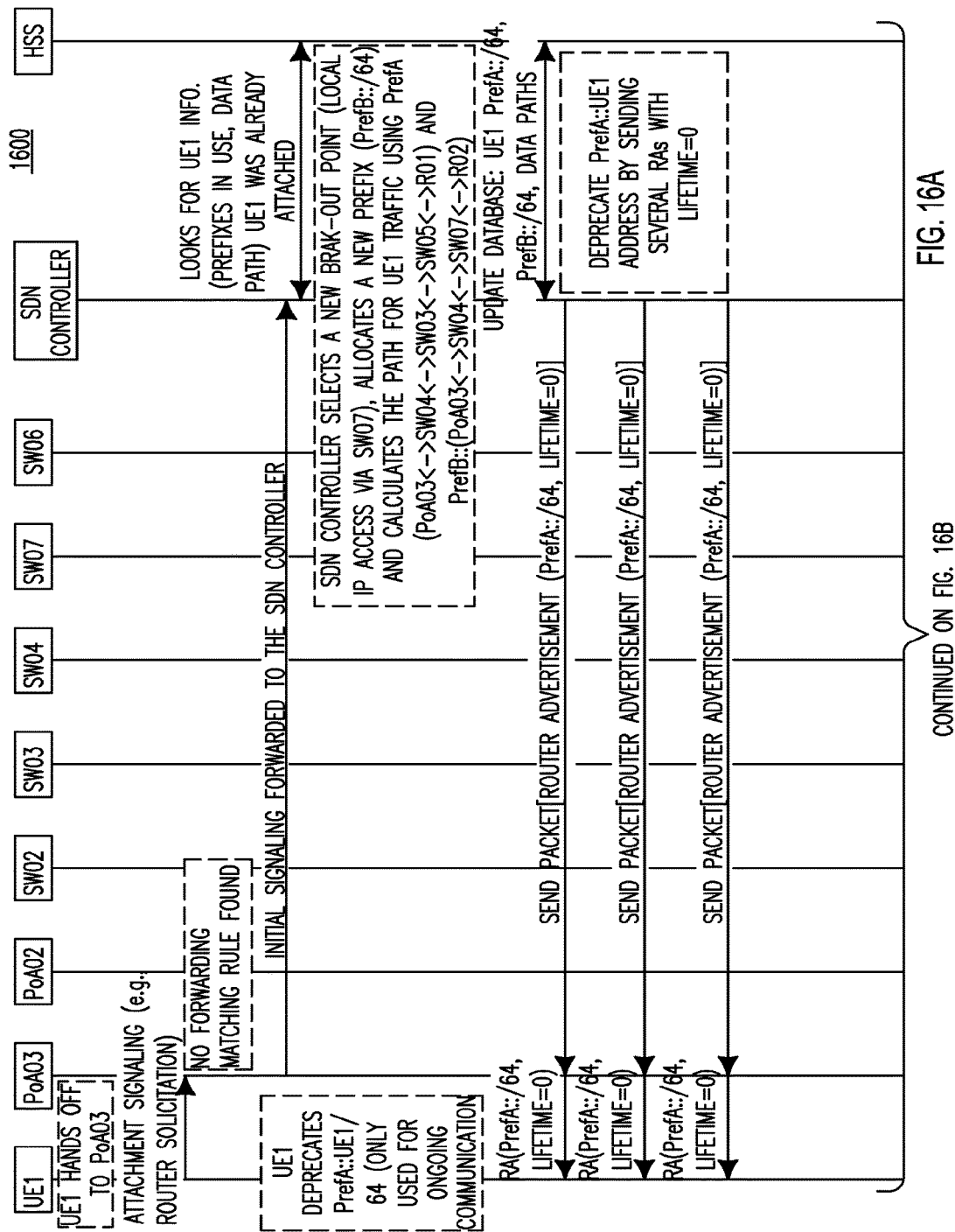
FIGS. 16A-16O show an example of a "full-DMM" approach for an inter-anchor handover signaling procedure.
Figure 16B:
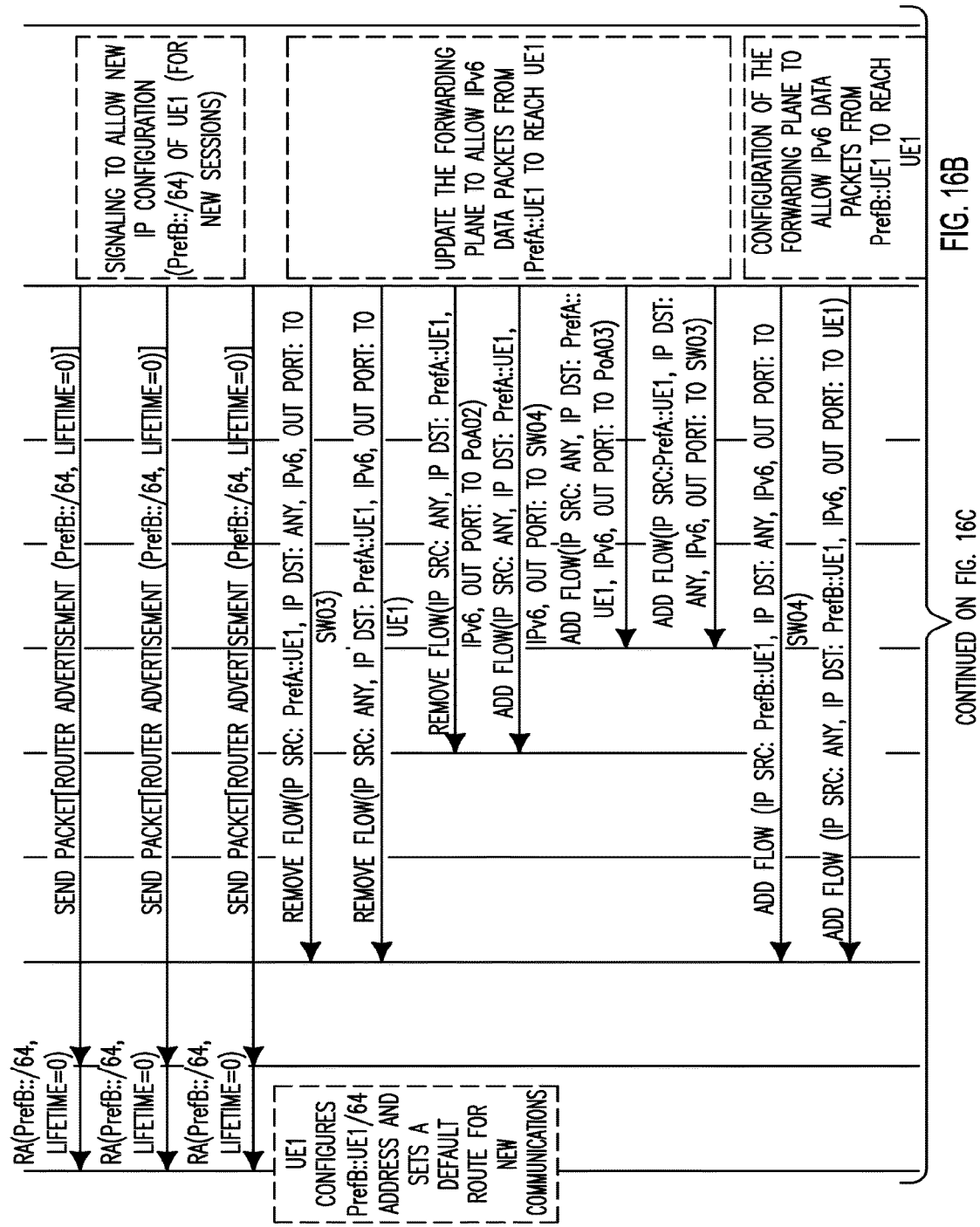
Figure 16C:
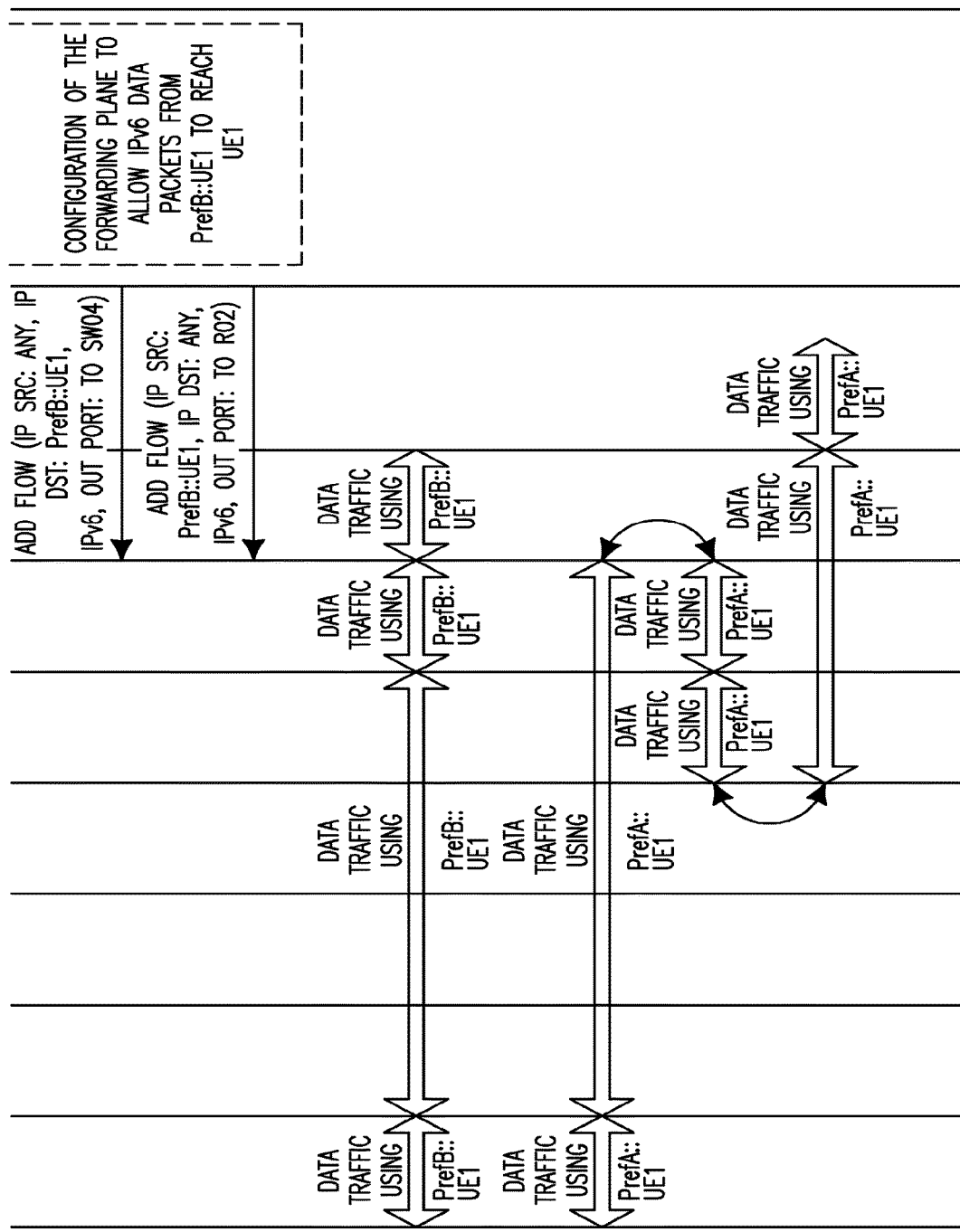

FIGS. 16A-16C show an example of a "full-DMM" approach for an inter-anchor handover signaling procedure 1600 when a UE performs a handover that involves a change of anchor. UE1 may perform an L2 handover to PoA03. When PoA03 receives the attachment signaling sent by UE1, it may find that it does not have any matching forwarding rule for the received packet, and therefore it may forward the packet to the SDN controller. The SDN controller may look for UE1 in the database (in the example this database is hosted at the HSS) and may find out that UE1 was already attached to the network and may obtain the active prefixes in use by the UE, as well as the set-up forwarding data paths. Taking that information as input, together with other parameters (such as, but not limited to, network status, UE speed, UE known past mobility records, application mobility requirements, and the like), the SDN controller may decide if a change of anchor is necessary or not. In this case, a new anchor may be selected (inter anchor handover), together with a new locally anchored IP prefix (PrefB::/64). The SDN controller may compute the best path from and to the new anchoring entity (SW07 which is connected to a network with local IP connectivity via R02) and the current attachment point of UE2 (PoA03), which in this example may be PoA03⇆SW04⇆SW07⇆R02. The SDN controller may also compute the best path from the current attachment point and the anchoring point of other active prefixes (PrefA::/64 in this case). As before, selected paths may be asymmetric (i.e., different downlink and uplink paths). The SDN controller may update the database with the new information about the selected forwarding paths, active anchors, prefixes and current attachment of UE2.

Then, the SDN controller may generate the signaling in reply of the L3 attachment message sent by the UE. On the one hand, the SDN controller may deprecate the IP address(es) used by the UE anchored at different nodes than the current selected anchor. In the example shown in FIGS. 16A-16O, this may be performed by the SDN controller generating and sending an RA message with zero lifetime for each IPv6 prefix to be deprecated (PrefA::/64 in this example). Several of these messages may be sent to improve the reliability. The reception of these messages may make UE1 deprecate the address it has configured out of the deprecated prefix, which means that this address (PrefA::UE1 in the example) may only be used for ongoing sessions that were established before the UE moved. On the other hand, the SDN controller may also generate the signaling required to allow UE2 configure an IP address out of the new locally anchored prefix (PrefB::/64). In this example, this may be performed by sending a new RA message containing the new prefix (this message is also sent several times). The new configured address (PrefB::UE2) may be used for new sessions of UE1.

The SDN controller may then update the data forwarding configuration in the network, by sending configuration signaling to all involved network entities, so that the data paths may support the communication between the current attachment point (PoA03) and the different anchoring entities.

This may ensure that traffic follows the right path (both uplink and downlink, which may be asymmetric) for both applications using PrefA::UE1 and applications using PrefB::UE1.

Figure 17A:
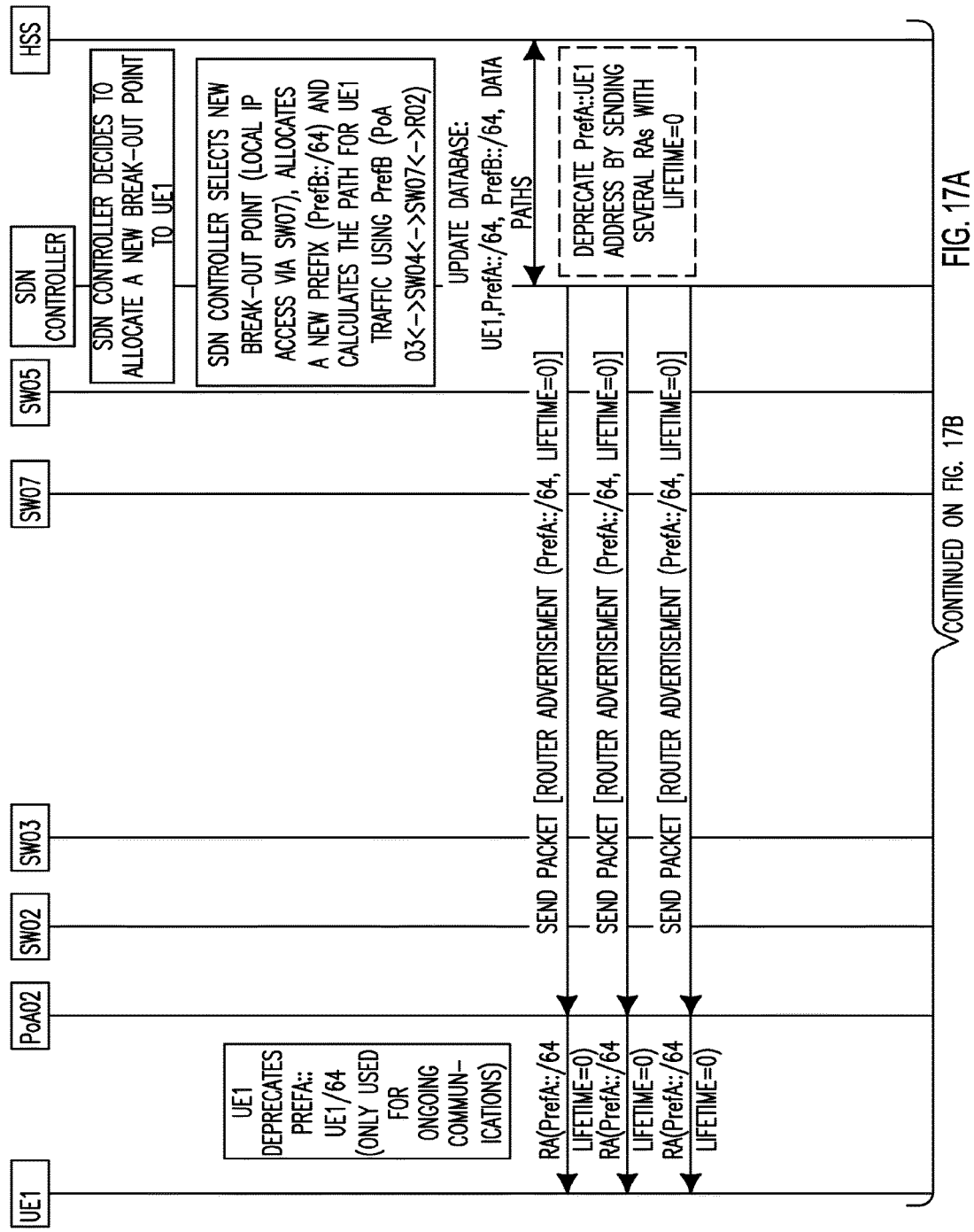
FIGS. 17A-17O show an example of a "full-DMM" approach for a new anchor allocation signaling procedure.
Figure 17B:
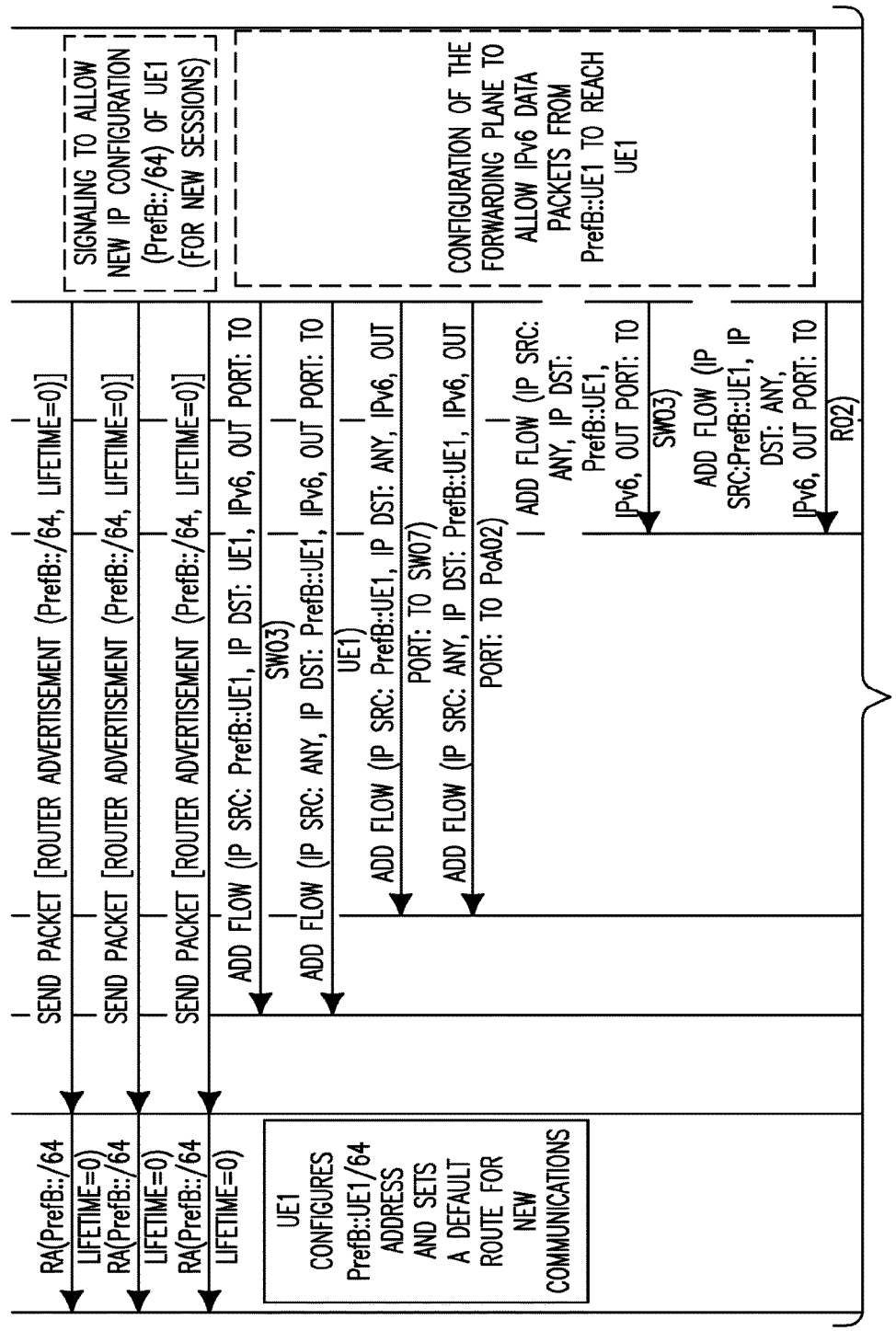

FIGS. 17A-17O show an example of a "full-DMM" approach for a new anchor allocation signaling procedure 1700 when the network decides to allocate a new anchor to a UE, even if the UE1 has not moved. UE1 is currently using only IP addresses anchored by SW05 and the network (the SDN controller) may decide to allocate a new anchor to UE1 (SW07, which has connectivity with R02), and a new locally anchored IP prefix (PrefB::/64). The SDN controller may update the database with this information and may proceed to deprecate the IP address allocated by the previously assigned anchor (PrefA::UE1), in this case by sending several RAs including a PIO option with PrefA::/64 and zero lifetime. This is an example for the case of stateless IPv6 address configuration. The SDN controller may also generate the signaling required to allow UE2 configure an IP address out of the new locally anchored prefix (PrefB::/64). In this example, this may be performed by sending a new Routing Advertisement message containing the new prefix (this message is also sent several times). The new configured address (PrefB::UE2) may be used for new sessions of UE1. Then, the SDN controller may compute the best path from and to the new anchoring entity (SW07) and PoA02, which in this example may be PoA02⇆SW04⇆SW07⇆R02 (note that asymmetric paths may also be computed).

Figure 18A:
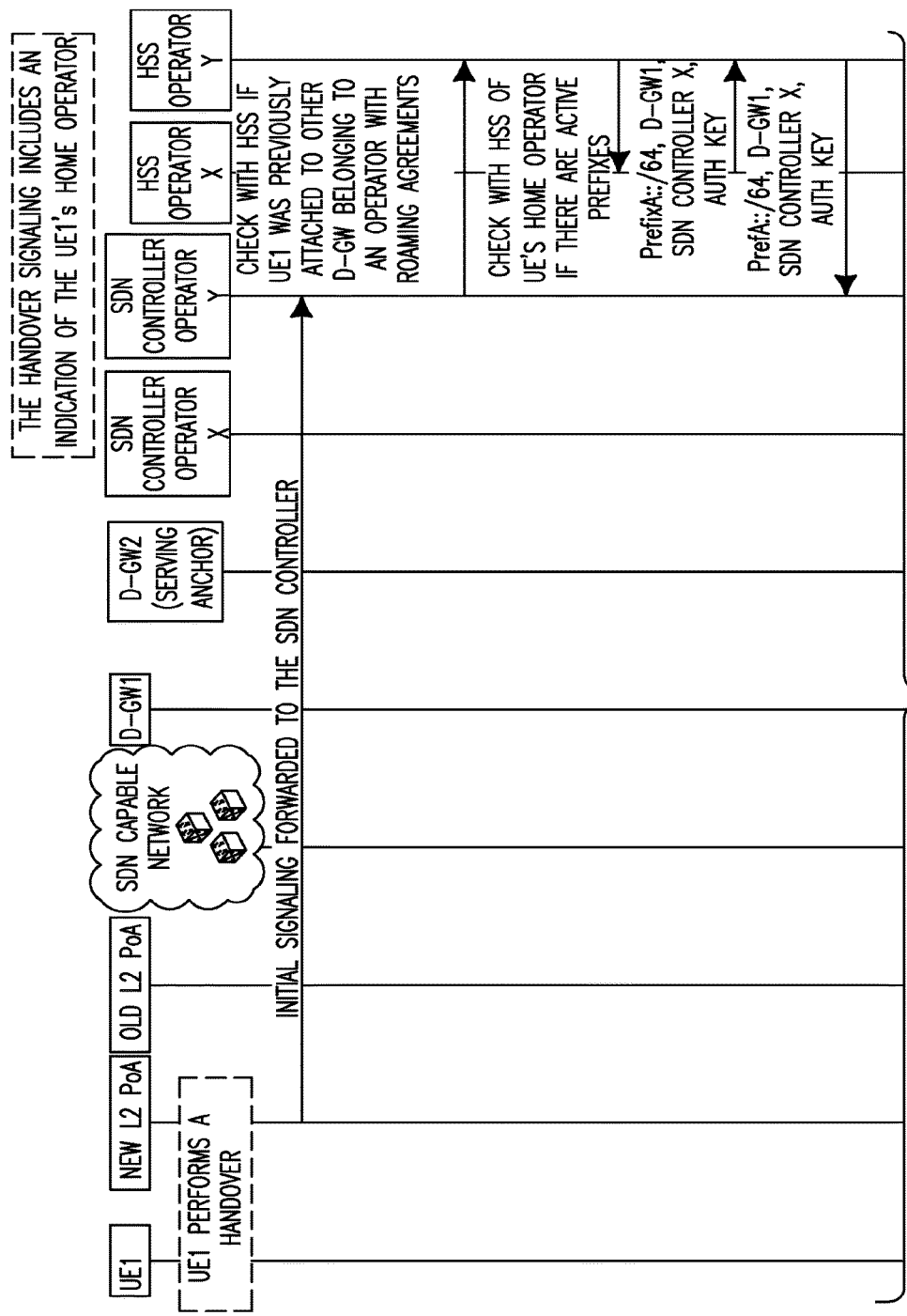
FIGS. 18A-18B show an example of a signaling procedure for inter-domain mobility across multiple virtualized operators.
Figure 18B:
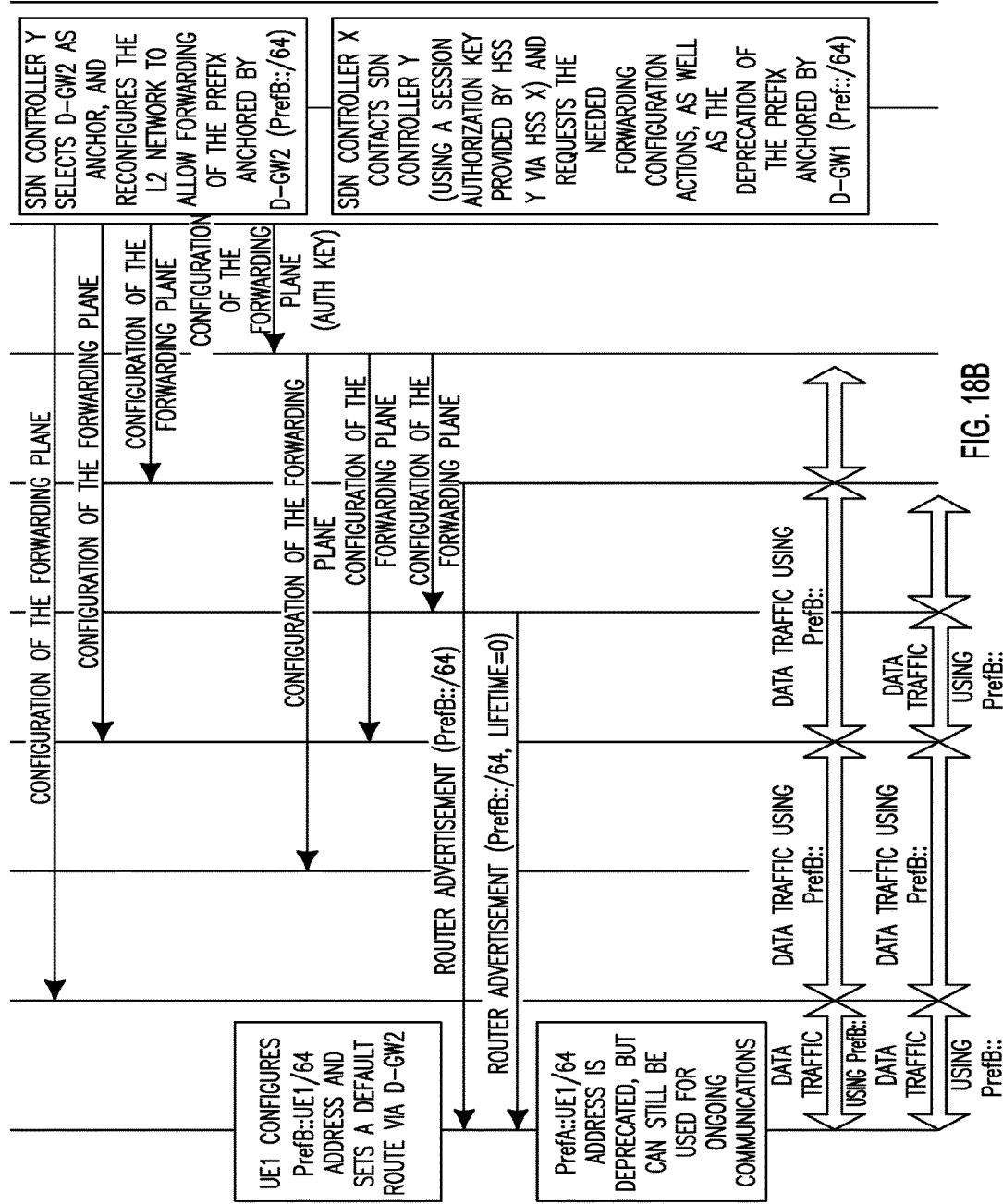

FIGS. 18A-18B show an example of a signaling procedure 1800 for inter-domain mobility across multiple virtualized operators. Having multiple virtual operators sharing part or all of a physical network may be a deployment scenario, as using SDN tools allow to do so quite easily. In this scenario, a UE handover may belong to one of the following categories.

In one category, the UE may move between L2 PoAs that may be controlled by its operator, (i.e., its operator is part of the operators' set sharing both the old and the new L2 physical PoA), the selected D-GW may also be controllable by the same operator, and the network elements between the L2 PoAs, and the involved D-GWs (if a new one is selected as a result of the handover) may also be controllable by the same operator. In this case, the handover may actually be an intra-domain one, so no new considerations may be needed.

In another category, the UE may move from one L2 PoA that may be controlled by its operator to another that cannot (i.e., the operator is not part of the operators' set that can control the physical new L2 PoA), and/or the involved D-GWs may not be all controllable by the operator and/or the network entities between the L2 PoAs and D-GW(s) may not be controllable by the operator. The involved operators may have roaming agreements in place that allow their respective SDN controllers to cooperate in order to achieve inter-domain mobility.

In yet another category, the UE may move from one L2 PoA that may be controlled by its operator to another that may not (i.e., the operator is not part of the operators' set that can control the physical new L2 PoA), and/or the involved D-GWs may not be all controllable by the operator and/or the network entities between the L2 PoAs and D-GW(s) may not be controllable by the operator. The involved operators may not have roaming agreements in place that allow their respective SDN controllers to cooperate to achieve inter-domain mobility. In this case, the only mobility support that may be provided is via a centralized anchor that may be supported.

As shown in FIGS. 18A-18B, UE1 may move from an L2 PoA from Operator X to an L2 PoA managed by a different Operator Y, and also the new selected D-GW (D-GW2) may belong to Operator Y. When UE1 moves to the new PoA, managed by Operator Y, this PoA may forward the handover signaling to its SDN controller (SDN controller Y), which may check with its mobility database (HSS Y in this example) if UE1 has an active previous prefix (either managed by Operator Y or another operator). In the handover signaling, UE1 may convey information about the operator to which it was previously attached. The HSS Y may make contact with the mobility database of the operator previously visited by UE1 (HSS X), and obtain the information about the active prefixes, the associated anchors and SDN controllers, as well as an authorization key that may be later used by the SDN controller Y to request SDN controller X to perform some forwarding configuration. All this information may be provided to SDN controller Y, which may select the best anchor for UE1. In this case, D-GW2 may be selected, which may be controlled by Operator Y. The SDN controller Y may send all of the configuration commands to the networks entities that may be controlled by it, as well as may request SDN controller X to do the same with those entities that may only be managed by Operator X. SDN controller Y may use the authorization key to sign this request. Alternative mechanisms may be used to authorize an SDN controller from one operator request forwarding configuration operations to an SDN controller managed by a different operator. This signaling may also include the request to deprecate all active prefixes (PrefA::/64), but the one just assigned by D-GW2 (PrefB::/64).

As in the previous cases, UE1 may still use PrefA::UE1 for ongoing communications and use PrefB::UE1 for new ones, being the mobility support provided in a transparent way. No tunneling may be needed, as the network may be dynamically reconfigured to setup the different data paths required to ensure the reach ability of the different active prefixes, even if different operators are involved.

Figure 19:
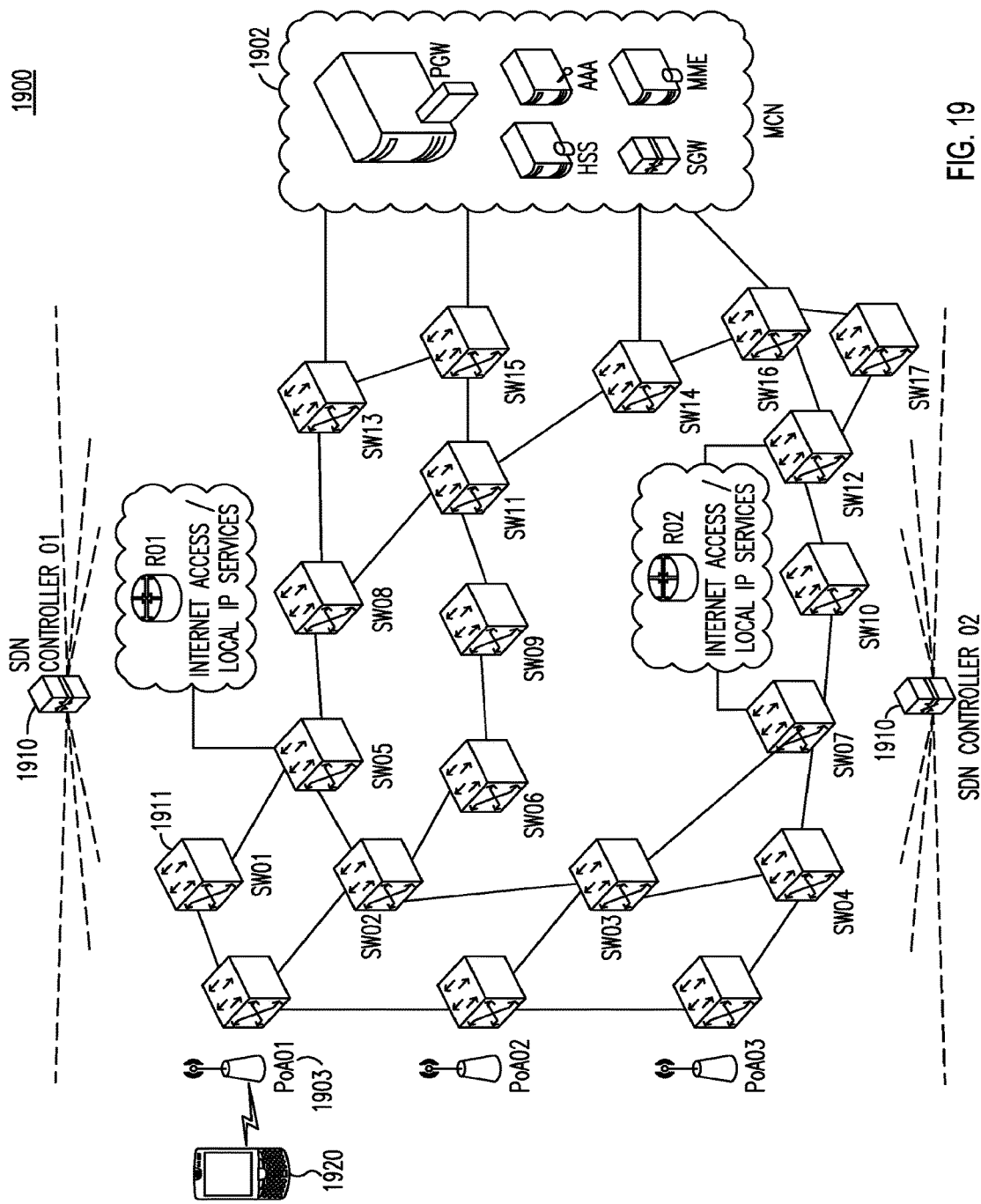
FIG. 19 shows an example architecture of multiple SDN controllers.

FIG. 19 shows an example architecture 1900 of multiple SDN controllers. The architecture 1900 includes an MCN 1902, a plurality of PoAs (PoA01-03), SDN controllers 1910 (01 and 02), switches 1911 (SW01-SW17), and a UE 1920. In some deployments, it may be necessary to deploy multiple SDN controllers 1910, for example to alleviate the load on the SDN controller. This may be enabled by ensuring that every deployed and active SDN controller 1910 has access to a common database. An example may be co-locating that database with the HSS, but other approaches may also be utilized, such as using a distributed database, or replicated copies of the database on the SDN controllers 1910 and then using a replication protocol to ensure the information is kept consistent and up-to-date.

There may be different potential models of deployment of multiple controllers. For example, each SDN-capable network switch 1911 may be configured with a default SDN controller 1910, which may be the one receiving packets for which the network switch 1911 cannot find an active mapping/flow entry. This default SDN controller 1910 may be responsible for configuring the network switches 1911 under its influence area, but the may be other devices that can do it. For example, a UE 1920 may perform a handover from a PoA 1903 handled by a different controller than the one handling the target PoA, or the computed path for a given UE flow may involve traversing switches 1911 that are primarily handled by a different controller. With protocols, such as OpenFlow, each network switch 1911 may be configured by multiple controllers. In order to support a consistent operation, every controller may have access to up-to-date information about UE status, (e.g., active anchors, IP addressing information, configured data paths, and the like). All SDN-capable network switches 1911 may be accessible by all deployed controllers, so that they may receive configuration commands.

In addition to the procedures described above, there are two example scenarios that may be considered to support IPv4. In a first scenario, each potential anchor may be able to provide a unique public IPv4 address to each UE. In a second scenario, each potential anchor may have one or a limited pool of public IPv4 addresses, and may allocate private IP addresses to UEs and performs network address translation (NAT). The first scenario is similar to the IPv6 one except that additional support may be required on the UE, (e.g., on the connection manager), side to handle different IPv4 addresses simultaneously, but the solution on the network side may be similar to IPv6. On the other hand, the second scenario may require additional functionality and is described further below.

The SDN-based solution for DMM with IPv4 support may be implemented as follows. Referring back to FIG. 13, in a network similar to network 1300, each SDN-capable switch attached to a local IP network may have a limited pool of public IPv4 addresses, and the SDN controller 1310 may centrally implement the NAT control functionality, programming accordingly some network switches to perform the NAT data-plane forwarding operations, (i.e., address and port translation, plus application layer gateway functions). Alternatively, a real NAT box may be deployed close/co-located with each network switch playing an anchor role, but a dedicated interface between this NAT and the SDN controller may be utilized in this case. The SDN controller 1310 may determine which network switch 1311 is operating in the anchor role, and may select a private IP address to be allocated to the UE 1320 on initial attachment to the network. Then, forwarding state is populated on the network based on the private IPv4 address allocated to the UE 1320, the destination address and the used ports. If the UE 1320 changes anchor, meaning that a new public IPv4 address (anchored at the new anchor) may be used for new communications, the same private IPv4 address may be allocated to the UE 1320. The network may distinguish the right anchor for each data packet based on the addresses and ports used, so traffic may be forwarded to the right anchor, which performs the required NAT transformations.

Figure 20A:
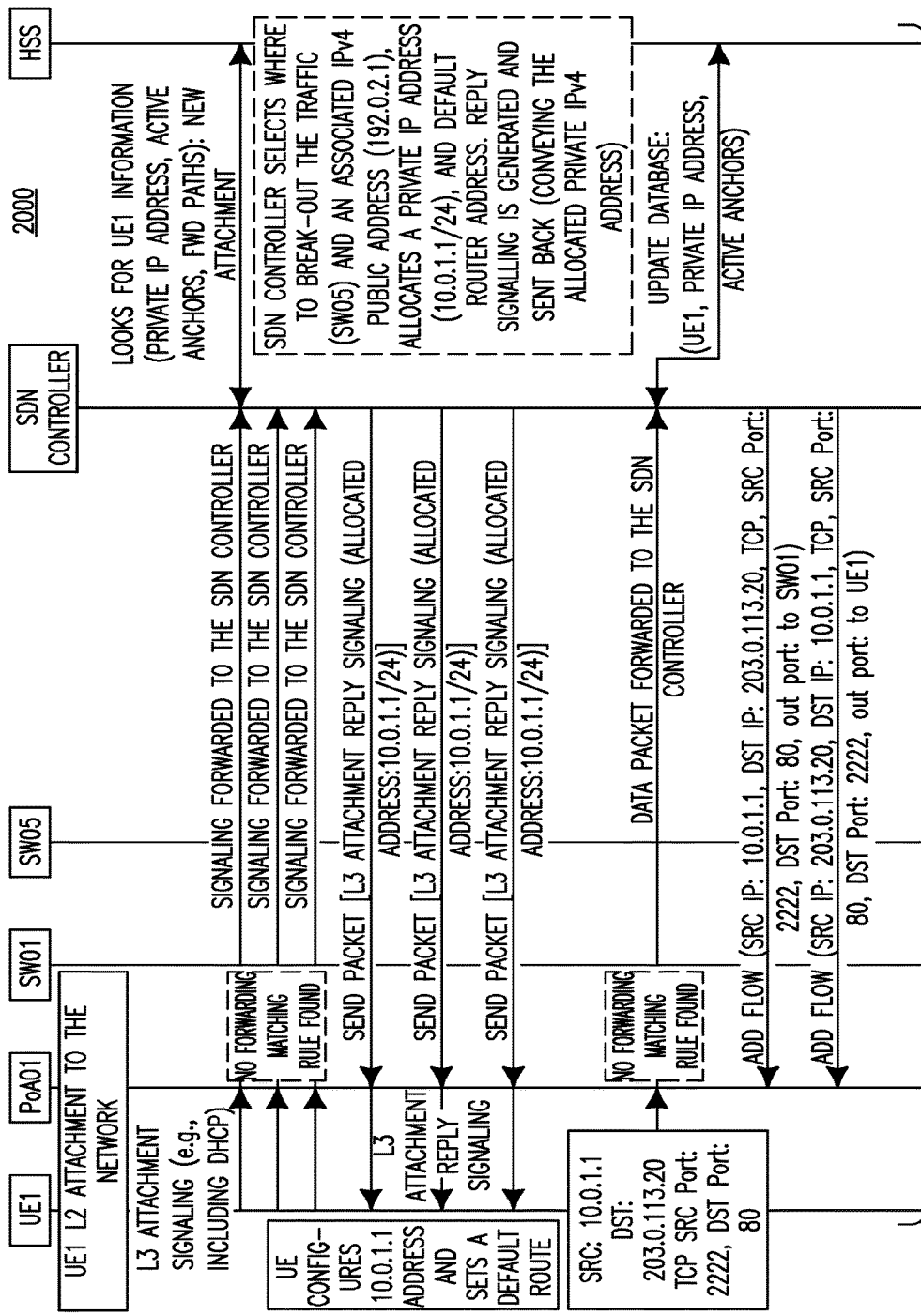
FIGS. 20A-20B show an example of IP version 4 (IPv4) support for an initial attachment signaling procedure.
Figure 20B:
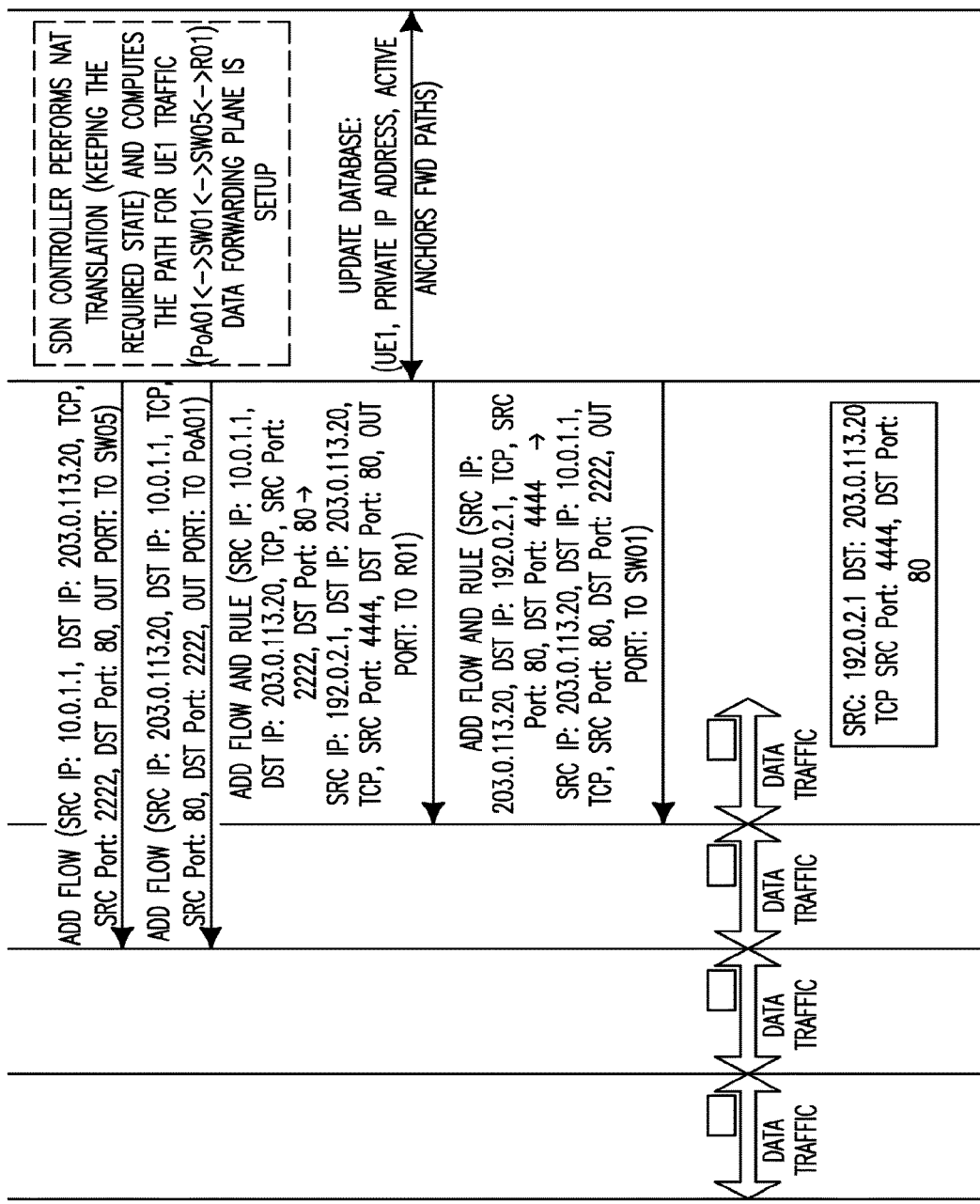

FIGS. 20A-20B show an example of IP version 4 (IPv4) support for an initial attachment signaling procedure 2000 when a UE initially attaches to the network. When UE1 attaches to the network (PoA01), the initial attachment signaling may be received by PoA01, which may not have a matching rule for this traffic, and therefore may forward it to the SDN controller. The controller may check the database to determine if there is status information about UE1, which may not be the case as it is the initial attachment of the UE1. Then, the SDN controller may select an unused private IPv4 address to allocate to the UE (10.0.1.1/24), an address for the default router (10.0.1.2), and select where the traffic may be anchored in the network, (in this case, SW05 may be selected as the break-out point, which may be attached to a local IP network with Internet access via R01) and an associated public IPv4 address (192.0.2.1). The SDN controller may generate the reply signaling messages, which may convey the allocated private IPv4 address and additional IP configuration parameters. For example, this signaling may be dynamic host configuration protocol (DHCP) or point-to-point protocol (PPP). The controller may also update the database with this new information.

When UE1 sends its first IPv4 data packets, these packets may be received by PoA01 and there may not be any matching rules. Therefore, these packets may also be forwarded to the SDN controller, which may compute the NAT required translation and set up the forwarding data plane in the network (in this case, following the path UE1⇆PoA01⇆SW01⇆SW05⇆R01, which may be symmetric just for the sake of simplifying the example). The controller may configure the different involved network entities, including not only the data plane forwarding entries, but also the packet level transformations that may be performed at the anchoring point which is also playing the role of NAT device (SW05 in this example). In FIGS. 20A-20B, only one IP data flow may be considered, showing the NAT operations and the flow path forwarding setup in the network. For each new flow of the UE, analogous operations may take place.

Figure 21A:
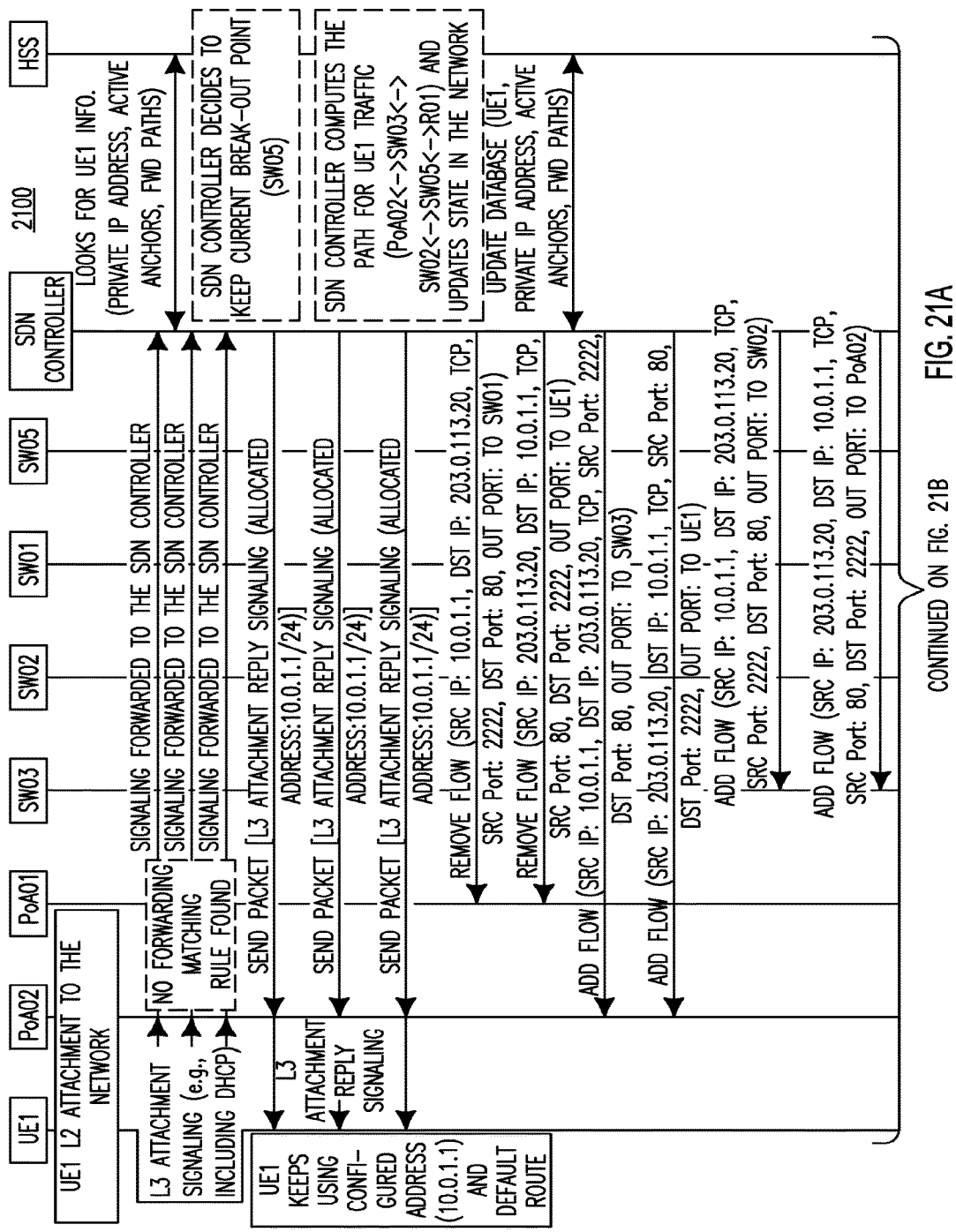
FIGS. 21A-21B show an example of IPv4 support for an intra-anchor handover signaling procedure.
Figure 21B:
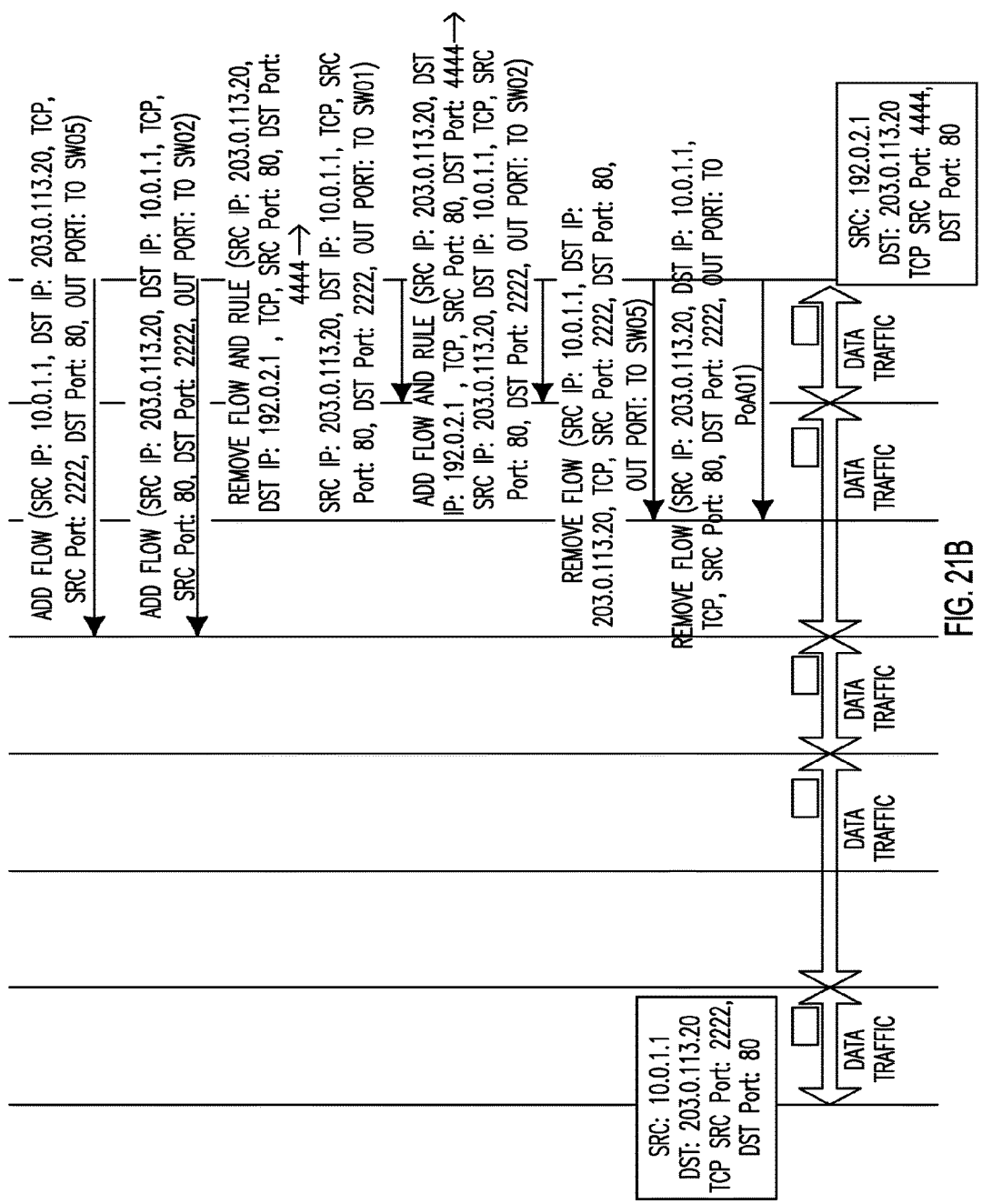

FIGS. 21A-21B show an example of IPv4 support for an intra-anchor handover signaling procedure 2100. If UE1 changes its point of attachment and connects to PoA02, the initial attachment signaling may be received by PoA02, which may forward this signaling to the SDN controller, as PoA02 does not have a mapping for that traffic. The SDN controller may look into the database for UE1 and find out that it was already attached to the network, and obtain the information about current anchors, allocated addresses and NAT state. Taking this information into consideration, together with additional one, such as, but not limited to, network status, UE known mobility pattern, and the like, the SDN controller may decide to keep current anchor point for UE1's traffic. Therefore, the controller may compute the new best path for UE1'*s* traffic (UE1⇆PoA02⇆SW03⇆SW02⇆SW05⇆R01 in this example) and update involved network entities.

Figure 22A:
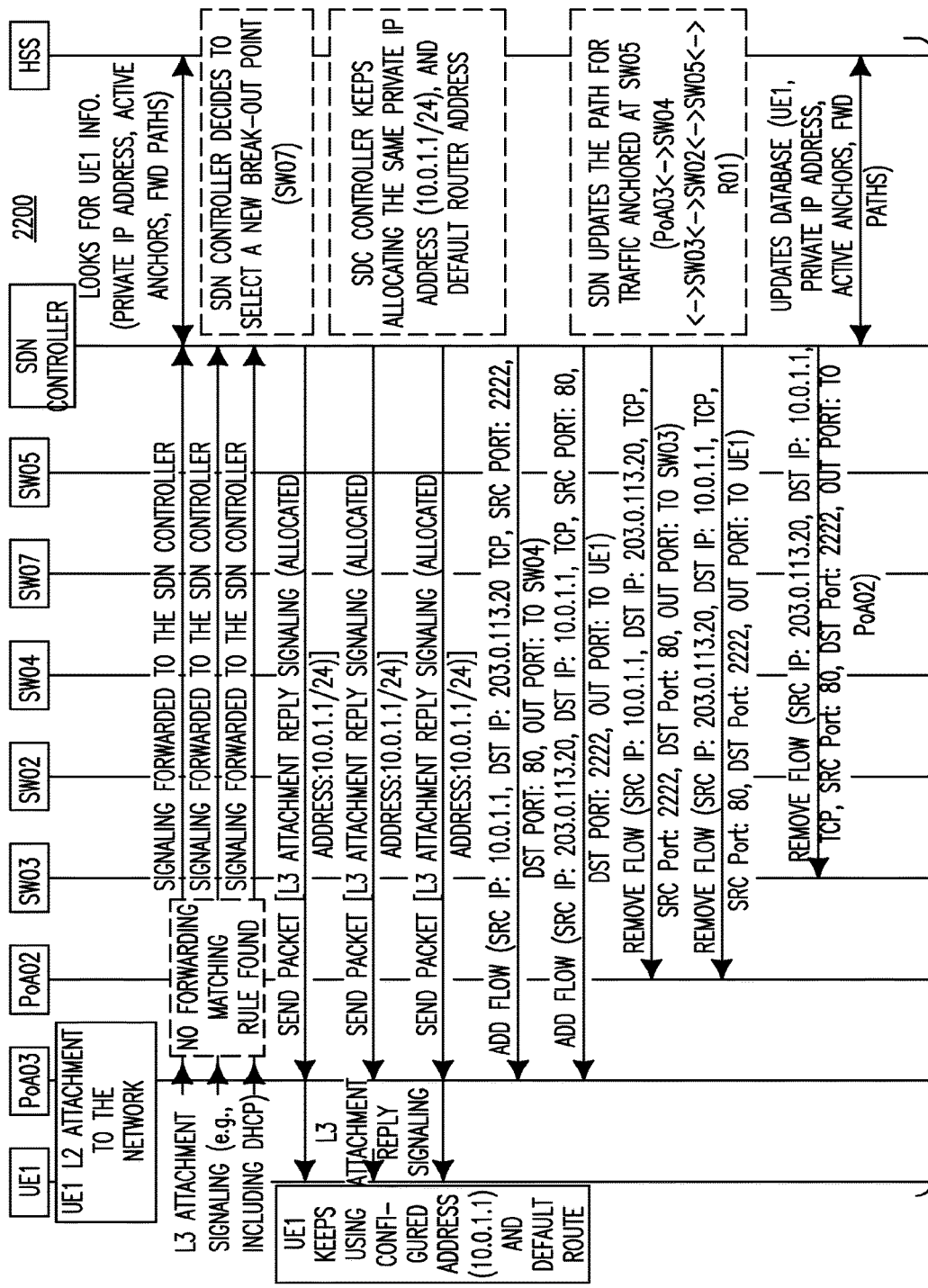
FIGS. 22A-22C show an example of IPv4 support for an inter-anchor handover signaling procedure.
Figure 22B:
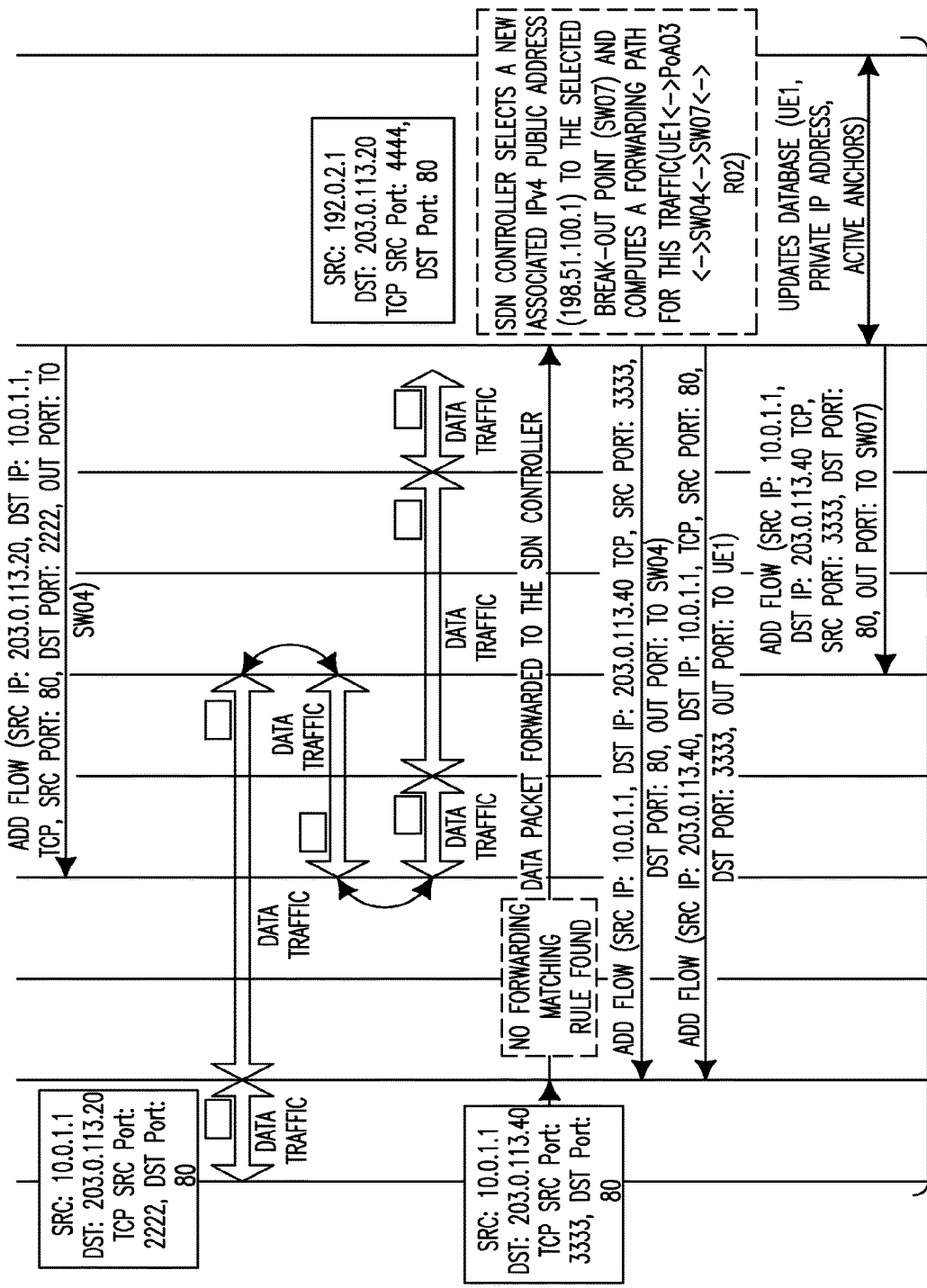
Figure 22C:
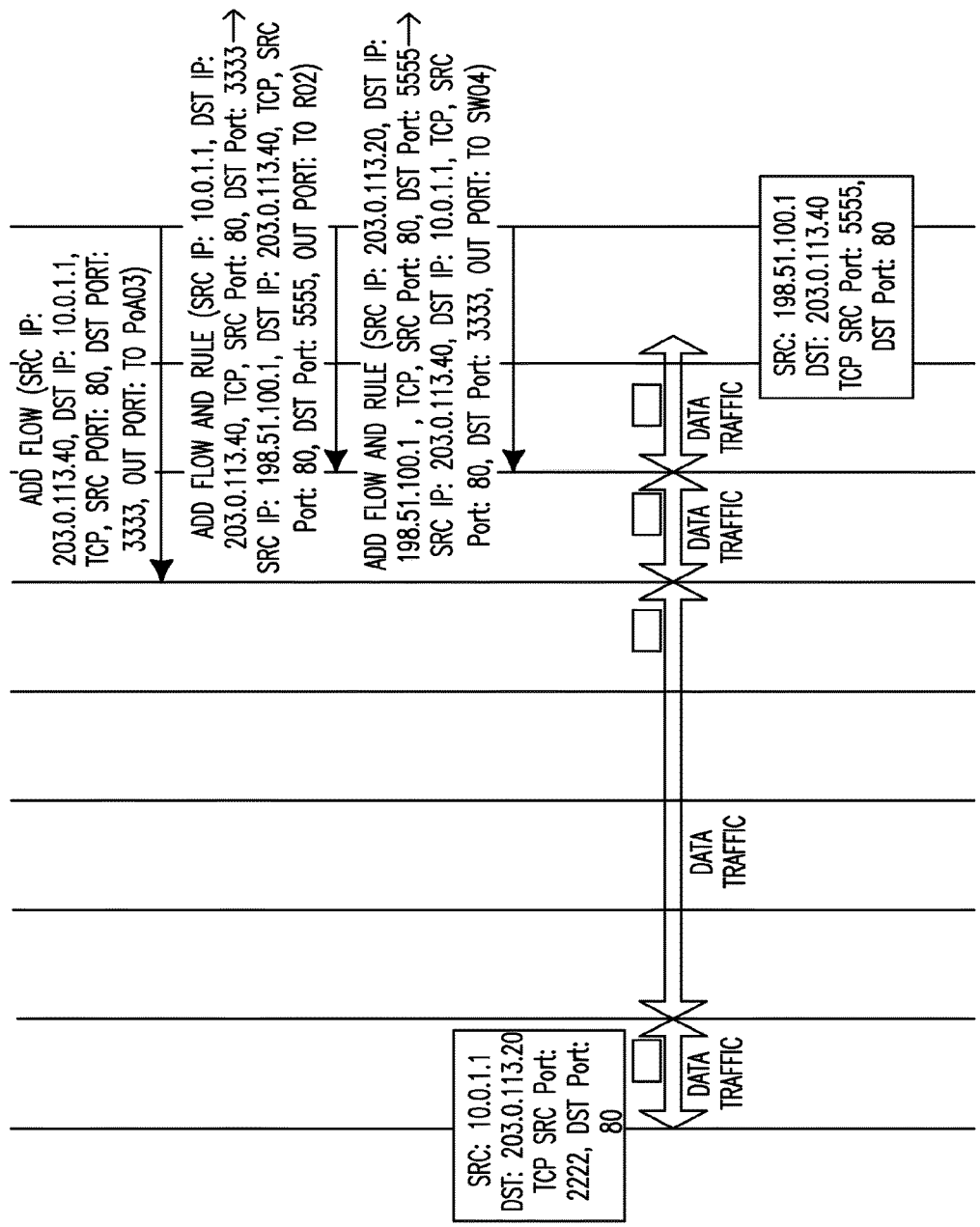

FIGS. 22A-22C show an example of IPv4 support for an inter-anchor handover signaling procedure 2200 when a UE performs a handover and the network decides not to change the allocated anchor. If UE1 changes its point of attachment and connects to PoA03, the initial attachment signaling may be received by PoA03, which may forward this signaling to the SDN controller, as PoA03 does not have a mapping for that traffic. The SDN controller may look into the database for UE1 and find out that it was already attached to the network, and obtain the information about current anchors, allocated addresses and NAT state. Taking this information into consideration, together with additional one, such as, but not limited to, network status, UE known mobility pattern, and the like, the SDN controller may decide to select a different anchor for new UE2 sessions. The controller may first update the new best path for UE1'*s* traffic anchored at SW05 (UE1⇆PoA03⇆SW04⇆SW03⇆SW02⇆SW05⇆R01 in this example) and may then update involved network entities.

When UE1 starts a new IPv4 data flow, these packets may be received by PoA02, which may not have any matching rules, and therefore may forward the packets to the SDN controller. The SDN controller may compute the NAT required translation and set up the forwarding data plane in the network using SW07 as the new selected break-out point (UE1⇆PoA03⇆SW04⇆SW07⇆R02, which happens to be symmetric just for the sake of simplifying the example). Since the anchor point may have changed, a new public IPv4 address (198.51.100.1) may be used for the UE1's data packets that are anchored at SW07. The controller may configure the different involved network entities, including not only the data plane forwarding entries, but also the packet level transformations that may be performed at the anchoring point, which may also play the role of NAT device (SW07 in this example). The database may also be updated by the SDN controller. Only one IP data flow per active anchor point may be considered, showing the NAT operations and the flow path forwarding setup in the network. For each new started data flow of the UE, analogous operations may take place, which may keep the traffic anchored at SW07.

Figure 23A:
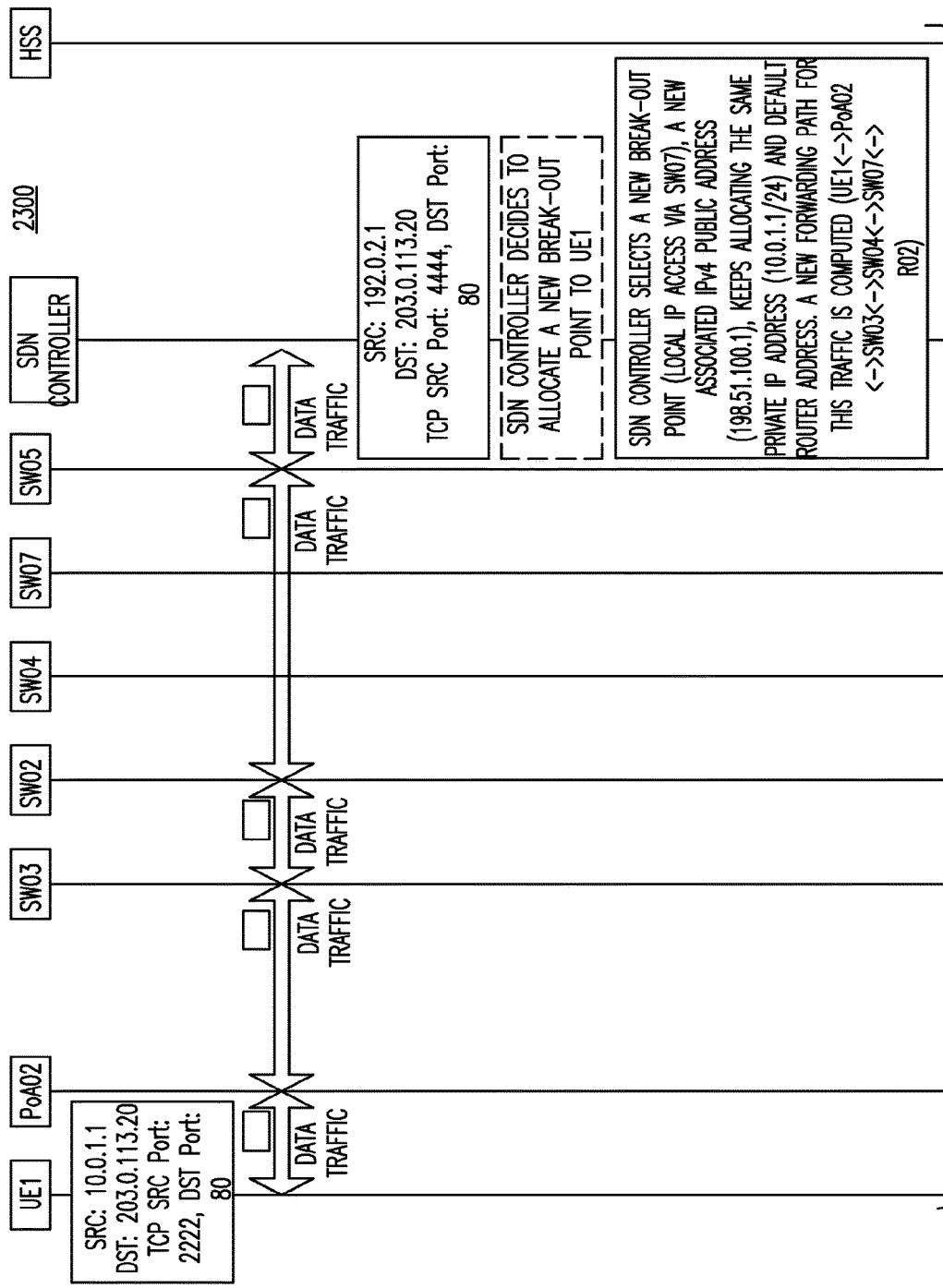
FIGS. 23A-23C show an example of IPv4 support for a new anchor allocation signaling procedure.
Figure 23B:
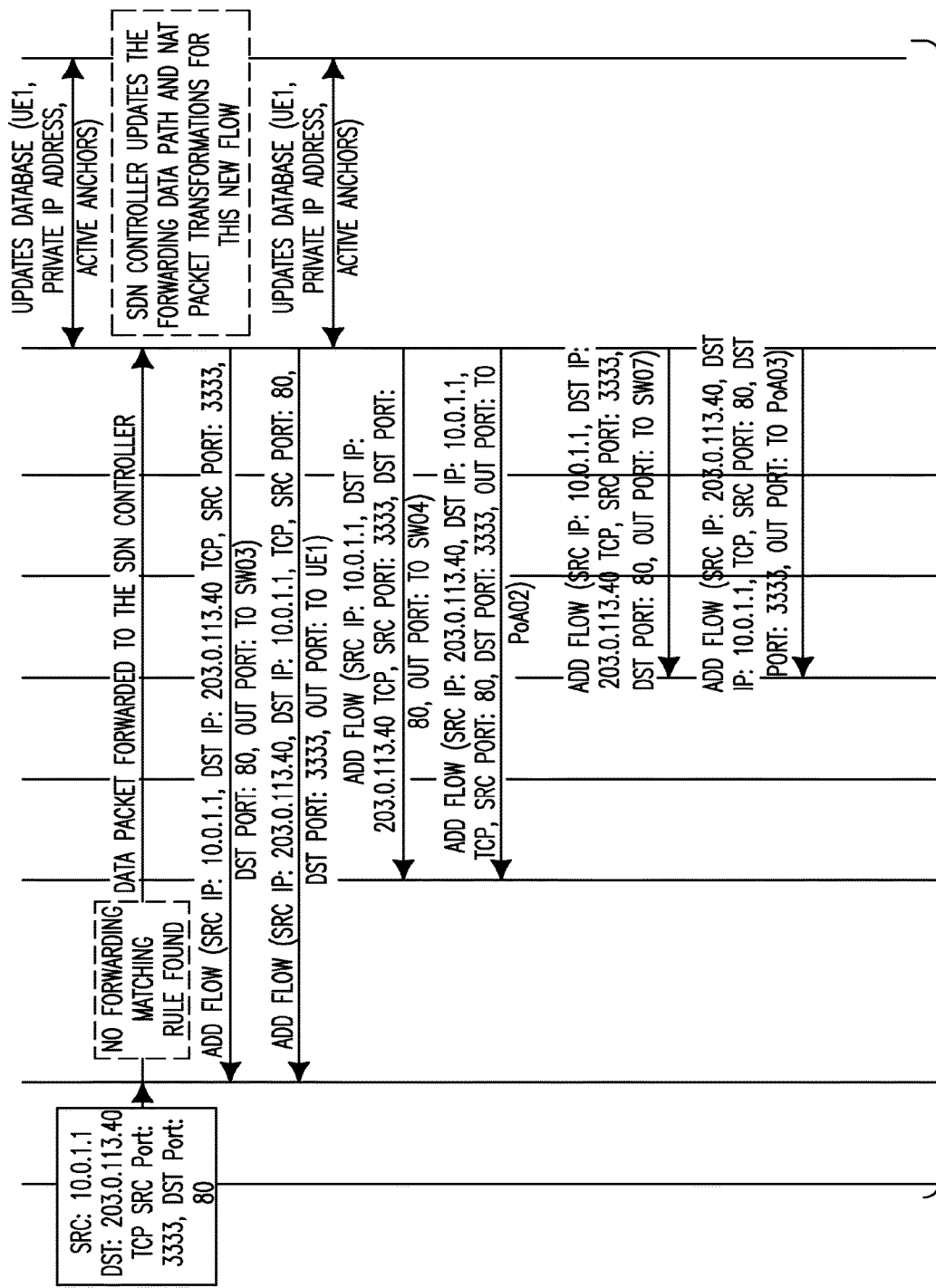
Figure 23C:
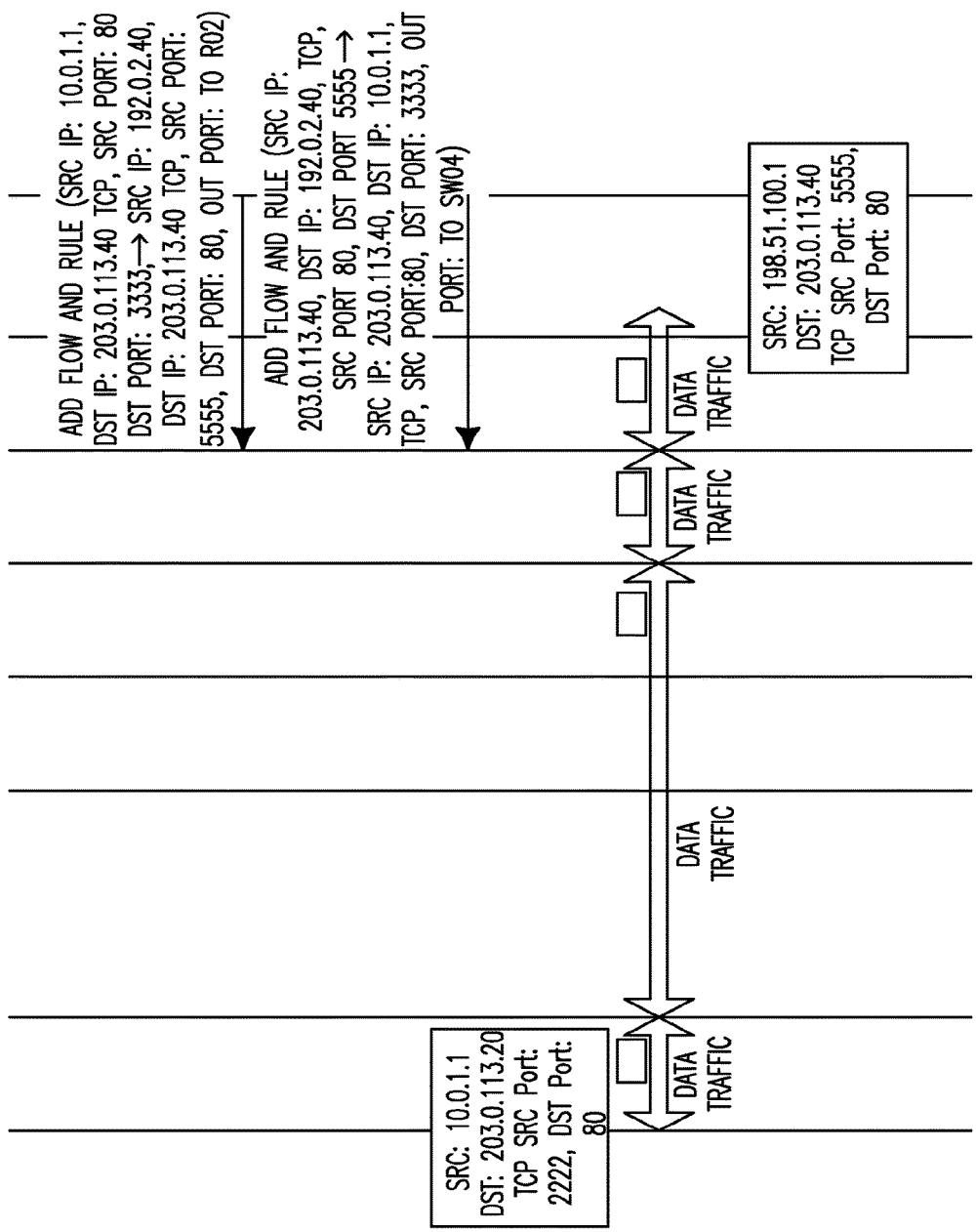

FIGS. 23A-23C show an example of IPv4 support for a new anchor allocation signaling procedure 2300 when the network decides to allocate a new anchor to a UE, even if it has not moved. UE1 is attached to PoA02 and is currently using SW05 as its local break-out point. At a given point of time, the SDN controller may decide to assign a different anchoring entity for new IP traffic data flows of UE2 (for example because of maintenance reasons). FIGS. 23A-23C shows that existing flows, anchored at SW05, may not be impacted, but that for new data flows, when PoA02 forwards the first packet to the SDN controller (as there is no matching rule), the SDN controller may select a new anchor (SW07 in this example), allocate a new public IPv4 address (198.51.100.1), and compute the forwarding path for traffic between the UE2 and the SW07 (which happens to be symmetric for the sake of the simplicity of this example: UE1⇆PoA02⇆SW03⇆SW04⇆SW07⇆R02), as well as the per-packet transformations required by the NAT. From this point, new traffic sessions may use the new anchor, while old ones keep using the previously selected one(s).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

Furthermore, although specific signaling and examples have been described above, it should be noted that alternative signaling may be utilized in the procedures described above, and any number of components may be in communication with one another. For example, although specific switches, UEs, SDN controllers, and PoAs are described in the examples above, any number or combination of the components may similarly be utilized in the procedures described above.

What is claimed is:

1. A network node comprising:
a processor operatively coupled to at least one interface;
the processor and the at least one interface configured to manage a packet data session of a wireless transmit/receive unit (WTRU) with a data network;
the processor configured to select a first anchor node for the packet data session of the WTRU by considering at least one of: position information of the WTRU or mobility requirements associated with the packet data session of the WTRU;
the processor and the at least one interface configured to control uplink traffic forwarding toward the selected first anchor node and downlink traffic from the selected first anchor node for the packet data session of the WTRU;
the processor configured to select a second anchor node for the packet data session of the WTRU by considering at least one of: position information of the WTRU or mobility requirements associated with the packet data session; and
the processor and the at least one interface configured to control uplink traffic forwarding toward the second anchor node and downlink traffic from the selected second anchor node for the packet data session of the WTRU.

2. The network node of claim 1, wherein:
the processor and the at least one interface are further configured to remove, from a data path associated with the packet data session of the WTRU, a first anchor node.

3. The network node of claim 1, wherein the processor is configured to select the first anchor node for the packet data session of the WTRU by further considering a characteristic of the packet data session.

4. The network node of claim 1, wherein the processor is configured to select the first anchor node for the packet data session of the WTRU by further considering characteristics of an application associated with the packet data session.

5. The network node of claim 1, wherein the selected first anchor node is a distributed gateway.

6. The network node of claim 1, wherein the selected first anchor node is a logical entity located at an edge of the data network close to the WTRU.

7. The network node of claim 1, wherein:
the processor and the at least one interface are further configured to configure an IP address for the WTRU and locally anchored at the selected first anchor node; and
the at least one interface configured to provide the IP address to the WTRU.

8. The network node of claim 1, wherein the selected first anchor node manages a locally anchored IPv6 prefix and the WTRU auto-configures an IP address from the IPv6 prefix.

9. The network node of claim 1, wherein the packet data session supports IPv4 or IPv6 traffic.

10. The network node of claim 1, wherein the processor and the at least one interface are configured to control uplink traffic forwarding toward the second anchor node and downlink traffic from the selected second anchor node for the packet data session of the WTRU while maintaining the configuration with the selected first anchor node.

11. A method performed by a network node, the method comprising:
managing a packet data session of a wireless transmit/receive unit (WTRU) with a data network;
selecting a first anchor node for the packet data session of the WTRU by considering at least one of: position information of the WTRU or mobility requirements associated with the packet data session of the WTRU;

controlling uplink traffic forwarding toward the selected first anchor node and downlink traffic from the selected first anchor node for the packet data session of the WTRU;

selecting a second anchor node for the packet data session of the WTRU by considering at least one of: position information of the WTRU or a mobility requirements associated with the packet data session; and controlling uplink forwarding toward the second anchor node and downlink traffic from the selected second anchor node for the packet data session of the WTRU.

12. The method of claim 11, further comprising:
removing, from a data path associated with the packet data session of the WTRU, a first anchor node.

13. The method of claim 11, wherein the selecting the first anchor node for the packet data session of the WTRU further considers a characteristic of the packet data session.

14. The method of claim 11, wherein the selecting the first anchor node for the packet data session of the WTRU further considers characteristics of an application associated with the packet data session.

15. The method of claim 11, wherein the selected first anchor node is a distributed gateway.

16. The method of claim 11, wherein the selected first anchor node is a logical entity located at an edge of the data network close to the WTRU.

17. The method of claim 11, further comprising:
configuring an IP address for the WTRU and locally anchored at the selected first anchor node; and
providing the IP address to the WTRU.

18. The method of claim 11, wherein the selected first anchor node manages a locally anchored IPv6 prefix and the WTRU auto-configures an IP address from the IPv6 prefix.

19. The method of claim 11, wherein the packet data session supports IPv4 or IPv6 traffic.

20. The method of claim 11, wherein the controlling uplink traffic forwarding toward the second anchor node and downlink traffic from the selected second anchor node for the packet data session of the WTRU occurs while maintaining the configuration with the selected first anchor node.

* * * * *

UNITED STATES PATENT AND TRADEMARK OFFICE
CERTIFICATE OF CORRECTION

PATENT NO. : 10,349,327 B2
APPLICATION NO. : 16/003596
DATED : July 9, 2019
INVENTOR(S) : Perras et al.

Page 1 of 1

It is certified that error appears in the above-identified patent and that said Letters Patent is hereby corrected as shown below:

In the Specification

At Column 2, Line 37, after the word "16A-", delete "160" and insert therefor --16C--.

At Column 2, Line 39, after the word "17A-", delete "170" and insert therefor --17C--.

At Column 6, Line 55, after the word "FIG.", delete "10" and insert therefor --1C--.

At Column 7, Line 8, after the word "FIG.", delete "10" and insert therefor --1C--.

At Column 7, Line 11, after the word "FIG.", delete "10" and insert therefor --1C--.

At Column 18, Line 47, after the word "16A-", delete "160" and insert therefor --16C--.

At Column 19, Line 5, after the word "17A-", delete "170" and insert therefor --17C--.

Signed and Sealed this
Third Day of September, 2019

Andrei Iancu
*Director of the United States Patent and Trademark Office*